US012771515B2

(12) United States Patent
Gong et al.

(10) Patent No.: US 12,771,515 B2
(45) Date of Patent: Oct. 20, 2026

(54) METHOD FOR TRANSMITTING PHYSICAL LAYER PROTOCOL DATA UNIT AND COMMUNICATION APPARATUS

(71) Applicant: HUAWEI TECHNOLOGIES CO., LTD., Shenzhen (CN)

(72) Inventors: Bo Gong, Shenzhen (CN); Mengshi Hu, Shenzhen (CN); Jian Yu, Shenzhen (CN); Chenchen Liu, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 348 days.

(21) Appl. No.: 18/455,889

(22) Filed: Aug. 25, 2023

(65) Prior Publication Data

US 2023/0403126 A1 Dec. 14, 2023

Related U.S. Application Data

(63) Continuation of application No. PCT/CN2022/074245, filed on Jan. 27, 2022.

(30) Foreign Application Priority Data

Feb. 27, 2021 (CN) ......................... 202110221489.5
May 31, 2021 (CN) ......................... 202110604657.9

(51) Int. Cl.
*H04L 5/00* (2006.01)
*H04W 72/1268* (2023.01)

(52) U.S. Cl.
CPC ............ *H04L 5/0094* (2013.01); *H04L 5/001* (2013.01); *H04L 5/0044* (2013.01); *H04W 72/1268* (2013.01)

(58) Field of Classification Search
None
See application file for complete search history.

(56) References Cited

U.S. PATENT DOCUMENTS 10,687,281 B2 * 6/2020 Son .......................... H04L 1/00
10,785,772 B2 * 9/2020 Chun .................... H04L 1/1671
(Continued)

FOREIGN PATENT DOCUMENTS

CN 106789761 A 5/2017
EP 3396925 A2 10/2018
(Continued)

OTHER PUBLICATIONS

IEEE Std 802.11a-1999, Part 11: Wireless LAN Medium Access Control(MAC) and Physical Layer (PHY) specifications: High-speed Physical Layer in the 5 GHZ Band, Approved Sep. 16, 1999, total 90 pages.
(Continued)

*Primary Examiner* — Luna Weissberger
(74) *Attorney, Agent, or Firm* — HAUPTMAN HAM, LLP

(57) ABSTRACT

This application provides a method for transmitting a PPDU and a communication apparatus. An AP sends a trigger frame to trigger at least one STA to transmit an uplink PPDU. After receiving the trigger frame, the at least one STA transmits respective uplink PPDUs. The uplink PPDU includes a data field and LTFs. The data field is carried on a distributed RU. The LTFs are carried on all subcarriers in a first transmission bandwidth. The first transmission bandwidth is a bandwidth occupied by a distributed RU that is allocated by the AP to the at least one STA for transmitting the uplink PPDU. Alternatively, the LTFs are carried on all subcarriers of a plurality of continuous RUs corresponding to the distributed RU.

15 Claims, 16 Drawing Sheets

(56) References Cited

U.S. PATENT DOCUMENTS

| | | | |
|---|---|---|---|
| 2017/0026952 A1 | 1/2017 | Park et al. | |
| 2017/0338919 A1 | 11/2017 | Lim et al. | |
| 2019/0380117 A1 | 12/2019 | Verma et al. | |
| 2020/0008185 A1 | 1/2020 | Chen et al. | |
| 2021/0135779 A1* | 5/2021 | Gan | H04L 1/0009 |

FOREIGN PATENT DOCUMENTS

| | | | | |
|---|---|---|---|---|
| EP | 4047855 A1 | 8/2022 | |
| EP | 4398531 A2 * | 7/2024 | H04L 5/0044 |
| JP | 2015520973 A | 7/2015 | |
| WO | 2020071999 A1 | 4/2020 | |

OTHER PUBLICATIONS

IEEE Std 802.11ac™-2013, Part 11: Wireless LAN Medium Access Control (MAC) and Physical Layer (PHY) Specifications, Amendment 4: Enhancements for Very High Throughput for Operation in Bands below 6 GHz, Approved Dec. 11, 2013, total 425 pages.

IEEE Std 802.11ax™- 2021, Part 11: Wireless LAN Medium Access Control (MAC) and Physical Layer (PHY) Specifications, Amendment 1: Enhancements for High Efficiency WLAN, Approved Feb. 9, 2021, total 37 pages.

IEEE Std 802.11b-1999, Part 11: Wireless LAN Medium Access Control (MAC) and Physical Layer (PHY) specifications: Higher-Speed Physical Layer Extension in the 2.4 GHz Band, Approved Sep. 16, 1999, total 97 pages.

IEEE Std 802.11n™-1999, Part 11:Wireless LAN Medium Access Control (MAC) and Physical Layer (PHY) Specifications, Amendment 5: Enhancements for Higher Throughput, Approved Sep. 11, 2009, total 536 pages.

IEEE Std 802.11g™-2003, Part 11: Wireless LAN Medium Access Control (MAC) and Physical Layer (PHY) specifications, Amendment 4: Further Higher Data Rate Extensionin the 2.4 GHz Band. Approved Jun. 12, 2003, total 78 pages.

IEEE P802.11be™/D0.1, Part 11: Wireless LAN Medium Access Control (MAC) and Physical Layer (PHY) Specifications, Amendment 8: Enhancements for extremely high throughput (EHT), Sep. 2020, total 299 pages.

Extended European Search Report issued in corresponding European Application No. 22758743.3, dated Jun. 18, 2024, pp. 1-12.

Australian Office Action issued in corresponding Australian Application No. 2022224945, dated May 28, 2024, pp. 1-2.

Japanese Office Action issued in corresponding Japanese Application No. 2023-552145, dated Oct. 29, 2024, pp. 1-9.

Extended European Search Report issued in corresponding European Application No. 22758743.3, mailed on Feb. 3, 2026, pp. 1-7.

* cited by examiner

METHOD FOR TRANSMITTING PHYSICAL LAYER PROTOCOL DATA UNIT AND COMMUNICATION APPARATUS

CROSS-REFERENCE TO RELATED APPLICATIONS

This application is a continuation of International Application No. PCT/CN2022/074245, filed on Jan. 27, 2022, which claims priorities to Chinese Patent Application No. 202110221489.5, filed on Feb. 27, 2021 and Chinese Patent Application No. 202110604657.9, filed on May 31, 2021. All of the aforementioned patent applications are hereby incorporated by reference in their entireties.

TECHNICAL FIELD

This application relates to the communication field, and more specifically, to a method for transmitting a physical layer protocol data unit (physical layer protocol data unit, PPDU) and a communication apparatus.

BACKGROUND

An orthogonal frequency division multiple access (orthogonal frequency division multiple access, OFDMA) technology is introduced into a wireless local area network (wireless local area network, WLAN), and then the concept of a resource unit (resource unit, RU) is introduced. Specifically, an entire bandwidth is divided into a plurality of resource units (resource units, RUs). In other words, a frequency domain resource is allocated in a unit of a resource unit instead of a channel. For example, one 20 MHz channel may include a plurality of resource units (resource units, RUs) such as a 26-tone RU, a 52-tone RU, and a 106-tone RU. Tone indicates a quantity of subcarriers. In addition, the RU may also be a 242-tone RU, a 484-tone RU, a 996-tone RU, or the like.

A communication mode in an existing wireless local area network (wireless local area network, WLAN) strictly limits a maximum transmit power and a maximum frequency spectrum density. A transmit power cannot exceed the maximum power, and a transmit power spectral density cannot exceed a maximum power spectral density. Therefore, as a transmit bandwidth increases, how to increase a transmit power of data and ensure a peak average power ratio (peak average power ratio, PAPR) of long training fields (long training fields, LTFs) when a maximum power spectral density limitation is met is an urgent problem to be resolved.

SUMMARY

This application provides a method for transmitting a PPDU, to ensure that an average power of a data part sent by an access point (access point, AP) is increased, and also ensure a PAPR of LTFs, thereby ensuring system performance.

According to a first aspect, a method for transmitting a PPDU is provided. The method includes: A station (station, STA) receives a trigger frame from an AP, where the trigger frame is used to trigger at least one STA including the STA to transmit an uplink physical layer protocol data unit PPDU; and the STA sends a PPDU to the AP based on the trigger frame. The PPDU includes a data field and long training fields LTFs used for channel estimation. The data field is carried on a distributed RU. The distributed RU includes a plurality of subcarrier groups that are distributed in frequency domain. One subcarrier group includes one subcarrier or includes at least two continuous subcarriers. The LTFs are carried on all subcarriers in a first transmission bandwidth. The first transmission bandwidth is a bandwidth corresponding to a distributed RU that is allocated by the AP to the at least one STA for transmitting the uplink PPDU.

It should be understood that the first transmission bandwidth may also be understood as a bandwidth allocated by the AP to the uplink PPDU. In a scenario in which all RUs included in the entire bandwidth are distributed RUs, or in a scenario in which resource allocation is performed on the entire bandwidth by using a distributed RU, the first transmission bandwidth is the entire bandwidth. In a scenario in which the entire bandwidth includes both a distributed RU and a continuous RU, or in a scenario in which resource allocation is performed on one part of bandwidth in the entire bandwidth by using a distributed RU and resource allocation is performed on the other part of bandwidth by using a continuous RU, the first transmission bandwidth is the bandwidth occupied by the distributed RU. For example, it is assumed that the entire bandwidth is 40 MHz. In a scenario in which resource allocation is performed on the 40 MHz bandwidth by using a distributed RU, the first transmission bandwidth is 40 MHz. In a scenario in which resource allocation is performed on a 20 MHz bandwidth in the 40 MHz bandwidth by using a distributed RU and resource allocation is performed on the other 20 MHz bandwidth by using a continuous RU, the first transmission bandwidth is 20 MHz.

It should be further understood that the distributed RU carrying the data field may be one RU, or may be a plurality of RUs. In addition, regardless of which distributed RU or distributed RUs in the first transmission bandwidth are the distributed RU carrying the data field, a bandwidth occupied by the distributed RU is the first transmission bandwidth. For example, when the distributed RU carrying the data field is a distributed RU #1 and a distributed RU #2, a bandwidth occupied by the distributed RU #1 and the distributed RU #2 is the first transmission bandwidth. When the distributed RU carrying the data field is a distributed RU #3 and a distributed RU #4, a bandwidth occupied by the distributed RU #3 and the distributed RU #4 is still the first transmission bandwidth.

In a conventional technology, if a PPDU is sent in a first transmission bandwidth, both a data field and LTFs in the PPDU are carried on all subcarriers in the first transmission bandwidth. Because the LTFs carried on all the subcarriers in the first transmission bandwidth are designed, a PAPR of the LTFs can be ensured. However, according to the method for transmitting a PPDU provided in this application, in a scenario in which the data field is carried on the distributed RU, the LTFs are carried on all the subcarriers in the first transmission bandwidth instead of the distributed RU. Therefore, it can be ensured that an average power of a data part sent by the AP is increased, and a PAPR of the LTFs can also be ensured, thereby ensuring system performance.

According to a second aspect, a method for transmitting a PPDU is provided. The method includes: A STA receives a trigger frame from an AP, where the trigger frame is used to trigger at least one STA including the STA to transmit an uplink physical layer protocol data unit PPDU; and the STA sends a physical layer protocol data unit PPDU to the AP based on the trigger frame. The PPDU includes a data field and long training fields LTFs used for channel estimation. The data field is carried on a distributed RU. The distributed RU includes a plurality of subcarrier groups that are distributed in frequency domain. One subcarrier group includes one subcarrier or includes at least two continuous subcarriers. The LTFs are carried on all subcarriers of a plurality of continuous RUs. The plurality of continuous RUs are continuous RUs corresponding to the distributed RU. Each continuous RU includes a plurality of subcarriers that are continuous in frequency domain.

In this application, the continuous RU is an RU including a plurality of continuous subcarriers, or the continuous RU is an RU including two continuous subcarrier groups. A plurality of subcarriers included in each continuous subcarrier group are continuous. The two continuous subcarrier groups are only spaced apart by one or more of a guard subcarrier, a null subcarrier, or a direct current subcarrier.

It should be understood that a continuous RU and a distributed RU are corresponding concepts. For a bandwidth, a plurality of subcarriers included in the bandwidth may form a plurality of continuous RUs, or may form a plurality of distributed RUs. In other words, for a subcarrier, in a continuous RU allocation mechanism, the subcarrier belongs to a continuous RU, and in a distributed RU allocation mechanism, the subcarrier belongs to a distributed RU. A continuous RU and a distributed RU may include some same subcarriers. In this application, the plurality of continuous RUs corresponding to the carried data field are a plurality of continuous RUs that include all subcarriers of the distributed RU and that include a minimum quantity of subcarriers. Any one continuous RU of a plurality of continuous RUs corresponding to one distributed RU includes some subcarriers of the distributed RU. In a conventional technology, if a PPDU is sent on all subcarriers of a plurality of continuous RUs, a data field and LTFs in the PPDU are carried on all the subcarriers of the plurality of continuous RUs. Because the LTFs carried on all the subcarriers of the plurality of continuous RUs are designed, a PAPR of the LTFs can be ensured. However, according to the method for transmitting a PPDU provided in this application, in a scenario in which data is carried on the distributed RU, the LTFs are carried on all the subcarriers in the plurality of continuous RUs corresponding to the distributed RU instead of the distributed RU. Therefore, it can be ensured that an average power of a data part sent by the AP is increased, and a PAPR of the LTFs can also be ensured, thereby ensuring system performance. In addition, compared with a manner in which LTFs are carried on all subcarriers in a first transmission bandwidth, the manner in which the LTFs are carried only on all the subcarriers of the plurality of continuous RUs corresponding to the distributed RU can reduce redundant subcarriers for sending.

With reference to the first aspect and the second aspect, in some implementations, the method further includes: The STA obtains, based on values of an LTF sequence and a matrix P, the LTFs carried on all the subcarriers.

In a design, a quantity of dimensions of the matrix P is determined based on a quantity of STAs triggered by the trigger frame, a maximum quantity of STAs supported by a system, and a maximum number of spatial streams supported by a single STA in the at least one STA.

In another design, a quantity of dimensions of the matrix P is $N_{LTF} \times N_{LTF}$. In other words, the matrix P is a matrix of $N_{LTF}$ rows multiplied by $N_{LTF}$ columns. $N_{LTF}$ is a quantity of OFDM symbols included in the LTFs, namely, a quantity of OFDM symbols for sending the LTFs. $N_{LTF}$ is determined based on a total number of streams carried by each STA in the first transmission bandwidth.

With reference to the first aspect and the second aspect, in some implementations, that the STA obtains, based on values of an LTF sequence and a matrix P, the LTFs carried on all the subcarriers includes: The STA determines a corresponding row from the matrix P based on an order of the STA in the at least one STA; and the STA obtains, based on the corresponding row determined from the matrix P and the values of the LTF sequence, the LTFs carried on all the subcarriers.

In an implementation, the quantity of the dimensions of the matrix P is $N_{LTF} \times N_{LTF}$ $N_{LTF}$ is the quantity of the OFDM symbols included in the LTFs, $(N_u \times N_{ms}) \le N_{LTF} \le (N_{mu} \times N_{ms})$, $N_u$ is the quantity of the STAs triggered by the trigger frame, $N_{mu}$ is the maximum quantity of the STAs supported by the system, and $N_{ms}$ is the maximum number of spatial streams supported by the single STA in the at least one STA. An $i^{th}$ STA in the at least one STA corresponds to $(i-1) \times N_{ms}+1_{th}$ to $i \times N_{ms^{th}}$ to rows in the matrix P.

In another implementation, any STA in the at least one STA may determine, from the matrix P based on an indication of an SS Allocation field in a User Info Field in a trigger frame received by the STA, a row corresponding to the STA. Specifically, the SS Allocation field includes two subfields. One is a starting spatial stream subfield, indicating an allocated starting spatial stream index, and the other is a number of spatial stream subfield, indicating a number of allocated spatial streams. The STA selects (starting spatial stream index+1)$^{th}$ to (starting spatial stream index+number of allocated streams)$^{th}$ rows in the matrix P. Specifically, a matrix $P_i$ of a STA i is $P_i$ that is $I_i+1_{th}$ to $I_i+NUM_{i^{th}}$ rows in the matrix P, $I_i$ is a starting spatial stream sequence number of an $i^{th}$ user, the starting spatial stream sequence number $I_i$ is obtained by sorting all streams of all users on the first transmission bandwidth, $NUM_i$ is a number of streams of the $i^{th}$ user, and $I_i$ and $NUM_i$ are indicated by the SS Allocation field in the User Info Field of the STA.

With reference to the first aspect and the second aspect, in some implementations, an LTF $X_k$ carried on a $k^{th}$ subcarrier in all the subcarriers and an LTF $X_d$ carried on a $d^{th}$ subcarrier in all the subcarriers respectively satisfy:

$$X_k = P_i \times LTF_k, \text{ and}$$

$$X_d = F \times LTF_d.$$

The $k^{th}$ subcarrier is a data subcarrier, the $d^{th}$ subcarrier is a pilot subcarrier, $P_i$ is first $S_i$ rows in $(i-1) \times N_{ms}+1_{th}$ to $i \times N_{ms^{th}}$ rows in the matrix P, the $(i-1) \times N_{ms}+1_{th}$ to $i \times N_{ms^{th}}$ rows in the matrix P are rows that correspond to a sequence number i of a STA and that are in the matrix P, the matrix P is an $N_{LTF} \times N_{LTF}$ orthogonal mapping matrix, $N_{LTF}$ is a quantity of orthogonal frequency division multiplexing OFDM symbols included in the LTFs, $(N_u \times N_{ms}) \le N_{LTF} \le (N_{mu} \times N_{ms})$, $N_u$ is the quantity of the STAs triggered by the trigger frame, $N_{mu}$ is the maximum quantity of the STAs supported by the system, $N_{ms}$ is the maximum number of the spatial streams supported by the single STA, i is the sequence number of the STA, $1 \le i \le N_u$, $S_i$ is a number of spatial streams actually transmitted by the STA with the sequence number i, $1 \le S_i \le N_{ms}$, $LTF_k$ is a value that corresponds to the $k^{th}$ subcarrier and that is of the LTF sequence, $LTF_d$ is a value that corresponds to the $d^{th}$ subcarrier and that is of the LTF sequence, and F is a first row in the matrix P.

In a conventional technology, a matrix multiplied by an LTF sequence is a matrix P, and the matrix P herein is determined by the STA based on a number of spatial streams actually transmitted by the STA. For example, assuming that a number of spatial streams actually transmitted by a STA is 2, a matrix P corresponding to the STA is an 2×2 orthogonal mapping matrix specified in a protocol.

However, in this embodiment of this application, the matrix $P_i$ multiplied by the LTF sequence is determined, by the STA based on the number of spatial streams actually transmitted by the STA, from the matrix P (namely, the foregoing $N_{LTF}\times N_{LTF}$ orthogonal mapping matrix) shared between the at least one STA. In this way, inter-user interference caused by sending an LTF by each STA can be avoided.

With reference to the first aspect and the second aspect, in some implementations, i satisfies:

$$i=(T_F-T_L)/T_C+1.$$

$T_F$ is duration from reception of the trigger frame by the STA to reception of a user information field corresponding to the STA, $T_L$ is duration from the reception of the trigger frame by the STA to reception of a first user information field in the trigger frame, and $T_C$ is a length of the user information field corresponding to the STA.

In a Common Field of the trigger frame, B55=0 indicates that the first User Info Field in a User Info List is an extension of the Common Field, and is referred to as a Special User Info Field. In this case, i=i−1 is to be set. In other words, when B55=0, the Special User Info Field is used as the extension of the Common Field, and one less User Info Field is actually allocated to a user. Therefore, an actual user sequence number (the sequence number i of the STA) is a sequence number a of the User Info Field minus 1, that is, i=i−1. When B55=1, the user sequence number (the sequence number of the STA) is equal to the sequence number of the User Info Field.

It should be noted that i may alternatively be determined in another manner. For example, a sequence number of each STA may be carried in the trigger frame. For example, a sequence number of a corresponding STA is carried in each user information field in the trigger frame.

According to a third aspect, a method for transmitting a PPDU is provided. The method includes: An access point AP sends a trigger frame to at least one station STA, where the trigger frame is used to trigger the at least one STA to transmit an uplink physical layer protocol data unit PPDU; and the AP receives respective PPDUs from the at least one STA. One of the PPDUs includes a data field and long training fields LTFs used for channel estimation. The data field is carried on a distributed resource unit RU. The distributed RU includes a plurality of subcarrier groups that are distributed in frequency domain. One subcarrier group includes one subcarrier or includes at least two continuous subcarriers. The LTFs are carried on all subcarriers in a first transmission bandwidth. The first transmission bandwidth is a bandwidth corresponding to a distributed RU that is allocated by the AP to the at least one STA for transmitting the uplink PPDU.

According to the method for transmitting a PPDU provided in this application, in a scenario in which data is carried on the distributed RU, the LTFs are carried on all the subcarriers in the first transmission bandwidth instead of the distributed RU. Therefore, it can be ensured that an average power of a data part sent by the AP is increased, and a PAPR of the LTFs can also be ensured, thereby ensuring system performance.

With reference to the third aspect, in some implementations, the method further includes: The AP determines a channel coefficient of a data subcarrier in the first transmission bandwidth based on an LTF received on the data subcarrier in the first transmission bandwidth.

Based on this solution, the LTFs of the at least one STA are carried on all the subcarriers in the first transmission bandwidth, and the AP may determine a channel coefficient of any data subcarrier in the first transmission bandwidth based on the LTF received on the data subcarrier, where the channel coefficient includes a channel coefficient of each STA in the at least one STA on the data subcarrier.

With reference to the third aspect, in some implementations, a channel coefficient $H_k$ of a $k^{th}$ subcarrier in all the subcarriers in the first transmission bandwidth satisfies:

$$H_k = \frac{Y_k \times P_r^*}{N_{LTF} \times LTF_k}.$$

The $k^{th}$ subcarrier is the data subcarrier, $Y_k$ is the LTF received by the AP on the k subcarrier, $N_{LTF}$ is a quantity of OFDM symbols included in the LTFs, $(N_u\times N_{ms})\le N_{LTF}\le(N_{mu}\times N_{ms})$, $N_u$ is a quantity of STAs triggered by the trigger frame, $N_{mu}$ is a maximum quantity of STAs supported by a system, $N_{ms}$ is a maximum number of spatial streams supported by a single STA, $$P_r^*$$

is a conjugate transposition matrix of $P_r$, $$P_r = \begin{bmatrix} P_1 \\ P_2 \\ M \\ P_{N_u} \end{bmatrix},$$

$P_i$ is first $S_i$ rows in $(i-1)\times N_{ms}+1_{th}$ to $i\times N_{ms^{th}}$ rows in the matrix P, the $(i-1)\times N_{ms}+1_{th}$ to $i\times N_{ms^{th}}$ rows in the matrix P are rows corresponding to a sequence number i of a STA in the matrix P, $1\le S_i\le N_{ms}$, $i\in[1, N_u]$, i is the sequence number of the STA, $S_i$ is a number of spatial streams actually transmitted by the STA with the sequence number i, the matrix P is an $N_{LTF}\times N_{LTF}$ orthogonal mapping matrix, and $LTF_k$ is a value that corresponds to the $k^{th}$ subcarrier and that is of an LTF sequence.

With reference to the third aspect, in some implementations, the method further includes: The AP determines a channel coefficient of the STA with the sequence number i on each data subcarrier in all the subcarriers in the first transmission bandwidth based on the channel coefficient $H_k$ of the $k^{th}$ subcarrier; and the AP demodulates, based on the channel coefficient of the STA with the sequence number i on each data subcarrier in all the subcarriers in the first transmission bandwidth, data transmitted by the STA with the sequence number i. A channel coefficient of the STA with the sequence number i on the $k^{th}$ subcarrier is $Q_{1\_i^{th}}$ to $Q_{2\_i^{th}}$ columns in $H_k$, and $P_i$ is $Q_{1\_i^{th}}$ to $Q_{2\_i^{th}}$ rows in $P_r$.

Based on this solution, the AP may obtain the channel coefficient of the at least one STA on each data subcarrier in the first transmission bandwidth, and then extract a channel coefficient of each STA on each data subcarrier in the first transmission bandwidth from the channel coefficient. Therefore, for any STA, the AP may demodulate, based on the channel coefficient of the STA on each data subcarrier in the first transmission bandwidth, data transmitted by the STA, to obtain the data transmitted by the STA.

According to a fourth aspect, a method for transmitting a PPDU is provided. The method includes: An access point AP sends a trigger frame to at least one station STA, where the trigger frame is used to trigger the at least one STA to transmit an uplink physical layer protocol data unit PPDU; and the AP receives respective PPDUs from the at least one STA, where one of the PPDUs includes a data field and long training fields LTFs used for channel estimation, the data field is carried on a distributed resource unit RU, the distributed RU includes a plurality of subcarrier groups that are distributed in frequency domain, one subcarrier group includes one subcarrier or includes at least two continuous subcarriers, the LTFs are carried on all subcarriers of a plurality of continuous RUs, the plurality of continuous RUs are continuous RUs corresponding to the distributed RU, and each continuous RU includes a plurality of subcarriers that are continuous in frequency domain.

According to the method for transmitting a PPDU provided in this application, in a scenario in which data is carried on the distributed RU, the LTFs are carried on all the subcarriers in the plurality of continuous RUs corresponding to the distributed RU instead of the distributed RU. Therefore, it can be ensured that an average power of a data part sent by the AP is increased, and a PAPR of the LTFs can also be ensured, thereby ensuring system performance. In addition, compared with a manner in which LTFs are carried on all subcarriers in a first transmission bandwidth, the manner in which the LTFs are carried only on all the subcarriers of the plurality of continuous RUs corresponding to the distributed RU can reduce redundant subcarriers for sending.

With reference to the fourth aspect, in some implementations, the method further includes: The AP determines, based on LTFs received on all data subcarriers in a $t^{th}$ continuous RU in a second transmission bandwidth, a channel coefficient of each data subcarrier in all the subcarriers of the $t^{th}$ continuous RU.

The second transmission bandwidth is a bandwidth corresponding to a plurality of continuous RUs that are allocated by the AP to the at least one STA for transmitting respective LTFs. Specifically, each STA in the at least one STA transmits the LTFs on all the subcarriers in the plurality of continuous RUs. In other words, each STA corresponds to the plurality of continuous RUs, and a sum of bandwidths of the continuous RUs in a set of the continuous RUs corresponding to the at least one STA is the second transmission bandwidth. The set of the continuous RUs corresponding to the at least one STA includes continuous RUs corresponding to each STA in the at least one STA, and any two continuous RUs in the set are different.

With reference to the fourth aspect, in some implementations, a channel coefficient $$H_{k'}^{(t)}$$

of a $k'^{th}$ subcarrier in all the subcarriers of the $t^{th}$ continuous RU satisfies:

$$H_{k'}^{(t)} = \frac{Y_{k'} \times (P_r^{(t)})^*}{N_{LTF} \times LTF_{k'}^{(t)}}.$$

The $k'^{th}$ subcarrier is the data subcarrier, $Y_{k'}$ is the LTF received by the AP on the $k'^{th}$ subcarrier, $N_{LTF}$ is a quantity of OFDM symbols included in the LTFs, $(N_u \times N_{ms}) \le N_{LTF} \le (N_{mu} \times N_{ms})$, $N_u$ is a quantity of STAs triggered by the trigger frame, $N_{mu}$ is a maximum quantity of STAs supported by a system, $N_{ms}$ is a maximum number of spatial streams supported by a single STA, $$(P_r^{(t)})^*$$

is a conjugate transposition matrix of $$P_r^{(t)},$$

$$P_r^{(t)} = \begin{bmatrix} P_{1_t} \\ P_{2_t} \\ M \\ P_{u_t} \end{bmatrix},$$

u is a quantity of STAs whose corresponding LTFs are carried on the $t^{th}$ continuous RU, $P_{i_t}$ is first $S_{i_t}$ rows in $(i_t-1) \times N_{ms}+1_{th}$ to $i_t \times N_{ms^{th}}$ rows in the matrix P, the $(i_t-1) \times N_{ms}+1_{th}$ to $i_t \times N_{ms^{th}}$ rows in the matrix P are rows corresponding to a sequence number $i_t$ of a STA in the matrix P, $i_t \in [1, N_u]$, $i_t$ is the sequence number of the STA that uses the $t^{th}$ continuous RU to send the LTF, $S_{i_t}$ is a number of spatial streams actually transmitted by the STA with the sequence number $i_t$, $1 \le S_{i_t} \le N_{ms}$, the matrix P is an $N_{LTF} \times N_{LTF}$ orthogonal mapping matrix, and $$LTF_{k'}^{(t)}$$

is a value that corresponds to the $k'^{th}$ subcarrier of the $t^{th}$ RU and that is of an LTF sequence.

It should be understood that a quantity of STAs whose corresponding LTFs are carried on different continuous RUs may vary. In other words, when t has different values, a value of u may vary.

It should be further understood that $i_t$ is the sequence number of the STA in the at least one STA, and the STA uses the $t^{th}$ continuous RU to send the LTF. $i_t$ is not a sequence number of the STA that uses the $t^{th}$ continuous RU to send the LTF in u STAs.

Based on this solution, for any STA, the AP may obtain a channel coefficient of each data subcarrier in each RU of a plurality of continuous RUs corresponding to a distributed RU that carries data of the STA.

With reference to the fourth aspect, in some implementations, the method further includes: The AP determines, based on the channel coefficient $H_{k'}$ of the $k'^{th}$ subcarrier, a channel coefficient of the STA with the sequence number $i_t$ on each data subcarrier of each continuous RU in a plurality of continuous RUs corresponding to the STA with the sequence number $i_t$; and the AP demodulates, based on the channel coefficient of the STA with the sequence number $i_t$ on each data subcarrier of each continuous RU in the plurality of continuous RUs corresponding to the STA with the sequence number $i_t$, data transmitted by the STA with the sequence number $i_t$. The LTF of the STA with the sequence number $i_t$ is carried on the $t^{th}$ continuous RU, the channel coefficient of the STA with the sequence number $i_t$ on the $k'^{th}$ subcarrier in the $t^{th}$ continuous RU are $$Q^{(t)}_{1\_i_t th} \text{ to } Q^{(t)}_{2\_i_t th}$$

columns in $$H^{(t)}_{k'},$$

and $P_i$, is $$Q^{(t)}_{1\_i_t th} \text{ to } Q^{(t)}_{2\_i_t th}$$

rows in $$P^{(t)}_r.$$

Based on this solution, the AP learns which continuous RUs carry an LTF sent by each STA. Therefore, for any STA, the AP may learn, according to the foregoing equation, a channel coefficient of the STA on a data subcarrier in each RU of a plurality of continuous RUs corresponding to the STA. In this way, it is equivalent that the AP learns of the channel coefficient of the STA, and the AP may demodulate, based on the channel coefficient of the STA, data transmitted by the STA.

According to a fifth aspect, a communication apparatus is provided. The communication apparatus includes a transceiver unit, configured to: receive a trigger frame from an access point AP, where the trigger frame is used to trigger at least one station STA to transmit an uplink physical layer protocol data unit PPDU; and send a PPDU to the AP based on the trigger frame. The PPDU includes a data field and long training fields LTFs used for channel estimation. The data field is carried on a distributed resource unit RU. The distributed RU includes a plurality of subcarrier groups that are distributed in frequency domain. One subcarrier group includes one subcarrier or includes at least two continuous subcarriers. The LTFs are carried on all subcarriers in a first transmission bandwidth. The first transmission bandwidth is a bandwidth corresponding to a distributed RU that is allocated by the AP to the at least one STA for transmitting the uplink PPDU.

According to a sixth aspect, a communication apparatus is provided. The communication apparatus includes a transceiver unit, configured to: receive a trigger frame from an access point AP, where the trigger frame is used to trigger at least one station STA to transmit an uplink physical layer protocol data unit PPDU; and send a physical layer protocol data unit PPDU to the AP based on the trigger frame. The PPDU includes a data field and long training fields LTFs used for channel estimation. The data field is carried on a distributed resource unit RU. The distributed RU includes a plurality of subcarrier groups that are distributed in frequency domain. One subcarrier group includes one subcarrier or includes at least two continuous subcarriers. The LTFs are carried on all subcarriers of a plurality of continuous RUs. The plurality of continuous RUs are continuous RUs corresponding to the distributed RU. Each continuous RU includes a plurality of subcarriers that are continuous in frequency domain.

With reference to the fifth aspect and the sixth aspect, in some implementations, the communication apparatus further includes a processing unit, configured to obtain, based on values of an LTF sequence and a matrix P, the LTFs carried on all the subcarriers, where a quantity of dimensions of the matrix P is determined based on a quantity of STAs triggered by the trigger frame, a maximum quantity of STAs supported by a system, and a maximum number of spatial streams supported by a single STA in the at least one STA.

With reference to the fifth aspect and the sixth aspect, in some implementations, the processing unit is specifically configured to: determine a corresponding row from the matrix P based on an order of the communication apparatus in the at least one STA; and obtain, based on the corresponding row determined from the matrix P and the values of the LTF sequence, the LTFs carried on all the subcarriers.

With reference to the fifth aspect and the sixth aspect, in some implementations, an LTF $X_k$ carried on a $k^{th}$ subcarrier in all the subcarriers and an LTF $X_d$ carried on a $d_{th}$ subcarrier in all the subcarriers respectively satisfy:

$$X_k = P_i \times LTF_k, \text{ and}$$

$$X_d = F \times LTF_d.$$

The $k^{th}$ subcarrier is a data subcarrier, the $d^{th}$ subcarrier is a pilot subcarrier, $P_i$ is first $S_i$ rows in $(i-1)\times N_{ms}+1_{th}$ to $i\times N_{ms^{th}}$ rows in the matrix P, the $(i-1)\times N_{ms}+1_{th}$ to $i\times N_{ms^{th}}$ rows in the matrix P are rows that correspond to a sequence number i of a STA and that are in the matrix P, the matrix P is an $N_{LTF}\times N_{LTF}$ orthogonal mapping matrix, $N_{LTF}$ is a quantity of orthogonal frequency division multiplexing OFDM symbols included in the LTFs, $(N_u\times N_{ms})\le N_{LTF}\le (N_{mu}\times N_{ms})$, $N_u$ is the quantity of the STAs triggered by the trigger frame, $N_{mu}$ is the maximum quantity of the STAs supported by the system, $N_{ms}$ is the maximum number of the spatial streams supported by the single STA, i is the sequence number of the STA, $1\le i\le N_u$, $S_i$ is a number of spatial streams actually transmitted by the STA with the sequence number i, $1\le S_i\le N_{ms}$, $LTF_k$ is a value that corresponds to the $k^{th}$ subcarrier and that is of the LTF sequence, $LTF_d$ is a value that corresponds to the $d^{th}$ subcarrier and that is of the LTF sequence, and F is a first row in the matrix P.

With reference to the fifth aspect and the sixth aspect, in some implementations, i satisfies:

$$i = (T_F - T_L)/T_C + 1.$$

$T_F$ is duration from reception of the trigger frame by the STA to reception of a user information field corresponding to the STA, $T_L$ is duration from the reception of the trigger frame by the STA to reception of a first user information field in the trigger frame, and $T_C$ is a length of the user information field corresponding to the STA.

According to a seventh aspect, a communication apparatus is provided. The communication apparatus includes: a transceiver unit, configured to: send a trigger frame to at least one station STA, where the trigger frame is used to trigger the at least one STA to transmit an uplink physical layer protocol data unit PPDU; and receive respective PPDUs from the at least one STA. One of the PPDUs includes a data field and long training fields LTFs used for channel estimation. The data field is carried on a distributed resource unit RU. The distributed RU includes a plurality of subcarrier groups that are distributed in frequency domain. One subcarrier group includes one subcarrier or includes at least two continuous subcarriers. The LTFs are carried on all subcarriers in a first transmission bandwidth. The first transmission bandwidth is a bandwidth corresponding to a distributed RU that is allocated by an access point AP to the at least one STA for transmitting the uplink PPDU.

With reference to the seventh aspect, in some implementations, the communication apparatus further includes a processing unit, configured to: determine a channel coefficient of a data subcarrier in the first transmission bandwidth based on an LTF received on the data subcarrier in the first transmission bandwidth.

With reference to the seventh aspect, in some implementations, a channel coefficient $H_k$ of a $k^{th}$ subcarrier in all the subcarriers in the first transmission bandwidth satisfies:

$$H_k = \frac{Y_k \times P_r^*}{N_{LTF} \times LTF_k}.$$

The $k^{th}$ subcarrier is the data subcarrier, $Y_k$ is the LTF received by the AP on the $k^{th}$ subcarrier, $N_{LTF}$ is a quantity of OFDM symbols included in the LTFs, $(N_u \times N_{ms}) \le N_{LTF} \le (N_{mu} \times N_{ms})$, $N_u$ is a quantity of STAs triggered by the trigger frame, $N_{mu}$ is a maximum quantity of STAs supported by a system, $N_{ms}$ is a maximum number of spatial streams supported by a single STA, $$P_r^*$$

is a conjugate transposition matrix of $P_r$, $$P_r = \begin{bmatrix} P_1 \\ P_2 \\ M \\ P_{N_u} \end{bmatrix}, \text{ or } P_r^* = \begin{bmatrix} P_1 \\ P_2 \\ M \\ P_{N_u} \end{bmatrix}^*.$$

In an implementation, $P_i$ is first $S_i$ rows in $(i-1)\times N_{ms}+1_{th}$ to $i\times N_{ms^{th}}$ rows in the matrix P, the $(i-1)\times N_{ms}+1_{th}$ to $i\times N_{ms^{th}}$ rows in the matrix P are rows corresponding to a sequence number i of a STA in the matrix P, $1\le S_i \le N_{ms}$, $i\in[1, N_u]$, i is the sequence number of the STA, $S_i$ is a number of spatial streams actually transmitted by the STA with the sequence number i, the matrix P is an $N_{LTF}\times N_{LTF}$ orthogonal mapping matrix, and $LTF_k$ is a value that corresponds to the $k^{th}$ subcarrier and that is of an LTF sequence.

In another implementation, $P_i$ is $I_i+1_{th}$ to $I_i+NUM_{i^{th}}$ rows in the matrix P, $I_i$ is a starting spatial stream sequence number of an $i^{th}$ user, the starting spatial stream sequence number is obtained by sorting all streams of all users on the first transmission bandwidth, $NUM_i$ is a number of streams of the $i^{th}$ user, and $I_i$ and $NUM_i$ are indicated by an SS Allocation field in a User Info Field of the STA i. The matrix P is an $N_{LTF}\times N_{LTF}$ orthogonal mapping matrix, $N_{LTF}$ is a quantity of OFDM symbols included in the LTFs, and $LTF_k$ is a value corresponding to the $k^{th}$ subcarrier in an LTF sequence.

With reference to the seventh aspect, in some implementations, the processing unit is further configured to: determine a channel coefficient of the STA with the sequence number i on each data subcarrier in all the subcarriers in the first transmission bandwidth based on the channel coefficient $H_k$ of the $k^{th}$ subcarrier; and demodulate, based on the channel coefficient of the STA with the sequence number i on each data subcarrier in all the subcarriers in the first transmission bandwidth, data transmitted by the STA with the sequence number i. In an implementation, a channel coefficient of the STA with the sequence number i on the $k^{th}$ subcarrier is $Q_{1\_i^{th}}$ to $Q_{2\_i^{th}}$ columns in $H_k$, and $P_i$ is $Q_{1\_i^{th}}$ to $Q_{2\_i^{th}}$ rows in $P_r$. In another implementation, a channel coefficient of the STA with the sequence number i on the $k^{th}$ subcarrier is $I_i+1_{th}$ to $I_i+NUM_{i^{th}}$ columns in $H_k$.

According to an eighth aspect, a communication apparatus is provided. The communication apparatus includes a transceiver unit, configured to: send a trigger frame to at least one station STA, where the trigger frame is used to trigger the at least one STA to transmit an uplink physical layer protocol data unit PPDU; and receive respective PPDUs from the at least one STA. One of the PPDUs includes a data field and long training fields LTFs used for channel estimation. The data field is carried on a distributed resource unit RU. The distributed RU includes a plurality of subcarrier groups that are distributed in frequency domain. One subcarrier group includes one subcarrier or includes at least two continuous subcarriers. The LTFs are carried on all subcarriers of a plurality of continuous RUs. The plurality of continuous RUs are continuous RUs corresponding to the distributed RU. Each continuous RU includes a plurality of subcarriers that are continuous in frequency domain.

With reference to the eighth aspect, in some implementations, the communication apparatus further includes a processing unit, configured to determine, based on LTFs received on all data subcarriers in a $t^{th}$ continuous RU in a second transmission bandwidth, a channel coefficient of each data subcarrier in all the subcarriers of the $t^{th}$ continuous RU, where the second transmission bandwidth is a bandwidth corresponding to a plurality of continuous RUs that are allocated by an access point AP to the at least one STA for transmitting respective LTFs.

With reference to the eighth aspect, in some implementations, a channel coefficient $$H_{k'}^{(t)}$$

of a $k'^{th}$ subcarrier in all the subcarriers of the $t^{th}$ continuous RU satisfies:

$$H_{k'}^{(t)} = \frac{Y_{k'} \times (P_r^{(t)})^*}{N_{LTF} \times LTF_{k'}^{(t)}}.$$

The $k'^{th}$ subcarrier is the data subcarrier, $Y_{k'}$ is the LTF received by the AP on the $k'^{th}$ subcarrier, $N_{LTF}$ is a quantity of OFDM symbols included in the LTFs, $(N_u \times N_{ms}) \le N_{LTF} \le (N_{mu} \times N_{ms})$, $N_u$ is a quantity of STAs triggered by the trigger frame, $N_{mu}$ is a maximum quantity of STAs supported by a system, $N_{ms}$ is a maximum number of spatial streams supported by a single STA, $$(P_r^{(t)})^*$$

is a conjugate transposition matrix of $$P_r^{(t)},$$

$$P_r^{(t)} = \begin{bmatrix} P_{1_t} \\ P_{2_t} \\ M \\ P_{u_t} \end{bmatrix},$$

and u is a quantity of STAs whose corresponding LTFs are carried on the $t^{th}$ continuous RU.

In an implementation, $P_{i_t}$ is first $S_{i_t}$ rows in $(i_t-1)\times N_{ms}+1_{th}$ to $i_t\times N_{ms^{th}}$ rows in the matrix P, the $(i_t-1)\times N_{ms}+1_{th}$ to $i_t\times N_{ms^{th}}$ rows in the matrix P are rows corresponding to a sequence number $i_t$ of a STA in the matrix P, $i_t \in [1, N_u]$, $i_t$ is the sequence number of the STA that uses the $t^{th}$ continuous RU to send the LTF, $S_{i_t}$ is a number of spatial streams actually transmitted by the STA with the sequence number $i_t$, $1 \le S_{i_t} \le N_{ms}$, the matrix P is an $N_{LTF}\times N_{LTF}$ orthogonal mapping matrix, and $$LTF_{k'}^{(t)}$$

is a value that corresponds to the $k'^{th}$ subcarrier of the $t^{th}$ RU and that is of an LTF sequence. In another implementation, $P_{i_t}$ is $I_{i_t}+1^{th}$ to $I_{i_t}+NUM_{i_t^{th}}$ rows in the matrix P, $I_{i_t}$ is a starting spatial stream sequence number of an $i_{t^{th}}$ user, $NUM_{i_t}$ is a number of streams of the $i_{t^{th}}$ user, and $I_{i_t}$ and $NUM_{i_t}$ are indicated by an SS Allocation field in a User Info Field of the STA $i_t$. $i_t \in [1, N_u]$, $i_t$ is a sequence number of a STA that uses the $t^{th}$ continuous RU to send the LTF, $N_u$ is a quantity of the at least one STA triggered by the trigger frame, the matrix P is an $N_{LTF}\times N_{LTF}$ orthogonal mapping matrix, and $$LTF_{k'}^{(t)}$$

is a value that corresponds to the $k'^{th}$ subcarrier of the $t^{th}$ RU and that is of an LTF sequence. With reference to the eighth aspect, in some implementations, the processing unit is further configured to: determine, based on the channel coefficient $H_{k'}$ of the $k'^{th}$ subcarrier, a channel coefficient of the STA with the sequence number $i_t$ on each data subcarrier of each continuous RU in a plurality of continuous RUs corresponding to the STA with the sequence number $i_t$; and demodulate, based on the channel coefficient of the STA with the sequence number $i_t$ on each data subcarrier of each continuous RU in the plurality of continuous RUs corresponding to the STA with the sequence number $i_t$, data transmitted by the STA with the sequence number $i_t$. The LTF of the STA with the sequence number $i_t$ is carried on the $t^{th}$ continuous RU, the channel coefficient of the STA with the sequence number $i_t$ on the $k'^{th}$ subcarrier in the $t^{th}$ continuous RU are $$Q_{1\_i_t th}^{(t)} \text{ to } Q_{2\_i_t th}^{(t)}$$

columns in $$H_{k'}^{(t)},$$

and $P_{i_t}$ is $$Q_{1\_i_t th}^{(t)} \text{ to } Q_{2\_i_t th}^{(t)}$$

rows in $$P_r^{(t)}.$$

According to a ninth aspect, an apparatus is provided, including a processor. The processor is coupled to a memory, and may be configured to execute instructions in the memory, so that the apparatus performs the method according to any one of the first aspect to the fourth aspect or the possible implementations of the first aspect to the fourth aspect. Optionally, the apparatus further includes the memory. Optionally, the apparatus further includes an interface circuit, and the processor is coupled to the interface circuit.

According to a tenth aspect, a processor is provided, including an input circuit, an output circuit, and a processing circuit. The processing circuit is configured to: receive a signal by using the input circuit, and transmit a signal by using the output circuit, so that the processor performs the method according to any one of the first aspect to the fourth aspect or the possible implementations of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of this application.

According to an eleventh aspect, a processing apparatus is provided, including a processor and a memory. The processor is configured to read instructions stored in the memory, and may receive a signal by using a receiver, and transmit a signal by using a transmitter, to perform the method according to any one of the first aspect to the fourth aspect or the possible implementations of the first aspect to the fourth aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, such as a read-only memory (read-only memory, ROM). The memory and the processor may be integrated into a same chip, or may be separately disposed on different chips. A type of the memory and a manner in which the memory and the processor are disposed are not limited in this embodiment of this application.

The processing apparatus according to the eleventh aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to a twelfth aspect, a computer program product is provided. The computer program product includes a computer program (which may also be referred to as code or instructions). When the computer program is run, a computer is enabled to perform the method according to any one of the first aspect to the fourth aspect or the possible implementations of the first aspect to the fourth aspect.

According to a thirteenth aspect, a computer-readable medium is provided. The computer-readable medium stores a computer program (also referred to as code or instructions). When the computer program is run on a computer, the computer is enabled to perform the method according to any one of the first aspect to the fourth aspect or the possible implementations of the first aspect to the fourth aspect.

According to a fourteenth aspect, this application provides a chip system. The chip system includes a processor and an interface, configured to support a communication apparatus in implementing a function in any one of the first aspect to the fourth aspect or the possible implementations of the first aspect to the fourth aspect. In a possible design, the chip system further includes a memory, and the memory is configured to store information and data that are used for the foregoing communication apparatus. The chip system may include a chip, or may include a chip and another discrete device.

According to a fifteenth aspect, this application provides a functional entity. The functional entity is configured to implement the method according to any one of the first aspect to the fourth aspect or the possible implementations of the first aspect to the fourth aspect.

According to a sixteenth aspect, a communication system is provided, including the foregoing AP. Optionally, the communication system may further include the foregoing STA.

BRIEF DESCRIPTION OF DRAWINGS

FIG. 11(*a*) is a schematic diagram of another frame structure of a trigger frame according to an embodiment of this application;

FIG. 11(*b*) is a schematic diagram of a frame structure of a common information part of a trigger frame according to an embodiment of this application;

FIG. 11(*c*) is a schematic diagram of a frame structure of a user information part of a trigger frame according to an embodiment of this application;

DESCRIPTION OF EMBODIMENTS

The following describes technical solutions of this application with reference to the accompanying drawings.

The technical solutions in embodiments of this application may be applied to various communication systems, for example, a wireless local area network (wireless local area network, WLAN) communication system, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a $5^{th}$ generation ($5^{th}$ generation, 5G) system, a new radio (new radio, NR) system, and a future $6^{th}$ generation ($6^{th}$ generation, 6G) system.

For example, the following describes an application scenario in embodiments of this application and a method in embodiments of this application by using a WLAN system as an example.

Specifically, embodiments of this application may be applied to the WLAN system, and embodiments of this application may be applicable to any protocol in the Institute of Electrical and Electronics Engineers (institute of electrical and electronics engineers, IEEE) 802.11 series protocols used by the WLAN, for example, 802.11 a/b/g, 802.11n, 802.11 ac, 802.11 ax, or 802.11be. The method provided in this application may be implemented by a communication device in a wireless communication system or a chip or a processor in a communication device. Correspondingly, the communication device supports communication according to the IEEE 802.11 series protocols.

Figure 1:
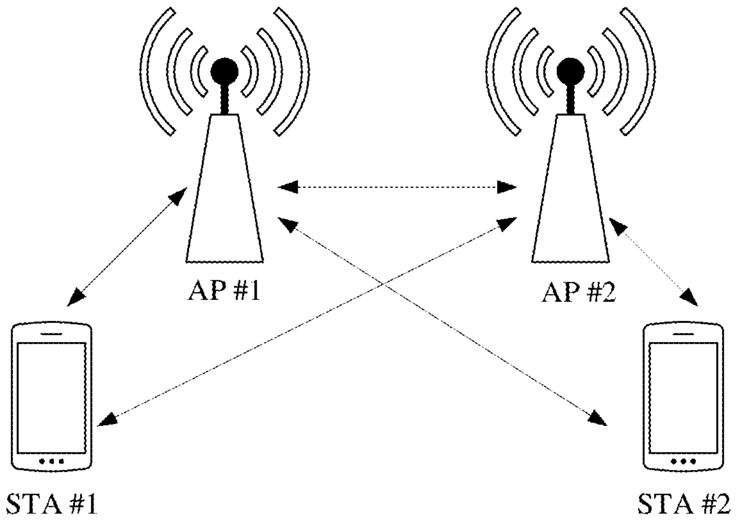
FIG. 1 is a schematic diagram of a communication system according to an embodiment of this application.

For ease of understanding embodiments of this application, a communication system shown in FIG. 1 is first used as an example to describe in detail a communication system applicable to embodiments of this application.

A scenario system shown in FIG. 1 may be a WLAN system. The WLAN system in FIG. 1 may include one or more access point (access point, AP) stations and one or more non-access point stations (non-access point stations, non-AP STAs). For ease of description, an access point station is referred to as an access point (AP), and a non-access point station is referred to as a station (STA) in this specification. The AP is, for example, an AP #1 and an AP #2 in FIG. 1, and the STA is, for example, a STA #1 and a STA #2 in FIG. 1.

The AP may be an access point used by a terminal device (such as a mobile phone) to access a wired (or wireless) network, and is mainly deployed at home, in a building, and in a park. A typical coverage radius is tens of meters to a hundred meters. Certainly, the access point may alternatively be deployed outdoors. The access point is equivalent to a bridge that connects the wired network and the wireless network. A main function of the access point is to connect various wireless network clients together and then connect the wireless network to the Ethernet. Specifically, the AP may be a terminal device (such as a mobile phone) or a network device (such as a router) with a wireless-fidelity (wireless-fidelity, Wi-Fi) chip. The access point may be a device that supports the 802.11be standard and the 802.11be next-generation standard. The access point may alternatively be a device that supports multiple WLAN standards of the 802.11 family such as 802.11 ax, 802.11 ac, 802.11n, 802.11g, 802.11b, and 802.11a.

The access point may include a processor, a transmitter, and a receiver. The processor is configured to control and manage an action of the access point. The transmitter is configured to send information. The receiver is configured to receive information.

The STA may be a wireless communication chip, a wireless sensor, a wireless communication terminal, or the like, and may also be referred to as user equipment. For example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, a computer supporting a Wi-Fi communication function, or the like. Optionally, the station may support the 802.11be standard and the 802.11be next-generation standard. The station may alternatively support multiple WLAN standards of the 802.11 family such as 802.11 ax, 802.11 ac, 802.11n, 802.11g, 802.11b, and 802.11a.

The STA may include a processor, a transmitter, and a receiver. The processor is configured to control and manage an action of the access point. The transmitter is configured to send information. The receiver is configured to receive information.

For example, the AP and the STA may be devices used in the internet of vehicles, internet of things nodes, sensors, or the like in the internet of things (IoT, internet of things), smart cameras, smart remote controls, smart water or electricity meters, or the like in smart home, sensors in smart city, and the like.

The access point and the station in embodiments of this application may also be collectively referred to as communication apparatuses. The communication apparatus may include a hardware structure and a software module, and the foregoing functions are implemented in a form of a hardware structure, a software module, or a combination of the hardware structure and the software module. A function in the foregoing functions may be performed in a form of a hardware structure, a software module, or a combination of the hardware structure and the software module.

Figure 2:
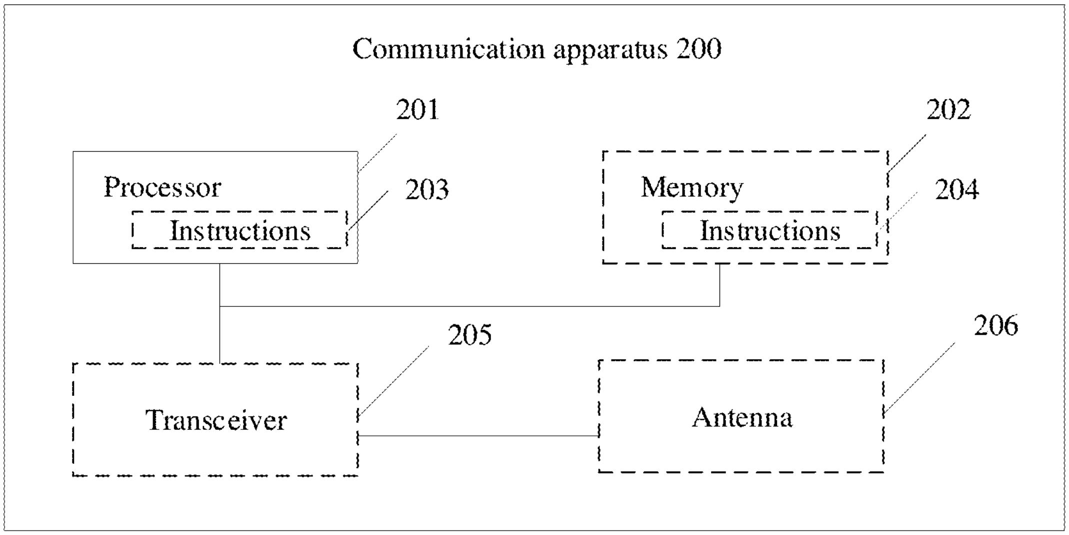
FIG. 2 is a schematic diagram of a structure of a communication apparatus according to an embodiment of this application.

FIG. 2 is a schematic diagram of a structure of a communication apparatus according to an embodiment of this application. As shown in FIG. 2, the communication apparatus 200 may include a processor 201 and a transceiver 205, and optionally further includes a memory 202. The communication apparatus may be used as an apparatus for sending a trigger frame and a PPDU in this application, or may be used as an apparatus for receiving a trigger frame and a PPDU in this application.

The transceiver 205 may be referred to as a transceiver unit, a transceiver machine, a transceiver circuit, or the like, and is configured to implement a transceiver function. The transceiver 205 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

The memory 202 may store a computer program, software code, or instructions 204, where the computer program, the software code, or the instructions 204 may also be referred to as firmware. The processor 201 may control a MAC layer and a PHY layer by running a computer program, software code, or instructions 203 in the processor 201, or by invoking the computer program, the software code, or the instructions 204 stored in the memory 202, to implement a method for transmitting a PPDU provided in the following embodiments of this application. The processor 201 may be a central processing unit (central processing unit, CPU), and the memory 202 may be, for example, a read-only memory (read-only memory, ROM), or a random access memory (random access memory, RAM).

The processor 201 and the transceiver 205 described in this application may be implemented in an integrated circuit (integrated circuit, IC), an analog IC, a radio frequency integrated circuit RFIC, a mixed-signal IC, an application-specific integrated circuit (application specific integrated circuit, ASIC), a printed circuit board (printed circuit board, PCB), an electronic device, or the like.

The communication apparatus 200 may further include an antenna 206. The modules included in the communication apparatus 200 are merely examples for description, and are not limited in this application.

As described above, the communication apparatus 200 described in the foregoing embodiment may be an AP or a STA. However, the scope of the communication apparatus described in this application is not limited thereto, and the communication apparatus may not be limited to the structure shown in FIG. 2.

The AP may have a plurality of antennas/radio frequencies, or may have a single antenna/radio frequency. The antenna/radio frequency is used to send/receive a data packet. In an implementation, an antenna or a radio frequency part of the AP may be separated from a main body of the AP, that is, may be remotely disposed. In an implementation, the STA may have a single antenna/radio frequency, or may have a plurality of antennas/radio frequencies, and may be a device with more than two antennas. The antenna/radio frequency is used to send/receive a data packet. In an implementation, an antenna or a radio frequency part of the STA may be separated from a main body of the STA, that is, may be remotely disposed.

The communication apparatus in this application may alternatively be an independent device or may be a part of a large device. For example, the communication apparatus may be implemented in the following form:

(1) an independent integrated circuit IC, a chip, a chip system, or a subsystem; (2) a set including one or more ICs, where optionally, the set of ICs may also include a storage component for storing data and instructions; (3) a module that can be built in other devices; (4) a receiver, an intelligent terminal, a wireless device, a handheld device, a mobile unit, a vehicle-mounted device, a cloud device, an artificial intelligence device, or the like; or (5) others.

Figure 3:
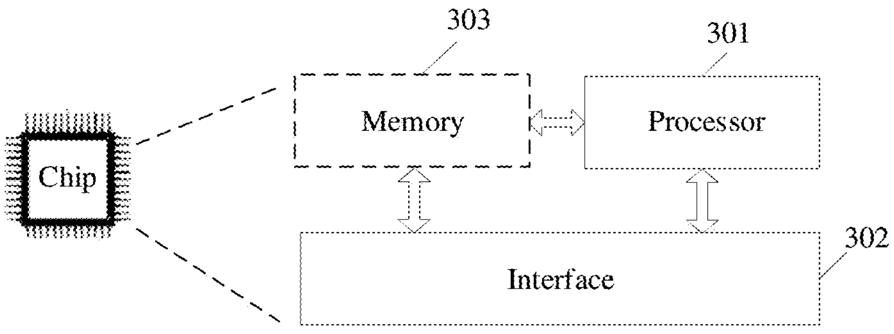
FIG. 3 is a schematic diagram of a structure of a chip according to an embodiment of this application.

For the communication apparatus implemented in the form of a chip or a chip system, refer to a schematic diagram of a structure of a chip shown in FIG. 3. The chip shown in FIG. 3 includes a processor 301 and an interface 302. There may be one or more processors 301, and there may be a plurality of interfaces 302. The interface 302 is configured to send or receive a signal. Optionally, the chip or the chip system may include a memory 303. The memory 303 is configured to store program instructions and data that are used for the chip or the chip system.

Embodiments of this application do not limit the protection scope and applicability of the claims. A person skilled in the art may adaptively change functions and deployments of elements in this application, or omit, replace, or add various processes or components as appropriate without departing from the scope of embodiments of this application.

Orthogonal frequency division multiple access (orthogonal frequency division multiple access, OFDMA) may be used between the AP and the STA. In an OFDMA transmission scenario, a WLAN protocol divides an entire bandwidth into several resource units (resource units, RUs), and a PPDU may be transmitted between an AP and a STA on an allocated RU. According to the 802.11 ax standard, for a bandwidth of 20 MHz, 40 MHz, 80 MHz, or 160 MHz, the bandwidth may be divided into a plurality of types of RUs of various sizes: a 26-tone RU, 52-tone RU, 106-tone RU, 242-tone RU, 484-tone RU, a 996-tone RU, or the like. Herein, tone represents a subcarrier. For example, a 26-tone RU represents an RU including 26 continuous subcarriers, or represents an RU including a group of 13 continuous subcarriers and another group of 13 continuous subcarriers.

The resource allocation manner in which a bandwidth is divided into several resource units is still used in the 802.11be standard. In the 802.11be standard, locations of some data subcarriers and pilot subcarriers are changed based on the 802.11 ax standard. For cases of 20 MHz, 40 MHz, 80 MHz, 160 MHz, and 320 MHz, the spectrum bandwidth may be divided into a plurality of types of RUs of various sizes: a 26-tone RU, a 52-tone RU, a 106-tone RU, a 242-tone RU, a 484-tone RU, a 996-tone RU, and the like. The 26-tone RU may be allocated to one STA for use. Generally, an RU greater than or equal to 242-tone may be allocated to one or more STAs for use. The RU on the bandwidth includes data (data) subcarriers and pilot (pilot) subcarriers. The data subcarrier is used to carry data information. The pilot subcarrier transmits a fixed value, and is used by a receive end to estimate a phase and perform phase correction.

Figure 4:
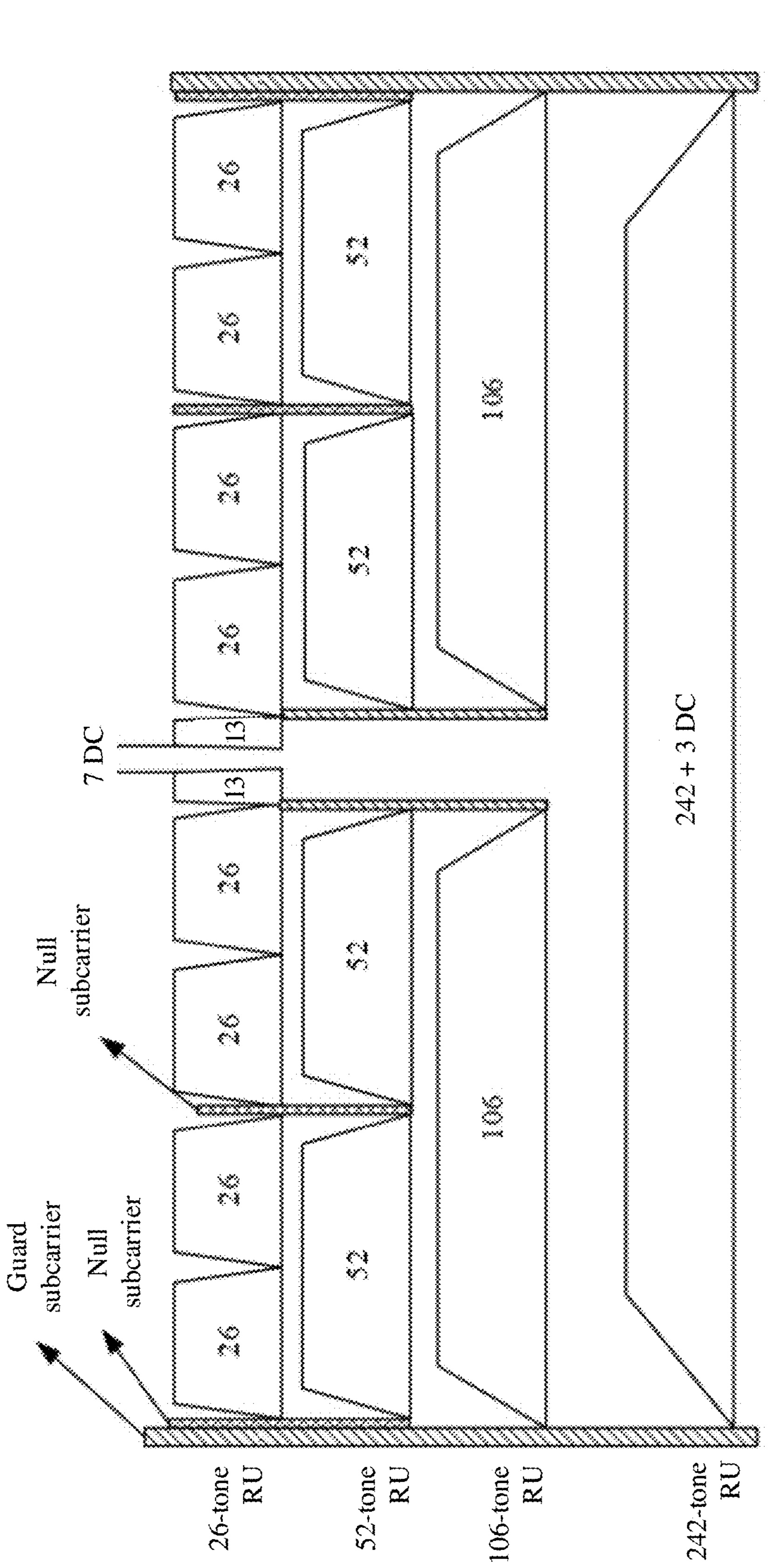
FIG. 4 is a schematic diagram of a possible resource unit allocation manner in a case of 20 MHz.

When the bandwidth is 20 MHz, as shown in FIG. 4, FIG. 4 is a schematic diagram of a possible resource unit allocation manner in a case of a 20 MHz bandwidth. The entire 20 MHz bandwidth may include an entire 242-tone RU or may include various combinations of 26-tone RUs, 52-tone RUs, or 106-tone RUs. In addition to the RUs for data transmission, some guard (Guard) subcarriers, null subcarriers, or direct current (direct current, DC) subcarriers are further included.

Figure 5:
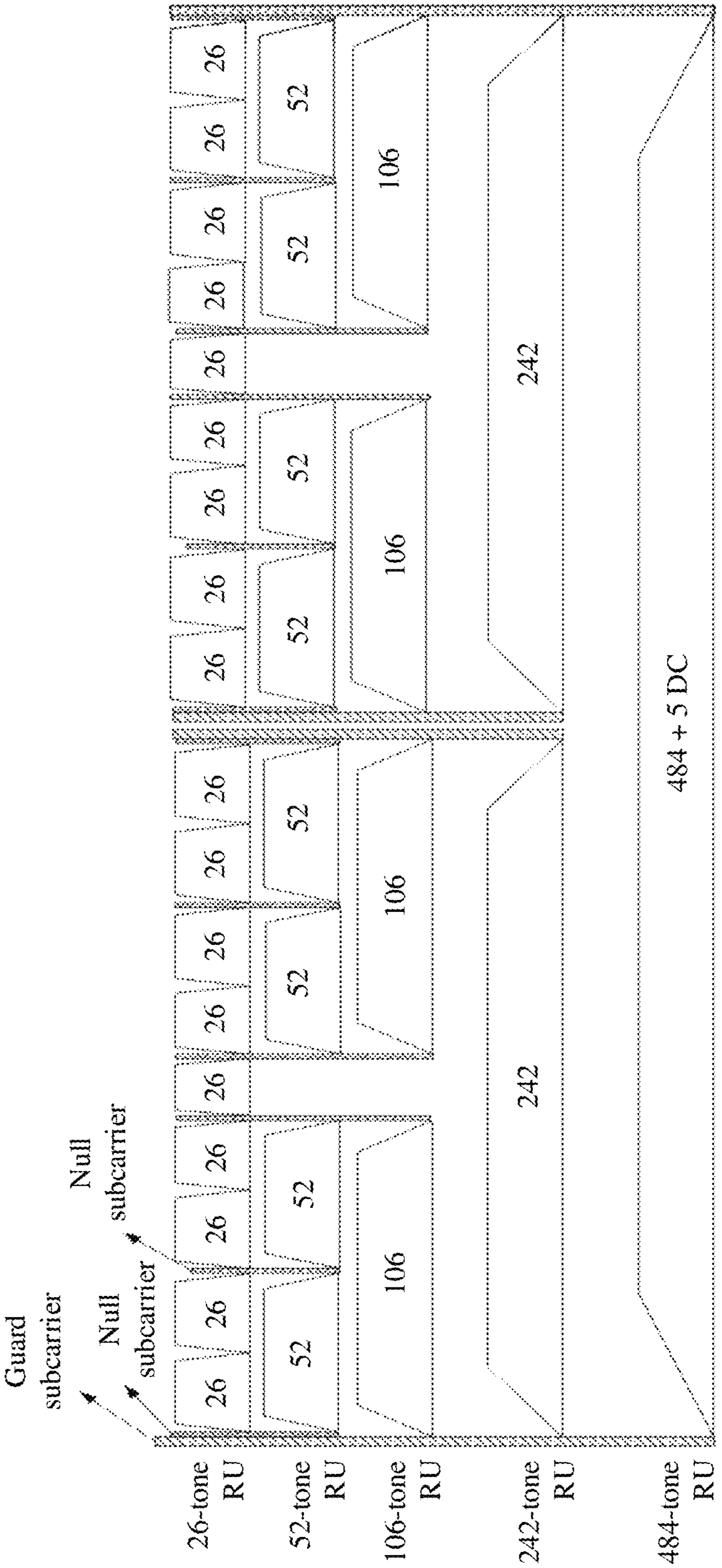
FIG. 5 is a schematic diagram of a possible resource unit allocation manner in a case of 40 MHz.

When the bandwidth is 40 MHz, FIG. 5 is a schematic diagram of a possible resource unit allocation manner in a case of a 40 MHz bandwidth. The entire bandwidth is approximately equivalent to replications of a 20 MHz tone plan. The entire 40 MHz bandwidth may include an entire 484-tone RU, or may include various combinations of 26-tone RUs, 52-tone RUs, 106-tone RUs, or 242-tone RUs.

Figure 6:
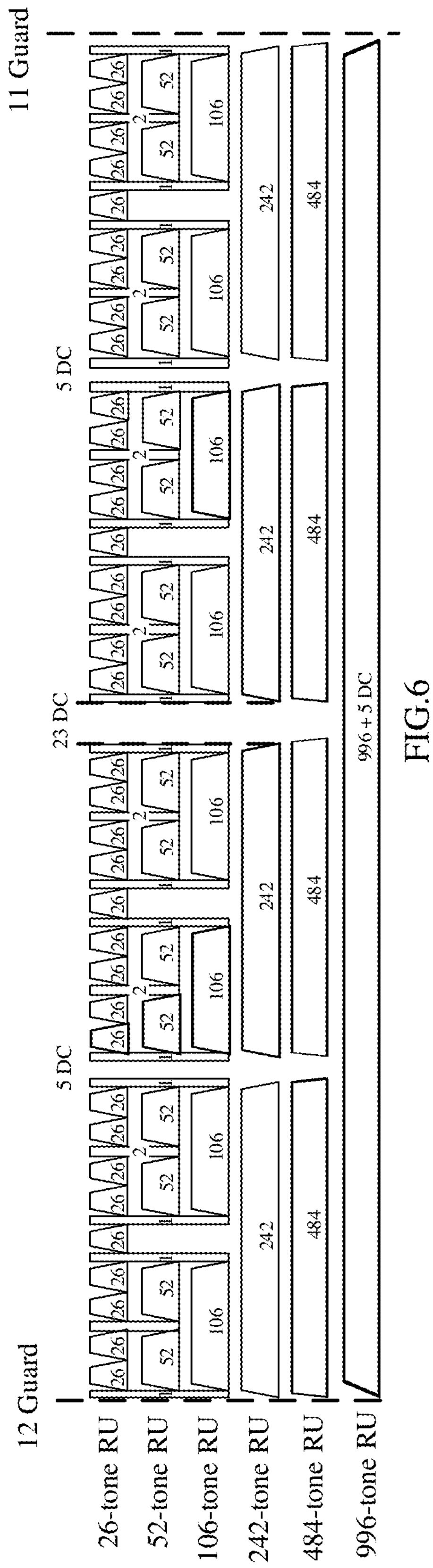
FIG. 6 is a schematic diagram of a possible resource unit allocation manner in a case of 80 MHz.

FIG. 6 is a schematic diagram of a possible resource unit allocation manner in a case of an 80 MHz bandwidth. When the channel bandwidth is 80 MHz, the entire bandwidth is approximately equivalent to two replications of a 40 MHz tone plan. The entire 80 MHz bandwidth may include an entire 996-tone RU, or may include various combinations of 484-tone RUs, 242-tone RUs, 106-tone RUs, 52-tone RUs, or 26-tone RUs.

When the bandwidth is 160 MHz or 80+80 MHz, the entire bandwidth may be considered as two replications of an 80 MHz tone plan. The entire bandwidth may include an entire 2×996-tone RU, or may include various combinations of 26-tone RUs, 52-tone RUs, 106-tone RUs, 242-tone RUs, 484-tone RUs, or 996-tone RUs. The 2×996-tone RU is an RU including two continuous 996-tone RU subcarriers.

Similarly, when the bandwidth is 320 MHz, the entire bandwidth may be considered as two replications of a 160 MHz tone plan. The entire bandwidth may include an entire 4×996-tone RU, or may include various combinations of 26-tone RUs, 52-tone RUs, 106-tone RUs, 242-tone RUs, 484-tone RUs, or 996-tone RUs.

The 26-tone RU, the 52-tone RU, the 106-tone RU, the 242-tone RU, and the 484-tone RU are RUs including a plurality of continuous subcarriers, or RUs including two continuous subcarrier groups (for example, a $5^{th}$ 26-tone RU in a first row in FIG. 4 includes two 13-tone and seven DC tones in the middle). In this application, such RUs may be understood as continuous RUs.

Currently, there is a low power indoor (low power indoor, LPI) communication manner, which imposes strict restrictions on a maximum transmit power and a maximum frequency spectral density. A transmit power of a device is limited by both a maximum power and a maximum power spectral density. The transmit power cannot exceed the maximum power, and a transmit power spectral density cannot exceed the maximum power spectral density. Because the transmit power of the device=a power spectral density x a transmit bandwidth, when the power spectral density is specified, the maximum transmit power of the device increases with the increase of the transmit bandwidth. It is known that an average transmit power of each subcarrier=the transmit power/a number of valid subcarriers. Therefore, when the power spectral density is specified, to increase the average transmit power of each subcarrier, the transmit power may be increased, and to increase the transmit power, the transmit bandwidth may be increased.

In a manner, subcarriers on one continuous RU may be discretely distributed to a plurality of continuous RUs for sending. For example, considering that one continuous 26-tone RU (denoted as a continuous RU #1) is allocated to a user, subcarriers of the continuous RU #1 may be discretely distributed to two continuous 26-tone RUs for sending. For example, 13 subcarriers at odd-numbered locations are selected on the continuous RU #1, and subcarriers at even-numbered locations are selected on another continuous 26-tone RU (denoted as a continuous RU #2). An RU formed by the 13 subcarriers at the odd-numbered locations on the continuous RU #1 and the 13 subcarriers at the even-numbered locations on the continuous RU #2 may be referred to as a distributed RU. It may be learned that, under a same power spectral density, a transmit bandwidth of a distributed RU is twice a transmit bandwidth of a continuous RU, and a transmit power is also doubled. However, a quantity of subcarriers is still 26, and therefore an average power on each subcarrier is doubled.

However, this causes a problem that an original manner of transmitting LTFs on continuous RUs is no longer applicable to distributed RUs. Specifically, after a continuous RU is allocated to a user, the user transmits data and LTFs on all subcarriers of the continuous RU. Because a PAPR of the LTFs in this transmission manner has been considered during LTF sequence design, the PAPR of the LTFs in this transmission manner can be ensured. However, because subcarriers included in a distributed RU are not continuous, and a quantity of the subcarriers included in the distributed RU is not necessarily equal to a quantity of subcarriers included in the continuous RU, if LTFs obtained by using an existing LTF sequence are transmitted on all the subcarriers of the distributed RU, a PAPR of the LTFs cannot be ensured.

In view of this, this application provides a method for transmitting a PPDU, to increase a data transmit power and ensure a PAPR of an LTF, thereby ensuring system performance.

Before the method provided in this application is described, related concepts in this application are first described.

1. Continuous RU (Continuous RU, CRU)

The continuous RU is an RU including a plurality of continuous subcarriers, or the continuous RU is an RU including two continuous subcarrier groups. A plurality of subcarriers included in each continuous subcarrier group are continuous. The two continuous subcarrier groups are only spaced apart by one or more of a guard subcarrier, a null subcarrier, or a direct current subcarrier. All RUs supported in the 802.11 ax may be understood as continuous RUs. It should be understood that the continuous RUs may also have other names, for example, a regular RU. Names of the continuous RUs are not limited in this application.

It should be understood that the continuous RU may include a plurality of continuous subcarriers, or the continuous RU may include two continuous subcarrier groups, and the two continuous subcarrier groups are discontinuous. For example, a 26-tone RU including a group of 13 continuous subcarriers and another group of 13 continuous subcarriers is a continuous RU. Similarly, a 996-tone RU including a group of 484 continuous subcarriers and another group of 484 continuous subcarriers is a continuous RU. Such RUs may also be referred to as special continuous RUs or generalized continuous RUs. The continuous RUs in this application also include special continuous RUs or generalized continuous RUs.

In this application, a continuous RU including K subcarriers is referred to as a continuous K-tone RU. For example, a continuous 26-tone RU is a continuous RU including 26 subcarriers. In other words, a concept of the continuous K-tone RU is the same as a concept of a K-tone RU in the existing 802.11ax standard.

2. Distributed RU (Distribute RU, DRU)

The distributed RU includes a plurality of subcarrier groups that are distributed in frequency domain. In other words, the distributed RU includes a plurality of subcarrier groups, and any two subcarrier groups are distributed in frequency domain. One subcarrier group includes one subcarrier, or one subcarrier group includes at least two continuous subcarriers. In other words, one subcarrier group includes one subcarrier or includes a plurality of continuous subcarriers. The distributed RU may also be referred to as a discontinuous RU (discontinuous RU, DRU). Certainly, in another embodiment, the distributed RU may have another name. The name of the distributed RU is not limited in this application. In this application, a quantity of subcarrier groups included in one distributed RU is greater than or equal to 2.

In this application, a distributed RU including K subcarriers is referred to as a distributed K-tone RU. For example, a distributed 26-tone RU refers to a distributed RU including 26 subcarriers. For a value of K, refer to a value of K used for a continuous RU. Certainly, the value of K may be different from the value of K used for the continuous RU. For example, when the bandwidth is 20 MHz, 20 MHz may include a combination of one or more of distributed 26-tone RUs, distributed 52-tone RUs, distributed 106-tone RUs, or distributed 242-tone RUs.

In this application, one distributed RU and another distributed RU may form a distributed multi-RU (multi-RU, MRU), and the distributed MRU can be allocated to one or more stations. For example, a distributed 242-tone RU and a distributed 484-tone RU may form a distributed 484+242-tone RU.

It should be noted that the special continuous RUs or the generalized continuous RUs mentioned above do not belong to the distributed RU in this embodiment of this application. For example, in the foregoing example, the 26-tone RU including a group of 13 continuous subcarriers and another group of 13 continuous subcarriers is not the distributed RU defined in this application, but a special continuous RU.

In some examples, quantities of subcarriers included in any two of the plurality of subcarrier groups included in the distributed RU may be the same or may be different. For example, a quantity of subcarriers in each subcarrier group may be 1. For another example, quantities of subcarriers in some subcarrier groups are 1, and quantities of subcarriers in the other subcarrier groups are 2. In other words, one distributed RU may include four subcarrier groups, and quantities of subcarriers in the four subcarrier groups may be 1, 1, 2, and 2 sequentially.

In some examples, when a quantity of subcarrier groups included in the distributed RU is greater than or equal to 3, in the plurality of distributed subcarrier groups included in the distributed RU, quantities of subcarriers between every two adjacent subcarrier groups may be the same or may be different. The every two adjacent subcarrier groups refer to two adjacent subcarrier groups of one distributed RU.

For example, for a distributed RU including three distributed subcarrier groups (denoted as a subcarrier group #1, a subcarrier group #2, and a subcarrier group #3), the subcarrier group #1 is adjacent to the subcarrier group #2, and the subcarrier group #2 is adjacent to the subcarrier group #3. In other words, frequencies of subcarriers included in the subcarrier group #1 are less than frequencies of subcarriers included in the subcarrier group #2, and frequencies of subcarriers included in the subcarrier group #2 are less than frequencies of subcarriers included in the subcarrier group #3. In addition, a subcarrier with a largest frequency in the subcarrier group #1 and a subcarrier with a smallest frequency in the subcarrier group #2 are discontinuous in frequency (or a frequency domain). In other words, there is K1 ($K1 \geq 1$) subcarriers for separating the two subcarriers, or there is also K1 subcarriers between the two subcarriers. A subcarrier with a largest frequency in the subcarrier group #2 and a subcarrier with a smallest frequency in the subcarrier group #3 are discontinuous in frequency (or a frequency domain). In other words, there is K2 ($K2 \geq 1$) subcarriers for separating the two subcarriers, or there is also K2 subcarriers between the two subcarriers. K1 may be equal to K2, or may not be equal to K2.

For another example, for a distributed RU including four distributed subcarrier groups (denoted as a subcarrier group #1, a subcarrier group #2, a subcarrier group #3, and a subcarrier group #4), the subcarrier group #1 is adjacent to the subcarrier group #2, the subcarrier group #2 is adjacent to the subcarrier group #3, and the subcarrier group #3 is adjacent to the subcarrier group #4. In addition, a subcarrier with a largest frequency in the subcarrier group #1 and a subcarrier with a smallest frequency in the subcarrier group #2 are separated by K1 (K1≥1) subcarriers. A subcarrier with a largest frequency in the subcarrier group #2 and a subcarrier with a smallest frequency in the subcarrier group #3 are separated by K2 (K2≥1) subcarriers. A subcarrier with a largest frequency in the subcarrier group #3 and a subcarrier with a smallest frequency in the subcarrier group #4 are separated by K3 (K3≥1) subcarriers. Two or three of K1, K2, and K3 may be equal, or any two of them are unequal.

Figure 7:
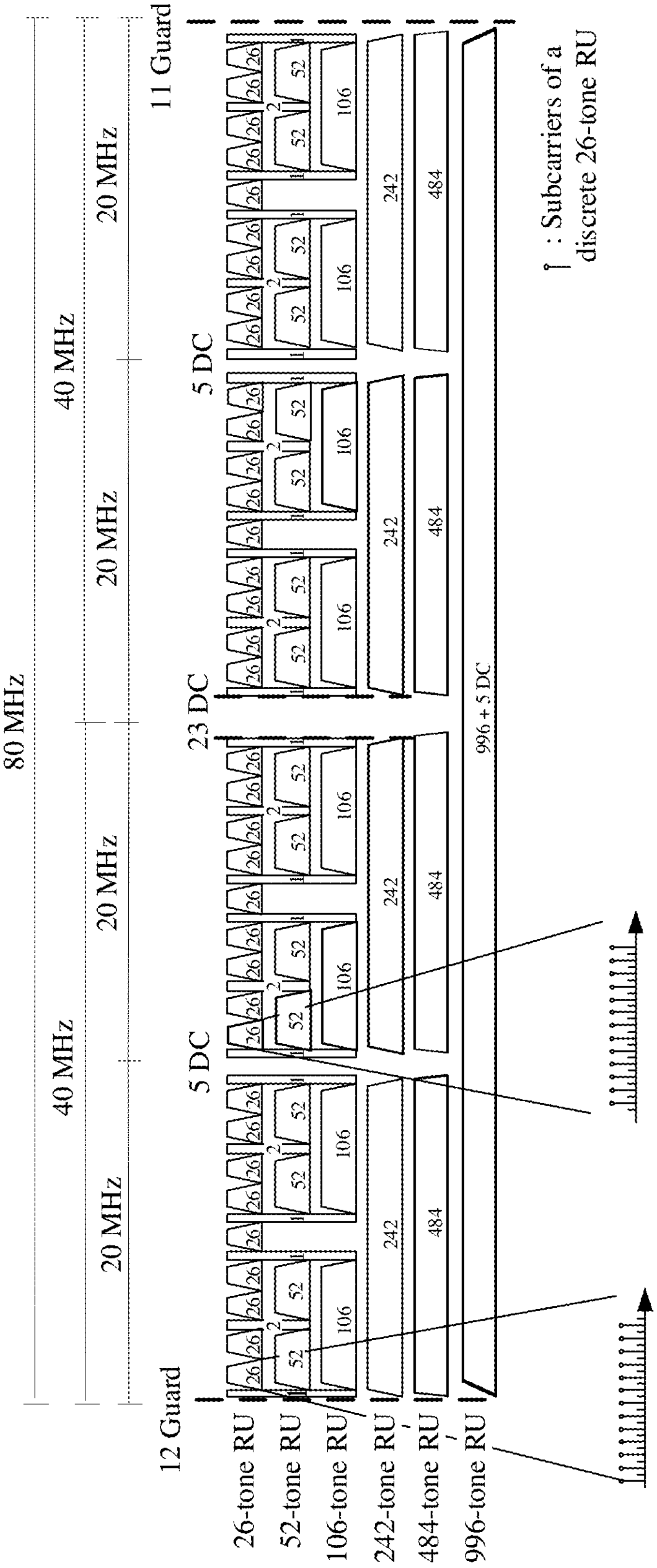
FIG. 7 is a schematic diagram of a distributed RU.

For example, FIG. 7 is a schematic diagram of a distributed RU. As shown in FIG. 7, a distributed 26-tone RU is distributed in a 40 MHz frequency range. The distributed 26-tone RU includes 13 subcarriers in a first 20 MHz frequency range and 13 subcarriers in a second 20 MHz frequency range.

Figure 8:
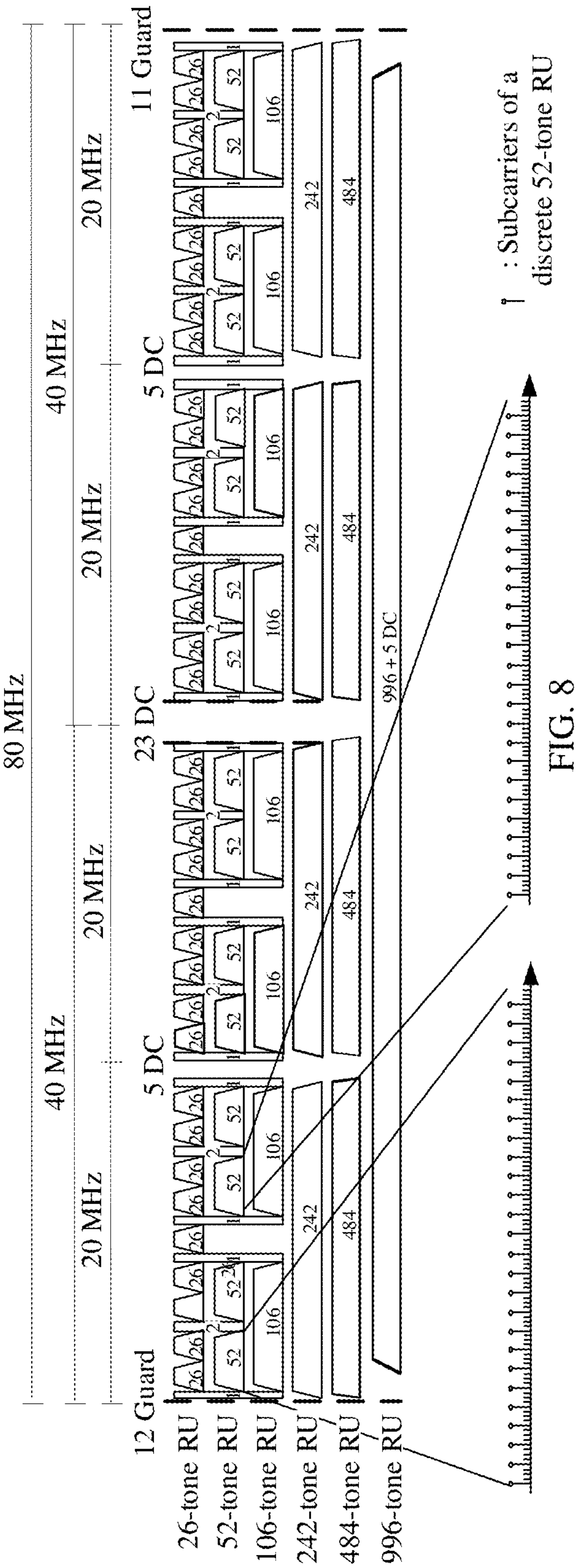
FIG. 8 is a schematic diagram of another distributed RU.

For example, FIG. 8 is a schematic diagram of a distributed RU. As shown in FIG. 8, a distributed 52-tone RU is distributed in a 20 MHz frequency range. The distributed 52-tone RU includes 26 subcarriers in a first continuous 52-tone RU and 26 subcarriers in a third continuous 52-tone RU in a first 20 MHz frequency range.

Figure 9:
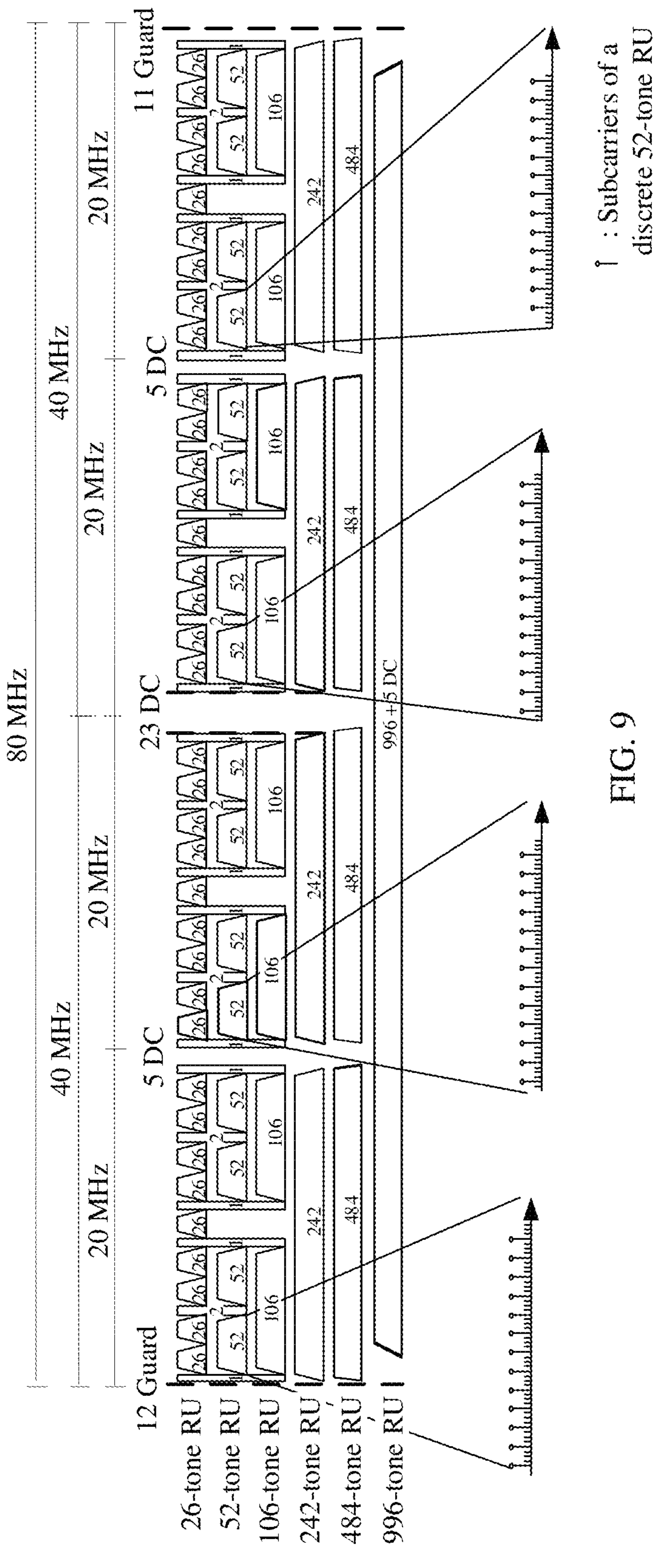
FIG. 9 is a schematic diagram of still another distributed RU.

For example, FIG. 9 is a schematic diagram of a distributed RU. As shown in FIG. 9, a distributed 52-tone RU is distributed in an 80 MHz frequency range. The distributed 52-tone RU includes 13 subcarriers in a first continuous 52-tone RU in a first 20 MHz frequency range, 13 subcarriers in a first continuous 52-tone RU in a second 20 MHz frequency range, 13 subcarriers in a first continuous 52-tone RU in a third 20 MHz frequency range, and 13 subcarriers in a first continuous 52-tone RU in a fourth 20 MHz frequency range.

Optionally, the distributed RU includes K subcarriers. A quantity of 1-MHz bands occupied by the distributed RU is greater than a quantity of 1-MHz bands occupied by an RU including K subcarriers. A minimum granularity of the quantity of 1-MHz bands is 1.

The quantity of 1-MHz bands occupied by the distributed RU is a quantity of 1-MHz bands occupied by the K subcarriers in the distributed RU. The bandwidth includes a plurality of 1-MHz bands. At least one subcarrier of the distributed RU is distributed on one 1-MHz band. Even if the subcarrier of the distributed RU does not fully occupy the one 1-MHz band, the one 1-MHz band is counted in the quantity of 1-MHz bands occupied by the distributed RU.

For example, 26 subcarriers in a distributed 26-tone RU include four subcarrier groups. In ascending order of frequencies, $1^{st}$ to $7^{th}$ subcarriers are continuous and form one subcarrier group; $8^{th}$ to $14^{th}$ subcarriers are continuous and form one subcarrier group; $15^{th}$ to $20^{th}$ subcarriers are continuous and form one subcarrier group; and $21^{st}$ to $26^{th}$ subcarriers are continuous and form one subcarrier group.

In one 1-MHz band occupied by the $1^{st}$ to 7th subcarriers, only the seven subcarriers are subcarriers in the distributed 26-tone RU. Even if frequencies corresponding to the $1^{st}$ to $7^{th}$ subcarriers are only 0.5 MHz, in other words, the $1^{st}$ to $7^{th}$ subcarriers do not fully occupy the 1-MHz band, because the minimum granularity of the quantity of 1-MHz bands is 1, a quantity of 1-MHz bands occupied by the $1^{st}$ to $7^{th}$ subcarriers is also one 1-MHz band.

Similarly, in one 1-MHz band occupied by the $8^{th}$ to $14^{th}$ subcarriers, only the seven subcarriers are subcarriers in the distributed 26-tone RU, and a quantity of 1-MHz bands occupied by the $8^{th}$ to $14^{th}$ subcarriers is also one 1-MHz band. In one 1-MHz band occupied by the $15^{th}$ to $20^{th}$ subcarriers, only the seven subcarriers are subcarriers in the distributed 26-tone RU, and a quantity of 1-MHz bands occupied by the $15^{th}$ to $20^{th}$ subcarriers is also one 1-MHz band. In one 1-MHz band occupied by the $21^{st}$ to $26^{th}$ subcarriers, only the seven subcarriers are subcarriers in the distributed 26-tone RU, and a quantity of 1-MHz bands occupied by the $21^{st}$ to $26^{th}$ subcarriers is also one 1-MHz band. In this way, a quantity of 1-MHz bands occupied by the distributed 26-tone RU is four 1-MHz bands.

It may be learned from the foregoing description that a tone plan of the RU is different from that of the distributed RU. For the RU, there is a fixed correspondence between a quantity of subcarriers and a quantity of 1-MHz bands occupied by the subcarriers. For example, a quantity of 1-MHz bands occupied by 26 subcarriers in a continuous 26-tone RU is 2, a quantity of 1-MHz bands occupied by 52 subcarriers in a continuous 52-tone RU is 4, . . . , a quantity of 1-MHz bands occupied by 242 subcarriers in a continuous 242-tone RU is 20, a quantity of 1-MHz bands occupied by a continuous 484-tone RU is 40, and a quantity of 1-MHz bands occupied by a continuous 996-tone RU is 80. However, for the distributed RU, there is no fixed correspondence between a quantity of subcarriers in the distributed RU and a quantity of 1-MHz bands occupied by the subcarriers. For example, 996 subcarriers in a distributed 996-tone RU may be discretely distributed on a 160 MHz bandwidth, or may be discretely distributed on a 320 MHz bandwidth. In other words, a quantity of 1-MHz bands occupied by the 996 subcarriers in the distributed 996-tone RU may be 160 or 320.

3. Correspondence Between Distributed RUs and Continuous RUs

A plurality of continuous RUs corresponding to one distributed RU are a plurality of continuous RUs that include all subcarriers included in the distributed RU and that include a minimum quantity of subcarriers. Any one continuous RU of a plurality of continuous RUs corresponding to one distributed RU includes some subcarriers of the distributed RU.

It should be understood that, that one distributed RU corresponds to a plurality of continuous RUs may be described as follows: One distributed RU occupies the plurality of continuous RUs, or one distributed RU is in the plurality of continuous RUs, or one distributed RU has a mapping relationship with the plurality of continuous RUs, or the plurality of continuous RUs are continuous RUs in which one distributed RU is located.

For example, the distributed RU shown in FIG. 7 is used as an example. As shown in FIG. 7, a first continuous 26-tone RU, a first continuous 52-tone RU, a first continuous 106-tone RU, a first continuous 242-tone RU, and a first continuous 484-tone RU in the first 20 MHz are respectively denoted as a continuous RU #1, a continuous RU #2, a continuous RU #3, a continuous RU #4, and a continuous RU #5. A first continuous 26-tone RU, a first continuous 52-tone RU, a first continuous 106-tone RU, a first continuous 242-tone RU, and a first continuous 484-tone RU in the second 20 MHz are respectively denoted as a continuous RU #6, a continuous RU #7, a continuous RU #8, a continuous RU #9, and a continuous RU #10. Any one continuous RU of the continuous RU #1 to the continuous RU #5 includes some subcarriers of the distributed 26-tone RU shown in FIG. 7. Any one continuous RU of the continuous RU #6 to the continuous RU #10 includes the other subcarriers of the distributed 26-tone RU. In other words, the plurality of continuous RUs including all the subcarriers of the distributed RU are: any continuous RU in the continuous RU #1 to the continuous RU #5 and any continuous RU in the continuous RU #6 to the continuous RU #10. In a combination including one continuous RU in the continuous RU #1 to the continuous RU #5 and one continuous RU in the continuous RU #6 to the continuous RU #10, the continuous RU #1 and the continuous RU #6 include 52 subcarriers in total. A total quantity of subcarriers included in two continuous RUs in a combination other than the combination is greater than 52. In other words, the continuous RU #1 and the continuous RU #6 are a plurality of continuous RUs that include a minimum total quantity of subcarriers and that are in the plurality of continuous RUs including all the subcarriers of the distributed RU. Therefore, the plurality of continuous RUs corresponding to the distributed 26-tone RU are the continuous RU #1 and the continuous RU #6.

In this application, the distributed RU is referred to as corresponding to the continuous RU #1 and the continuous RU #6, or the distributed RU is referred to as a distributed RU that has a mapping relationship with the continuous RU #1 and the continuous RU #6, or the continuous RU #1 and the continuous RU #6 are referred to as continuous RUs occupied by the distributed RU.

For another example, the distributed RU shown in FIG. 8 is used as an example. The first continuous 52-tone RU, a first continuous 106-tone RU, the third continuous 52-tone RU, and a second continuous 106-tone RU in the first 20 MHz shown in FIG. 8 are respectively denoted as a continuous RU #1, a continuous RU #2, a continuous RU #3, and a continuous RU #4. Both the continuous RU #1 and the continuous RU #2 include some subcarriers of the distributed 52-tone RU shown in FIG. 8, and both the continuous RU #3 and the continuous RU #4 include the other subcarriers of the distributed 52-tone RU. In other words, the plurality of continuous RUs including all the subcarriers of the distributed RU are the continuous RU #1 and the continuous RU #3, the continuous RU #2 and the continuous RU #3, the continuous RU #1 and the continuous RU #4, or the continuous RU #2 and the continuous RU #4. In the foregoing four combinations, the continuous RU #1 and the continuous RU #3 include 52 subcarriers in total, and a total quantity of subcarriers included in any one of the other three combinations is greater than 52. In other words, the continuous RU #1 and the continuous RU #3 are a plurality of continuous RUs that include a minimum total quantity of subcarriers and that are in the plurality of continuous RUs including all the subcarriers of the distributed RU. Therefore, the plurality of continuous RUs corresponding to the distributed 52-tone RU are the continuous RU #1 and the continuous RU #3. In this application, the distributed RU is referred to as corresponding to the continuous RU #1 and the continuous RU #3, or the distributed RU is referred to as a distributed RU that has a mapping relationship with the continuous RU #1 and the continuous RU #3, or the continuous RU #1 and the continuous RU #3 are referred to as continuous RUs occupied by the distributed RU.

For another example, the distributed RU shown in FIG. 9 is used as an example. The plurality of continuous RUs that include the minimum total quantity of subcarriers and that are in the plurality of continuous RUs including all the subcarriers of the distributed 52-tone RU are: the first continuous 52-tone RU (continuous RU #1) in the first 20 MHz, the first continuous 52-tone RU (continuous RU #2) in the second 20 MHz, the first continuous 52-tone RU (continuous RU #3) in the third 20 MHz, and the first continuous 52-tone RU (continuous RU #4) in the fourth 20 MHz. Therefore, the plurality of continuous RUs corresponding to the distributed 52-tone RU are: the continuous RU #1, the continuous RU #2, the continuous RU #3, and the continuous RU #4. In this application, the distributed 52-tone RU is referred to as corresponding to the continuous RU #1 to the continuous RU #4, or the distributed RU is referred to as a distributed RU that has a mapping relationship with the continuous RU #1 to the continuous RU #4, or the continuous RU #1 to the continuous RU #4 are referred to as continuous RUs occupied by the distributed RU.

The following describes in detail a method for transmitting a PPDU provided in this application with reference to the accompanying drawings. It should be understood that the technical solutions of this application may be applied to a wireless communication system, for example, the communication system shown in FIG. 1. There may be a wireless communication connection relationship between two communication apparatuses in the wireless communication system. One of the two communication apparatuses may correspond to the AP shown in FIG. 1, or may be a chip disposed in the AP. The other communication apparatus may correspond to the STA shown in FIG. 1, or may be a chip disposed in the STA.

Figure 10:
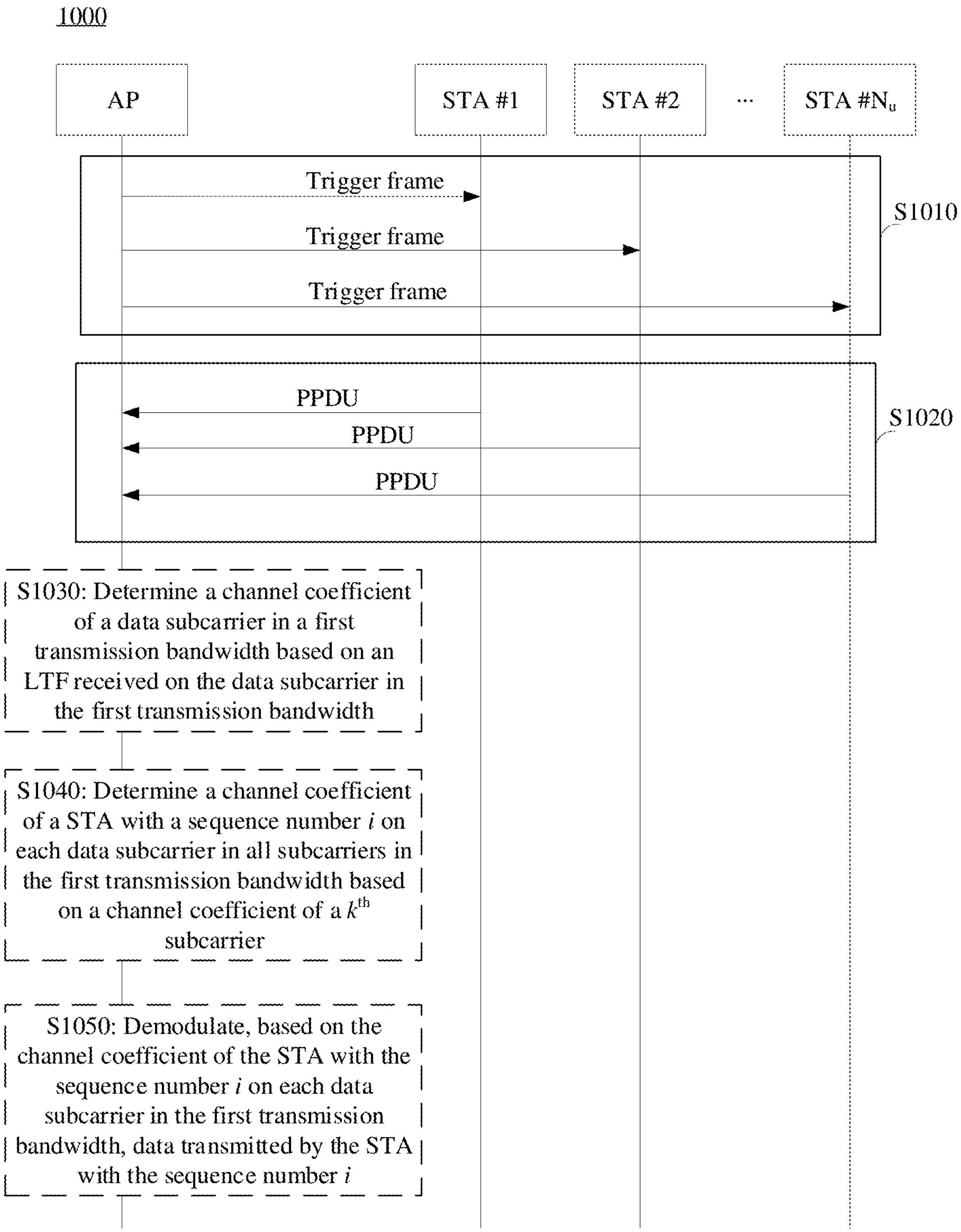
FIG. 10 is a schematic flowchart of a method for transmitting a PPDU according to an embodiment of this application.

FIG. 10 is a schematic flowchart of a method 1000 for transmitting a PPDU according to an embodiment of this application. The following describes steps shown in FIG. 10.

S1010: An AP sends a trigger frame.

The trigger frame is used to trigger at least one STA to transmit an uplink PPDU. The at least one STA is a STA #1 to a STA #$N_u$ in the figure. In other words, the trigger frame triggers $N_u$ STAs to perform uplink transmission. Correspondingly, the at least one STA receives the trigger frame, and may transmit respective PPDUs based on the trigger frame.

The trigger frame may include resource allocation information used by the at least one STA to send the PPDU. Each STA may learn of at least one allocated distributed RU based on resource allocation information of the STA.

In a possible implementation, the resource allocation information is information about the at least one distributed RU. In other words, the at least one distributed RU may be directly indicated by the resource allocation information. How to directly indicate the at least one distributed RU is not limited in this application. For example, the resource allocation information is an index of the at least one distributed RU.

In another possible implementation, the resource allocation information is information about at least one continuous RU corresponding to the at least one distributed RU. The STA may learn of the at least one continuous RU based on the resource allocation information, and may further learn of the allocated distributed RU based on a correspondence between the at least one distributed RU and the at least one continuous RU. In other words, the at least one distributed RU may be indirectly indicated by the resource allocation information. The correspondence between distributed RUs and continuous RUs may be defined in a protocol, or may be configured by the AP, or may be negotiated by the AP and the STA. This is not limited in this application.

For example, the resource allocation information may be carried in a resource unit allocation subfield (RU Allocation subfield) in a user information field in the trigger frame.

Figure 11:
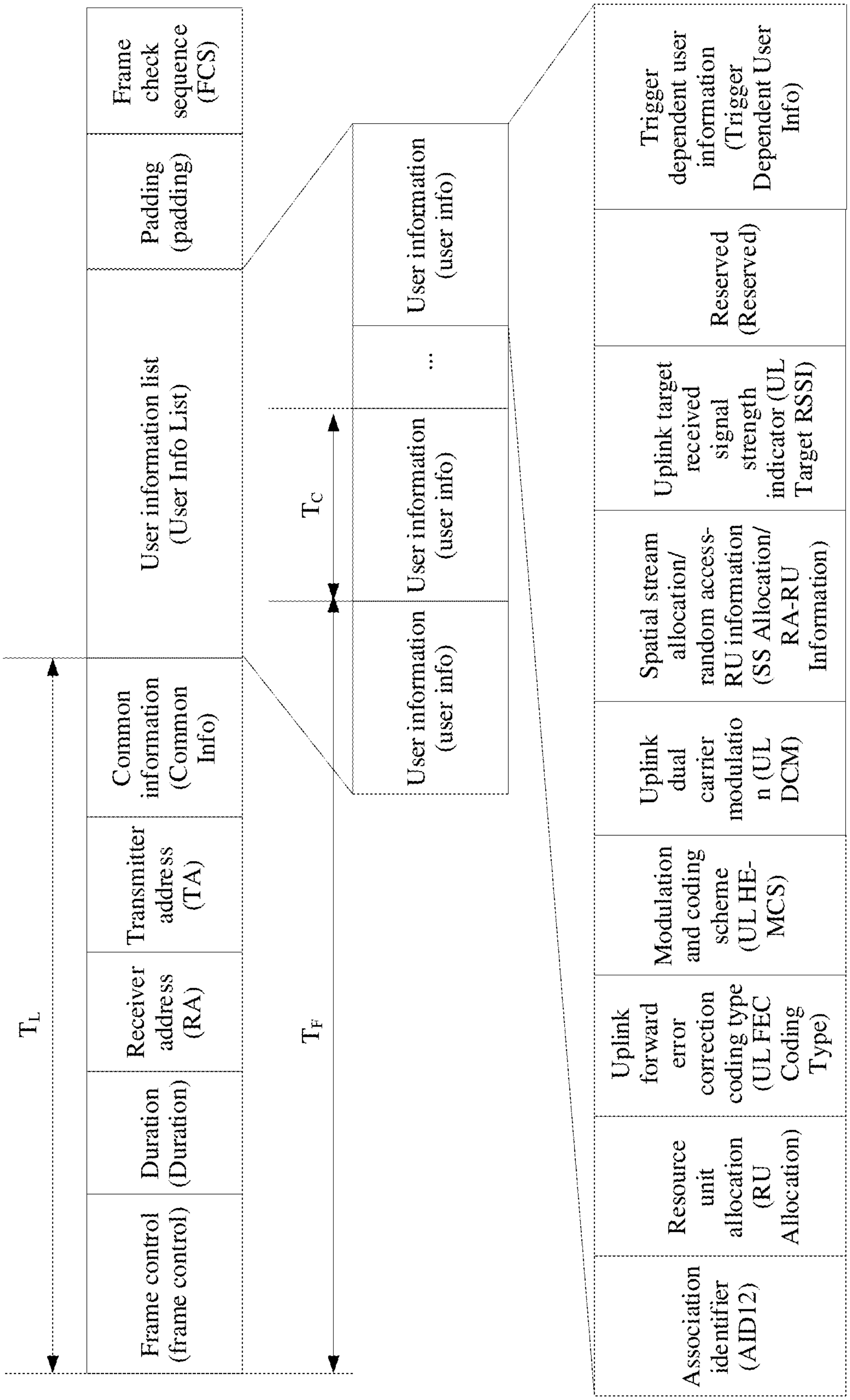
FIG. 11 is a schematic diagram of a frame structure of a trigger frame according to an embodiment of this application.
Figure 11A:
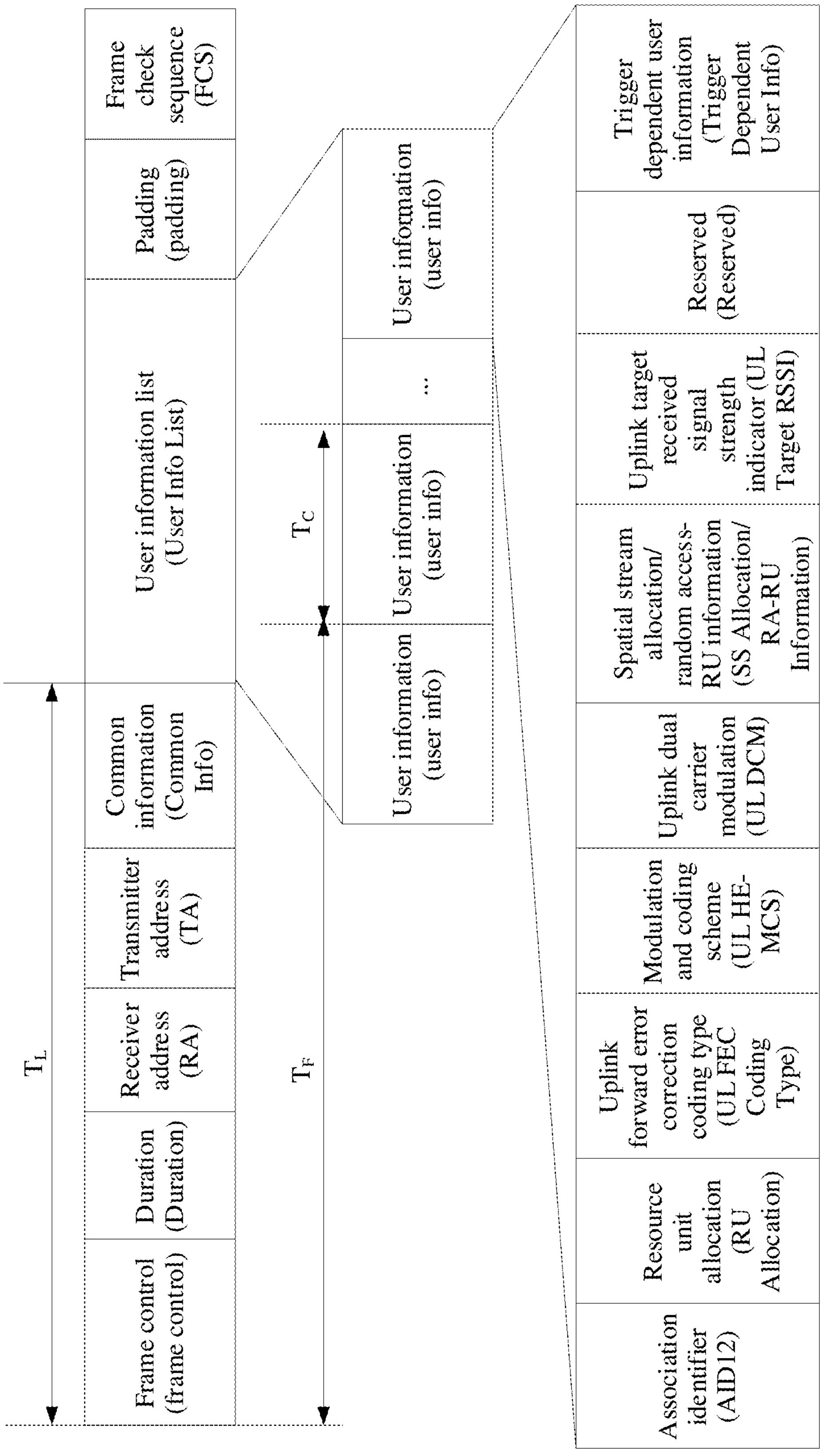
Figure 11B:
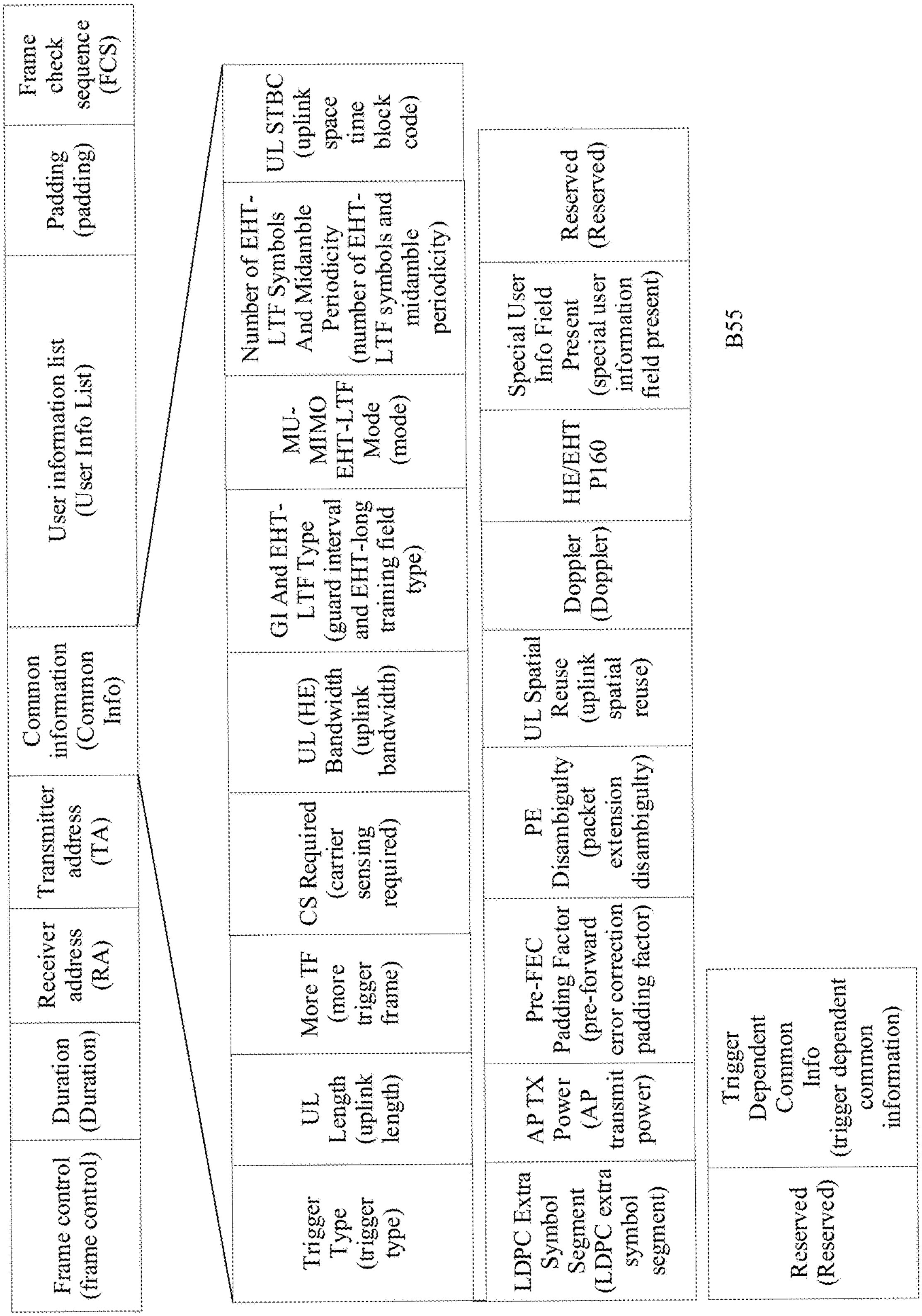
Figure 11C:
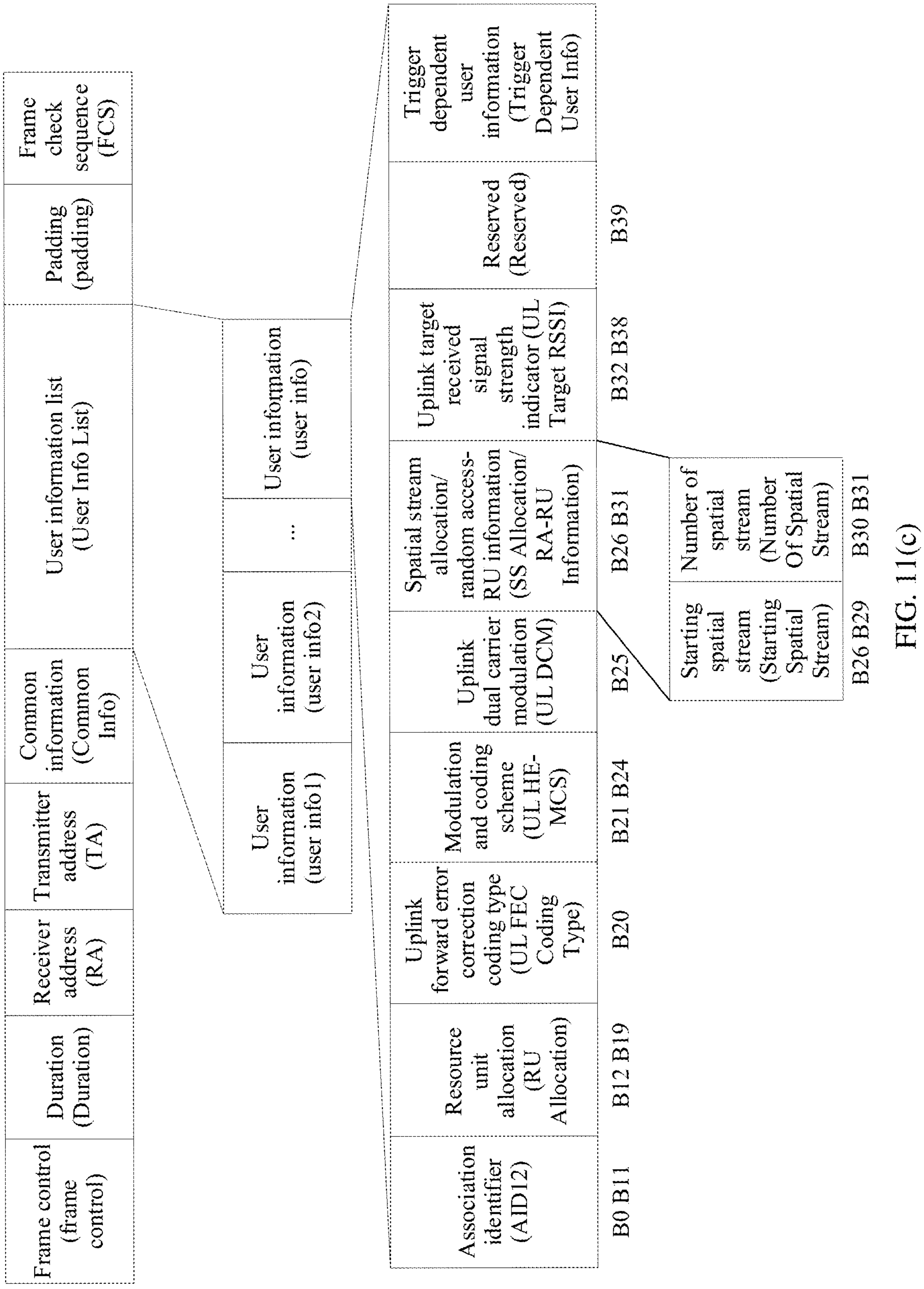

FIG. 11 shows an example of a frame structure of a trigger frame. FIG. 11(*a*) shows another example of a frame structure of a trigger frame. As shown in FIG. 11 and FIG. 11(*a*), the trigger frame includes a common information (Common Info) field and a user information list (User Info List) field.

The common information field includes common information that is to be read by the at least one STA triggered by the trigger frame. In the Common Field, one bit indicates whether a distributed RU is used in a data part, and the bit may use a reserved bit.

The user information list field includes at least one user information field. The at least one user information field one-to-one corresponds to the at least one STA. In the user information field, an association identifier (Association Identifier 12, AID12) indicates an association identifier of a STA corresponding to the user information field, and may be an address of the STA, or the like. The resource unit allocation subfield (RU Allocation subfield) indicates resource allocation information of the STA indicated by the AID12, for example, information about a distributed RU or information about a continuous RU allocated to the STA. After receiving the trigger frame, the STA parses the trigger frame to obtain the user information field that matches the AID12 of the STA, so that the allocated distributed RU can be determined based on the resource unit allocation subfield in the user information field.

FIG. 11(*b*) shows a composition of the Common Field in the trigger frame shown in FIG. 11(*a*). The Common Field mainly includes:

Trigger type: The trigger type field is 4 bits and currently includes a basic (basic) type, a beamforming report poll (Beamforming report poll), a multi-user block ack request (Multi-user Block Ack Request, MU-BAR), a multi-user request to send (MU-RTS, Multi-user request to send), a buffer status report poll (Buffer status report poll), a group cast retransmission multi-user block ack request (GCR MU-BAR, group cast retransmission MU-BAR), a bandwidth query report poll (Bandwidth query report poll), and an NDP feedback report poll (NDP feedback report poll).

Uplink bandwidth: The uplink bandwidth field indicates a bandwidth in an HE-SIG-A of an HE TB PPDU.

Number of EHT-LTF symbols and midamble periodicity: The number of EHT-LTF symbols and midamble periodicity field joins with a Doppler field for indication. Specifically, if the Doppler field is 0, a quantity of EHT-LTF symbols is indicated as follows: A value 0 indicates one EHT-LTF symbol; a value 1 indicates two EHT-LTF symbols; a value 2 indicates four EHT-LTF symbols; a value 3 indicates six EHT-LTF symbols; a value 4 indicates eight EHT-LTF symbols; and other values indicate reserved.

If the Doppler field is 1, the first two bits indicate a quantity of HE-LTF symbols, and the third bit indicates a midamble periodicity. Specifically, values of the first two bits are 0, indicating one HE-LTF symbol; a value of one of the first two bits is 1, indicating two HE-LTF symbols; values of the first two bits are 2, indicating four HE-LTF symbols; and values of the first two bits are 3, indicating unused. The third bit indicates whether the midamble periodicity is 10 symbols or 20 symbols.

FIG. 11(*c*) shows a composition of the User Info Field in the trigger frame shown in FIG. 11(*a*). The User Info Field mainly includes:

Resource unit allocation: The resource unit allocation field may join with the uplink bandwidth field in the common information field to indicate a size and a location of an allocated RU.

Uplink forward error correction coding type: The uplink forward error correction coding type field may indicate a coding type (LDPC or BCC) of a requested EHT TB PPDU.

Modulation and coding scheme: The modulation and coding scheme field indicates an EHT-MCS of a data part of the requested EHT TB PPDU.

Spatial stream allocation/random access-RU information: If AID is 0 or 2045, it indicates an RA-RU Information subfield; otherwise, it indicates a spatial stream allocation subfield. In this case, four bits indicate a spatial stream starting sequence number, and two bits indicate a number of spatial streams. The spatial stream allocation/random access-RU information field specifically includes a starting spatial stream (Starting Spatial Stream) subfield and a number of spatial stream (Number Of Spatial Stream) subfield.

In addition, in an example, for content of other fields in FIG. 11 and FIG. 11(*a*), refer to descriptions in the conventional technology. Details are not described herein again.

S1020: The at least one STA separately sends the respective PPDUs to the AP based on the trigger frame. Correspondingly, the AP receives at least one PPDU sent by the at least one STA, and one STA sends one PPDU.

The PPDU includes a data field and LTFs used for channel estimation.

Content in the data field is data information. The data field (or the data information in the data field) is carried in at least one distributed RU allocated by the AP.

Content in the LTF is an LTF sending sequence. The LTFs (or the LTF sending sequences in the LTFs) are carried on all subcarriers in a first transmission bandwidth. It should be understood that the LTF sending sequence refers to an LTF sequence sent by the STA, and is not an LTF sequence (or values of an LTF sequence) that is not processed, that is, is not an LTF sequence specified in a protocol.

The first transmission bandwidth is a bandwidth corresponding to a distributed RU that is allocated by the AP to the at least one STA for transmitting the uplink PPDU. Alternatively, the first transmission bandwidth is a bandwidth allocated by the AP to the uplink PPDU. In a scenario in which all RUs included in the entire bandwidth are distributed RUs, or in a scenario in which resource allocation is performed on the entire bandwidth by using a distributed RU, the first transmission bandwidth is the entire bandwidth. In a scenario in which the entire bandwidth includes both a distributed RU and a continuous RU, or in a scenario in which resource allocation is performed on one part of bandwidth in the entire bandwidth by using a distributed RU and resource allocation is performed on the other part of bandwidth by using a continuous RU, the first transmission bandwidth is the bandwidth corresponding to the distributed RU. For example, it is assumed that the entire bandwidth is 40 MHz. In a scenario in which resource allocation is performed on the 40 MHz bandwidth by using a distributed RU, the first transmission bandwidth is 40 MHz. In a scenario in which resource allocation is performed on a 20 MHz bandwidth in the 40 MHz bandwidth by using a distributed RU and resource allocation is performed on the other 20 MHz bandwidth by using a continuous RU, the first transmission bandwidth is 20 MHz.

It should be understood that the first transmission bandwidth is notified to the at least one STA by using the trigger frame. A specific notification manner is not limited in this application.

It should be understood that the distributed RU carrying the data field may be one RU, or may be a plurality of RUs. In addition, regardless of which distributed RU or distributed RUs in the first transmission bandwidth are the distributed RU carrying the data field, a bandwidth occupied by the distributed RU is the first transmission bandwidth. For example, when the distributed RU carrying the data field is a distributed RU #1 and a distributed RU #2, a bandwidth occupied by the distributed RU #1 and the distributed RU #2 is the first transmission bandwidth. When the distributed RU carrying the data field is a distributed RU #3 and a distributed RU #4, a bandwidth occupied by the distributed RU #3 and the distributed RU #4 is still the first transmission bandwidth. In this application, the PPDU may be any one of the following PPDUs: a high throughput (high throughput, HT) PPDU, a very high throughput (very high throughput, VHT) PPDU, a high efficiency (high efficiency, HE) PPDU, or an extremely high throughput (extremely high throughput, EHT) PPDU. Alternatively, the PPDU may be a PPDU in another protocol that may appear in the future.

Correspondingly, the LTF may be an LTF in a corresponding PPDU. An LTF in an HT PPDU is an HT-LTF, an LTF in a VHT PPDU is a VHT-LTF, an LTF in an HE PPDU is an HE-LTF, and an LTF in an EHT PPDU is an EHT-LTF.

An example in which the PPDU is an EHT PPDU is used to briefly describe a format of the EHT PPDU.

Figure 12:
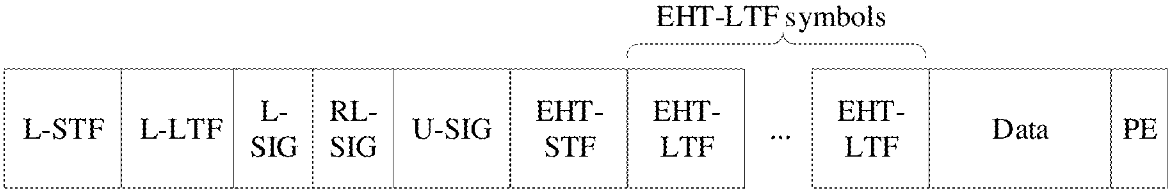
FIG. 12 is a schematic diagram of an EHT PPDU format according to an embodiment of this application.

Refer to FIG. 12. FIG. 12 is a schematic diagram of a format of an EHT PPDU. Names and simple functions of fields (or referred to as fields) of the EHT PPDU are shown in Table 1 below. The Data field is a data field in this application. It should be understood that the EHT PPDU is merely an example, and a specific format of the EHT PPDU is formulated by a standard. PE is an optional field.

average power of a data part sent by the AP is increased, and a PAPR of the LTFs can also be ensured, thereby ensuring system performance.

Optionally, before S1020, the method may further include:

The at least one STA separately obtains, based on values of an LTF sequence (or an LTF sequence) and a matrix P, the LTFs to be sent by the at least one STA.

In other words, for any STA, an LTF in a PPDU sent by the STA is obtained based on the values of the LTF sequence and the matrix P. It should be understood that the values of the LTF sequence are specified in a protocol. The matrix P is an orthogonal mapping matrix. When a quantity of dimensions is determined, values of the matrix P are specified in a protocol. For example, a matrix P with dimensions 4×4 is $$P_{4\times 4}=\begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In a possible implementation, the quantity of dimensions of the matrix P is determined based on a quantity of STAs triggered by the trigger frame, a maximum quantity of STAs

TABLE 1

| Acronyms and Abbreviations | Full name | Item | Description |
|---|---|---|---|
| L-STF | Legacy Short Training Field | Legacy short training field | Performs PPDU discovery, coarse synchronization, and automatic gain control |
| L-LTF | Legacy Long Training Field | Legacy long training field | Performs fine synchronization and channel estimation |
| L-SIG | Legacy Signal Field A | Legacy signal field | Carries signaling information related to a PPDU length, to ensure coexistence |
| RL-SIG | Repeated Legacy Signal Field | Repeated legacy signal field | Distinguishes an HE PPDU from non-HT, HT, and VHT PPDUs |
| U-SIG | Universal Signal Field | Universal signal field | Provides information for translating an EHT PPDU |
| EHT-STF | Extremely High Throughput Short Training Field | Extremely high throughput short training field | Performs automatic gain control of a subsequent field |
| EHT-LTF | Extremely High Throughput Long Training Field | Extremely high throughput long training field | Estimates a channel |
| Data | Data | Data | Carries data information |
| PE | Packet Extension | Package extension | Helps a receive end obtain more processing time |

In a conventional technology, if a PPDU is sent in a first transmission bandwidth, both a data field and LTFs in the PPDU are carried on all subcarriers in the first transmission bandwidth. Because the LTFs carried on all the subcarriers in the first transmission bandwidth are designed, a PAPR of the LTFs can be ensured. According to the method for transmitting a PPDU provided in this application, data is carried on the distributed RU allocated to the STA, the LTFs are carried on all the subcarriers (namely, all the subcarriers that correspond to all distributed RUs allocated to the at least one STA and that are in the trigger frame) in the first transmission bandwidth instead of the distributed RU allocated to the STA. Therefore, it can be ensured that an supported by a system, and a maximum number of spatial streams supported by a single STA in the at least one STA.

It should be understood that the quantity of the STAs triggered by the trigger frame is a quantity of the at least one STA, and is also a quantity $N_u$ of STAs that perform actual transmission. The maximum quantity of the STAs supported by the system may also be understood as a maximum quantity of STAs supported by an EHT (or another protocol that may appear in the future) in a scenario of a distributed RU, or a quantity of STAs supported by the first transmission bandwidth.

It should be further understood that the values of the LTF sequence are specified in a protocol. The matrix P is an orthogonal mapping matrix. When a quantity of dimensions is determined, values of the matrix P are specified in a protocol. For example, a matrix P with dimensions 4×4 is $$P_{4\times4}=\begin{bmatrix}1&-1&1&1\\1&1&-1&1\\1&1&1&-1\\-1&1&1&1\end{bmatrix}.$$

The quantity of the dimensions of the matrix P is $N_{LTF}\times N_{LTF}$. $N_{LTF}$ is a quantity of OFDM symbols included in the LTFs, $(N_u\times N_{ms})\le N_{LTF}\le(N_{mu}\times N_{ms})$, for a meaning of $N_u$, refer to the foregoing description, $N_{mu}$ is the maximum quantity of the STAs supported by the system, and $N_{ms}$ is the maximum number of spatial streams supported by the single STA in the at least one STA.

In a possible implementation, for any STA in the at least one STA, the STA may determine a corresponding row from the matrix P based on an order of the STA in the at least one STA, and then obtain the LTFs based on the corresponding row determined from the matrix P and the values of the LTF sequence.

For example, an $i^{th}$ STA in the at least one STA corresponds to $(i-1)\times N_{ms}+1_{th}$ to $i\times N_{ms^{th}}$ rows in the matrix P. It should be understood that the order of the STA in the at least one STA may also be understood as a sequence number of the STA, namely, a sequence number of the STA in the at least one STA, and $1\le i\le N_u$.

For example, assuming that the maximum number $N_{ms}$ of spatial streams supported by the single STA in the at least one STA is 2, a STA #1 (namely, a STA with a sequence number 1) in the at least one STA corresponds to a first row and a second row in the matrix P, a STA #2 (namely, a STA with a sequence number 2) in the at least one STA corresponds to a third row and a fourth row in the matrix P, and a STA #3 (namely, a STA with a sequence number 3) in the at least one STA corresponds to a fifth row and a sixth row in the matrix P. The rest may be deduced by analogy.

In this application, all the subcarriers include a data subcarrier and a pilot subcarrier.

In a possible implementation, an LTF (denoted as $X_k$) carried on a $k^{th}$ subcarrier in all the subcarriers satisfies an equation (1), where the $k^{th}$ subcarrier is a data subcarrier:

$$X_k=P_i\times\text{LTF}_k \qquad (1)$$

An LTF (denoted as $X_d$) carried on a $d^{th}$ subcarrier in all the subcarriers satisfies an equation (2), where the $d^{th}$ subcarrier is a pilot subcarrier:

$$X_d=F\times\text{LTF}_d \qquad (2)$$

Details are as Follows:

$P_i$ is first $S_i$ rows in the $(i-1)\times N_{ms}+1_{th}$ to $i\times N_{ms^{th}}$ rows in the matrix P, $S_i$ is a number of spatial streams actually transmitted by the STA with the sequence number i, and $1\le S_i\le N_{ms}$, $P_i$ may be understood as a matrix P of the STA with the sequence number i. As described above, the $(i-1)\times N_{ms}+1_{th}$ to $i\times N_{ms^{th}}$ rows in the matrix P are rows that correspond to the sequence number i of the STA and that are in the matrix P, or the $(i-1)\times N_{ms}+1_{th}$ to $i\times N_{ms^{th}}$ rows in the matrix P are rows that correspond to the STA with the sequence number i and that are in the matrix P. For example, it is assumed that $N_u$=4, $N_{ms}$=2, a number of spatial streams actually transmitted by the STA #1 (namely, the STA with the sequence number 1) and the STA #2 (namely, the STA with the sequence number 2) in the at least one STA is 2, and a number of spatial streams actually transmitted by the STA #3 (namely, the STA with the sequence number 3) and the STA #4 (namely, the STA with the sequence number 4) in the at least one STA is 1. In this case, a matrix P of the STA with the sequence number 1 is $$P_1=\begin{bmatrix}\text{First row in } P\\\text{Second row in } P\end{bmatrix},$$

a matrix P of the STA with the sequence number 2 is $$P_2=\begin{bmatrix}\text{Third row in } P\\\text{Fourth row in } P\end{bmatrix},$$

a matrix P of the STA with the sequence number 3 is $P_3$=[Fifth row in P], and a matrix P of the STA with the sequence number 4 is $P_4$=[Seventh row in P], where P in the matrix herein refers to the matrix P.

For meanings and values of the matrix P and $N_{LTF}$, refer to the foregoing descriptions.

$\text{LTF}_k$ is a value that corresponds to the $k^{th}$ subcarrier and that is of the LTF sequence.

$\text{LTF}_d$ is a value that corresponds to the $d^{th}$ subcarrier and that is of the LTF sequence.

F is the first row in the matrix P.

It should be noted that, for example, the first transmission bandwidth is 20 MHz, and a quantity of subcarriers in the first transmission bandwidth is 256. In this case, all the subcarriers in the first transmission bandwidth are a $1^{st}$ subcarrier to a $256^{th}$ subcarrier in ascending order of frequencies, $1\le k\le256$, and $1\le d\le256$. The 256 subcarriers include a pilot subcarrier and a data subcarrier, and may further include one or more of a guard subcarrier, a direct current subcarrier, and a null subcarrier.

In a conventional technology, a matrix multiplied by an LTF sequence is a matrix P, and the matrix P herein is determined by the STA based on a number of spatial streams actually transmitted by the STA. For example, assuming that a number of spatial streams actually transmitted by a STA is 2, a matrix P corresponding to the STA is an 2×2 orthogonal mapping matrix specified in a protocol.

However, in this embodiment of this application, the matrix $P_1$ multiplied by the LTF sequence is determined, by the STA based on the number of spatial streams actually transmitted by the STA, from the matrix P (namely, the foregoing $N_{LTF}\times N_{LTF}$ orthogonal mapping matrix) shared between the at least one STA. In this way, inter-user interference caused by sending an LTF by each STA can be avoided.

Optionally, i satisfies an equation (3):

$$i=(T_F-T_L)/T_C+1 \qquad (3)$$

$T_F$ is duration from reception of the trigger frame by the STA to reception of a user information field corresponding to the STA, $T_L$ is duration from the reception of the trigger frame by the STA to reception of a first user information field in the trigger frame, and $T_C$ is a length of the user information field corresponding to the STA.

It should be noted that, in this embodiment of this application, if B55=0 in the Common Field (as shown in FIG. 11(*b*)) of the trigger frame, it indicates that the first User Info Field in the User Info List is an extension of the Common Field, and is referred to as a Special User Info Field. In this case, i=i−1 is to be set. In other words, when B55=0, the Special User Info Field is used as the extension of the Common Field, and one less User Info Field is actually allocated to a user. Therefore, an actual user sequence number (the sequence number i of the STA) is a sequence number i of the User Info Field minus 1, that is, i=i−1. When B55=1, the user sequence number (the sequence number i of the STA) is equal to the sequence number i' of the User Info Field.

For a relationship between $T_F$, $T_L$, and $T_C$, refer to FIG. 11 or FIG. 11(*a*).

It should be noted that i may alternatively be determined in another manner. For example, a sequence number of each STA may be carried in the trigger frame. For example, a sequence number of a corresponding STA is carried in each user information field in the trigger frame.

Optionally, the method may further include the following steps.

S1030: The AP determines a channel coefficient of a data subcarrier in the first transmission bandwidth based on an LTF received on the data subcarrier in the first transmission bandwidth.

In this embodiment, the LTFs of the at least one STA are carried on all the subcarriers in the first transmission bandwidth, and the AP may determine a channel coefficient of any data subcarrier in the first transmission bandwidth based on the LTF received on the data subcarrier, where the channel coefficient includes a channel coefficient of each STA in the at least one STA on the data subcarrier.

In a possible implementation, a channel coefficient $H_k$ of the $k^{th}$ subcarrier in all the subcarriers in the first transmission bandwidth satisfies an equation (4):

$$H_k = \frac{Y_k \times P_r^*}{N_{LTF} \times LTF_k} \tag{4}$$

The $k^{th}$ subcarrier is a data subcarrier.

$Y_k$ is an LTF received by the AP on the $k^{th}$ subcarrier.

For meanings and values of $N_{LTF}$ and $LTF_k$ refer to the foregoing descriptions.

$$P_r^*$$

is a conjugate transposition matrix of $P_r$.

$$P_r = \begin{bmatrix} P_1 \\ P_2 \\ M \\ P_{N_u} \end{bmatrix}, \text{ or } P_r^* = \begin{bmatrix} P_1 \\ P_2 \\ M \\ P_{N_u} \end{bmatrix}^*.$$

For a meaning and a value of $P_i$, refer to the foregoing descriptions. i is the sequence number of the STA. In other words, i is a sequence number of one STA in the at least one STA, and $i \in [1, N_u]$.

Further, the method may further include the following steps.

S1040: The AP determines a channel coefficient of the STA with the sequence number i on each data subcarrier in all the subcarriers in the first transmission bandwidth based on the channel coefficient $H_k$ of the $k^{th}$ subcarrier.

S1050: The AP demodulates, based on the channel coefficient of the STA with the sequence number i on each data subcarrier in all the subcarriers in the first transmission bandwidth, data transmitted by the STA with the sequence number i.

A channel coefficient of the STA with the sequence number i on the $k^{th}$ subcarrier is $Q_{1\_i^{th}}$ to $Q_{2\_i^{th}}$ columns in $H_k$, and $P_i$ is $Q_{1\_i^{th}}$ to $Q_{2\_i^{th}}$ rows in $P_r$. In other words, the channel coefficient of the STA with the sequence number i on the $k^{th}$ subcarrier may be learned of based on rows occupied in $P_r$ by $P_i$ corresponding to the STA with the sequence number i. For example, if rows occupied in $P_r$ by $P_1$ corresponding to the STA #1 (namely, the STA with the sequence number 1) are a first row and a second row, a channel coefficient of the STA #1 on the $k^{th}$ subcarrier are a first column and a second column in $H_k$.

In this embodiment, the AP may obtain the channel coefficient of the at least one STA on each data subcarrier in the first transmission bandwidth according to the equation (4), and then extract a channel coefficient of each STA on each data subcarrier in the first transmission bandwidth from the channel coefficient. Therefore, for any STA, the AP may demodulate, based on the channel coefficient of the STA on each data subcarrier in the first transmission bandwidth, data transmitted by the STA, to obtain the data transmitted by the STA.

Figure 13:
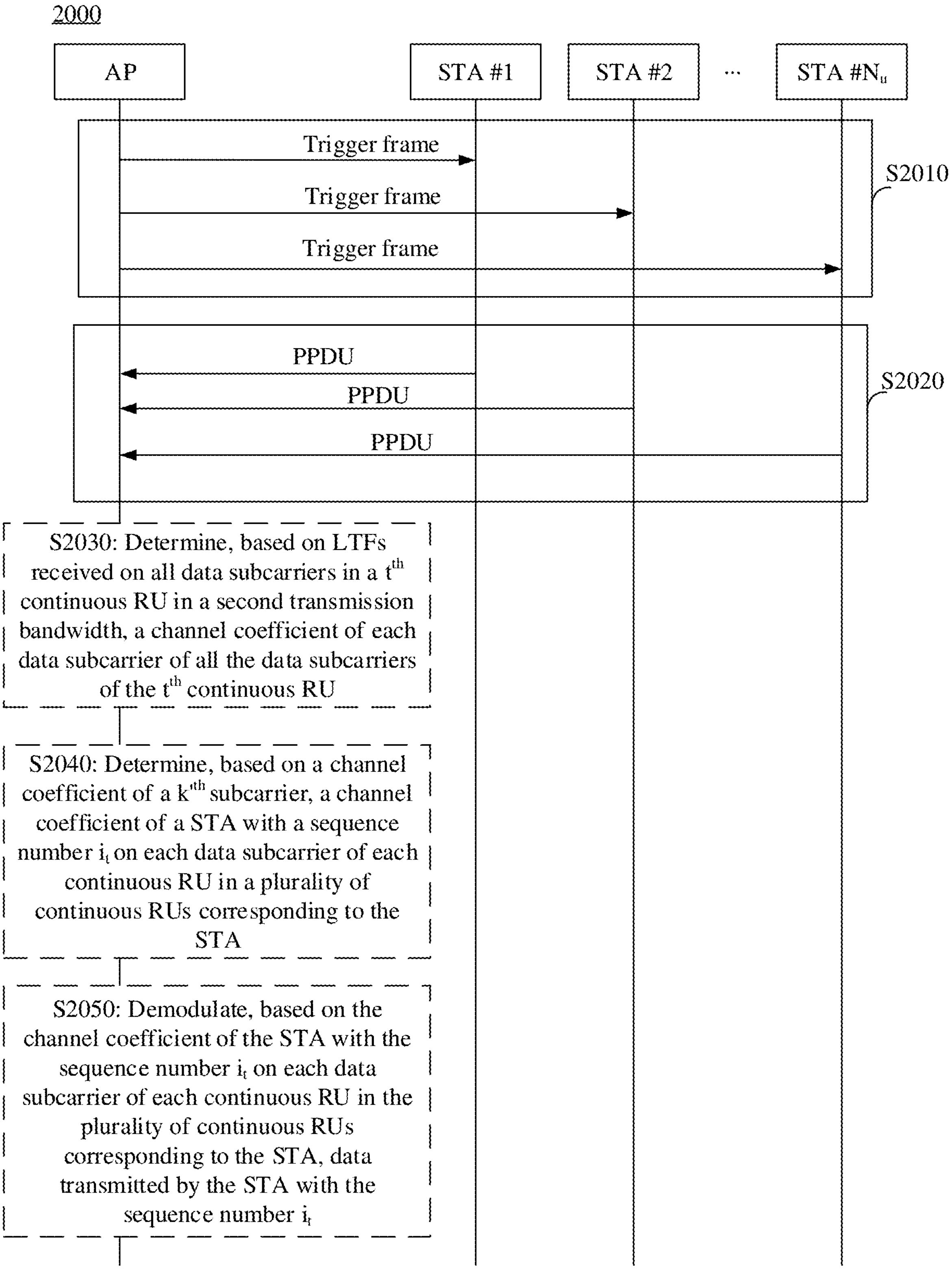
FIG. 13 is a schematic flowchart of another method for transmitting a PPDU according to an embodiment of this application.

FIG. 13 is a schematic flowchart of a method 2000 for transmitting a PPDU according to an embodiment of this application. The following describes steps shown in FIG. 13.

S2010: An AP sends a trigger frame.

This step is the same as S1010. Refer to S1010.

It should be understood that if resource allocation information in the trigger frame is resource allocation information of a distributed RU, a STA may also determine, based on a correspondence between distributed RUs and continuous RUs, a continuous RU corresponding to at least one distributed RU allocated by the AP.

S2020: At least one STA separately sends respective PPDUs to the AP based on the trigger frame. Correspondingly, the AP receives at least one PPDU sent by the at least one STA, and one STA sends one PPDU.

The PPDU includes a data field and LTFs.

A manner of carrying the data field is the same as that in the method 1000. In other words, the data field (or data information in the data field) is carried on a distributed RU.

A manner of carrying the LTFs is different from that in the method 1000. In this method, the LTFs are carried on all subcarriers of a plurality of continuous RUs. The plurality of continuous RUs are continuous RUs corresponding to the distributed RU carrying data.

For example, it is assumed that the distributed RU includes subcarriers 1 to 17 and subcarriers 20 to 30. The subcarriers 1 to 17 may be mapped to subcarriers in a continuous RU #1, and the subcarriers 20 to 30 may be mapped to subcarriers in a continuous RU #2. In this case, the distributed RU corresponds to the RU #1 and the RU #2. If subcarriers included in the continuous RU #1 are subcarriers 1 to 26, and subcarriers included in the continuous RU #2 are subcarriers 28 to 53, the LTFs may be carried on the subcarriers 1 to 26 and the subcarriers 28 to 53.

For a format of the PPDU sent by the STA, refer to the descriptions of the method 1000. Details are not described herein again.

According to the method for transmitting a PPDU provided in this application, in a scenario in which the data is carried on the distributed RU, the LTFs are carried on all the subcarriers in the continuous RUs corresponding to the distributed RU. Therefore, a PAPR of the LTFs can be ensured, thereby ensuring system performance. In addition, compared with a manner in which LTFs are carried on all subcarriers in a first transmission bandwidth, the manner in which the LTFs are carried only on all the subcarriers of the continuous RUs corresponding to the distributed RU can reduce interference and reduce redundant subcarriers for sending.

Optionally, for how to obtain an LTF in a PPDU sent by each STA, how to determine an LTF carried on a data subcarrier, and how to determine an LTF on a pilot subcarrier, refer to the foregoing descriptions of the method 1000. Details are not described herein again. However, it should be emphasized that the LTFs described in the method 1000 are carried on the first transmission bandwidth, and the LTFs in the method 2000 are carried on the continuous RUs corresponding to the distributed RU carrying the data.

In addition, values of k and d in the method 2000 are described herein by using an example. For example, the plurality of continuous RUs are two 26-tone RUs. Because each continuous RU has 26 subcarriers, the plurality of continuous RUs have 52 subcarriers. In this case, all the subcarriers of the plurality of continuous RUs are a $1^{st}$ subcarrier to a $52^{nd}$ subcarrier in ascending order of frequencies, $1 \le k \le 52$, and $1 \le d \le 52$.

Optionally, the method may further include the following steps.

S2030: The AP determines, based on LTFs received on all data subcarriers in a $t^{th}$ continuous RU in a second transmission bandwidth, a channel coefficient of each data subcarrier of all the data subcarriers of the $t^{th}$ continuous RU.

The second transmission bandwidth is a bandwidth corresponding to a plurality of continuous RUs that are allocated by the AP to the at least one STA for transmitting respective LTFs. Specifically, each STA in the at least one STA transmits the LTFs on all the subcarriers in the plurality of continuous RUs. In other words, each STA corresponds to the plurality of continuous RUs, and a sum of bandwidths of the continuous RUs in a set of the continuous RUs corresponding to the at least one STA is the second transmission bandwidth. The set of the continuous RUs corresponding to the at least one STA includes continuous RUs corresponding to each STA in the at least one STA, and any two continuous RUs in the set are different.

For example, the at least one PPDU is a PPDU #1 and a PPDU #2. An LTF in the PPDU #1 is carried on a distributed RU #1. The distributed RU #1 corresponds to a continuous RU #1 and a continuous RU #2. An LTF in the PPDU #2 is carried on a distributed RU #2. The distributed RU #2 corresponds to a continuous RU #3 and a continuous RU #4. In this case, the second transmission bandwidth is a sum of bandwidths of the continuous RU #1, the continuous RU #2, the continuous RU #3, and the continuous RU #4, where $1 \le t \le 4$.

For another example, the at least one PPDU is a PPDU #1 and a PPDU #2. An LTF in the PPDU #1 is carried on a distributed RU #1. The distributed RU #1 corresponds to a continuous RU #1 and a continuous RU #2. An LTF in the PPDU #2 is carried on a distributed RU #2. The distributed RU #2 corresponds to the continuous RU #2 and a continuous RU #3. In this case, the second transmission bandwidth is a sum of bandwidths of the continuous RU #1, the continuous RU #2, and the continuous RU #3, where $1 \le t \le 3$.

It should be understood that, in this embodiment, the data subcarriers in the $t^{th}$ continuous RU may carry only an LTF of one STA in the at least one STA, or may carry LTFs of a plurality of STAs in the at least one STA. If the data subcarriers in the $t^{th}$ continuous RU carry only an LTF of one STA in the at least one STA, a channel coefficient that is of the data subcarriers in the $t^{th}$ continuous RU and that is determined by the AP is a channel coefficient of the STA on the data subcarriers in the $t^{th}$ continuous RU. If the data subcarriers in the $t^{th}$ continuous RU carry LTFs of a plurality of STAs in the at least one STA, a channel coefficient that is of the data subcarriers in the $t^{th}$ continuous RU and that is determined by the AP includes channel coefficients of the plurality of STAs on the data subcarriers in the $t^{th}$ continuous RU.

In a possible implementation, a channel coefficient $$H_{k'}^{(t)}$$

of a $k'^{th}$ subcarrier in all the subcarriers of the $t^{th}$ continuous RU satisfies an equation (5):

$$H_{k'}^{(t)} = \frac{Y_{k'} \times \left(P_r^{(t)}\right)^*}{N_{LTF} \times LTF_{k'}^{(t)}} \tag{5}$$

The $k'^{th}$ subcarrier is a data subcarrier.

$Y_{k'}$ is an LTF received by the AP on the $k'^{th}$ subcarrier.

$N_{LTF}$ is a quantity of OFDM symbols included in the LTFs, $(N_u \times N_{ms}) \le N_{LTF} \le (N_{mu} \times N_{ms})$, $N_u$ is a quantity of STAs triggered by the trigger frame, $N_{mu}$ is a maximum quantity of STAs supported by a system, and $N_{ms}$ is a maximum number of spatial streams that can be transmitted by a single STA.

$$\left(P_r^{(t)}\right)^*$$

is a conjugate transposition matrix of $$P_r^{(t)}.$$

$$P_r^{(t)} = \begin{bmatrix} P_{1_t} \\ P_{2_t} \\ M \\ P_{u_t} \end{bmatrix}, \text{ or } \left(P_r^{(t)}\right)^* = \begin{bmatrix} P_{1_t} \\ P_{2_t} \\ M \\ P_{u_t} \end{bmatrix}^*.$$

u is a quantity of STAs whose corresponding LTFs are carried on the $t^{th}$ continuous RU. $P_{i}$, is first $S_{i}$, rows in $(i_t-1) \times N_{ms}+1_{th}$ to $i_t \times N_{ms^{th}}$ rows in the matrix P, the $(i_t-1) \times N_{ms}+1_{th}$ to $i_t \times N_{ms^{th}}$ rows in the matrix P are rows corresponding to a sequence number $i_t$ of a STA in the matrix P, $i_t \in [1, N_u]$, $i_t$ is the sequence number of the STA that uses the $t^{th}$ continuous RU to send the LTF, $S_{i}$, is a number of spatial streams actually transmitted by the STA with the sequence number $i_t$, $1 \le S_i \le N_{ms}$, the matrix P is an $N_{LTF} \times N_{LTF}$ orthogonal mapping matrix, and $$LTF_{k'}^{(t)}$$

is a value that corresponds to the $k'^{th}$ subcarrier of the $t^{th}$ RU and that is of an LTF sequence.

It should be understood that a quantity of STAs whose corresponding LTFs are carried on different continuous RUs may vary. In other words, when t has different values, a value of u may vary. For example, if the $t^{th}$ continuous RU carries LTFs of three STAs, u=3. If the $t^{th}$ continuous RU carries an LTF of one STA, u=1.

It should be further understood that $i_t$ is the sequence number of the STA in the at least one STA, and the STA uses the $t^{th}$ continuous RU to send the LTF. it is not a sequence number of the STA that uses the $t^{th}$ continuous RU to send the LTF in u STAs. A sequence number of any STA in the at least one STA may be determined according to the foregoing equation (3), or may be determined in another manner. For example, a sequence number of each STA may be carried in the trigger frame. In this embodiment, the AP may obtain a channel coefficient of each data subcarrier in each continuous RU according to the equation (5), where a channel coefficient of any data subcarrier includes a channel coefficient of one or more STAs whose corresponding LTFs are carried on the data subcarrier. Alternatively, for any STA, the AP may obtain, according to the equation (5), a channel coefficient of each data subcarrier in each RU of a plurality of continuous RUs corresponding to a distributed RU that carries data of the STA.

Further, the method may further include the following steps.

S2040: The AP determines, based on a channel coefficient $H_{k'}$ of the $k'^{th}$ subcarrier, a channel coefficient of the STA with the sequence number $i_t$ on each data subcarrier of each continuous RU in a plurality of continuous RUs corresponding to the STA.

S2050: The AP demodulates, based on the channel coefficient of the STA with the sequence number $i_t$ on each data subcarrier of each continuous RU in the plurality of continuous RUs corresponding to the STA, data transmitted by the STA with the sequence number $i_t$.

The LTF of the STA with the sequence number $i_t$ is carried on the $t^{th}$ continuous RU, the channel coefficient of the STA with the sequence number $i_t$ on the $k'^{th}$ subcarrier in the $t^{th}$ continuous RU are $$Q^{(t)}_{1\_i_t th} \text{ to } Q^{(t)}_{2\_i_t th}$$

columns in $$H^{(t)}_{k'},$$

and $P_i$, is $$Q^{(t)}_{1\_i_t th} \text{ to } Q^{(t)}_{2\_i_t th}$$

rows in $$P^{(t)}_r.$$

In other words, the channel coefficient of the STA with the sequence number $t_i$ on the $k'^{th}$ subcarrier may be learned of based on rows occupied in $$P^{(t)}_r$$

by $P_{t_i}$ corresponding to the STA with the sequence number $i_t$.

In this embodiment, the AP learns which continuous RUs carry an LTF sent by each STA. Therefore, for any STA, the AP may learn, according to the equation (5), a channel coefficient of the STA on a data subcarrier in each RU of a plurality of continuous RUs corresponding to the STA. In this way, it is equivalent that the AP learns of the channel coefficient of the STA, and the AP may demodulate, based on the channel coefficient of the STA, data transmitted by the STA, to obtain the data transmitted by the STA.

The following further provides a method for transmitting a PPDU. The method is still described with reference to steps shown in FIG. 10 and FIG. 11, FIG. 11(*a*), FIG. 11(*b*), FIG. 11(*c*), and FIG. 12. It should be understood that the method for transmitting a PPDU provided in this embodiment has same or similar content as the method for transmitting a PPDU provided in the previous embodiment described with reference to FIG. 10, FIG. 11, FIG. 11 (*a*), FIG. 11 (*b*), FIG. 11(*c*), and FIG. 12. In a case of no conflict, related content in the previous embodiment may be cited or inherited in this embodiment. For brevity, details are not described herein again.

S1010: An AP sends a trigger frame.

The trigger frame is used to trigger at least one STA to transmit an uplink PPDU. The at least one STA is a STA #1 to a STA #$N_u$ in the figure. In other words, the trigger frame triggers $N_u$ STAs to perform uplink transmission.

S1020: At least one STA separately sends respective PPDUs to the AP based on the trigger frame. Correspondingly, the AP receives at least one PPDU sent by the at least one STA, and one STA sends one PPDU.

Optionally, before S1020, the method may further include:

The at least one STA separately obtains, based on values of an LTF sequence (or an LTF sequence) and a matrix P, LTFs to be sent by the at least one STA.

In a possible implementation, a quantity of dimensions of the matrix P is $N_{LTF} \times N_{LTF}$. In other words, the matrix P is a matrix of $N_{LTF}$ rows multiplied by $N_{LTF}$ columns.

$N_{LTF}$ is a quantity of OFDM symbols included in the LTFs, namely, a quantity of OFDM symbols for sending the LTFs. $N_{LTF}$ is determined based on a total number of streams carried by each STA in the first transmission bandwidth.

In a possible implementation, any STA in the at least one STA may determine a corresponding row from the matrix P based on an indication of an SS Allocation field in a User Info Field in a trigger frame received by the STA. Specifically, the SS Allocation field includes two subfields. One is a starting spatial stream subfield, indicating an allocated starting spatial stream index, and the other is a number of spatial stream subfield, indicating a number of allocated spatial streams. The STA selects (starting spatial stream index+1)$^{th}$ to (starting spatial stream index+number of allocated streams)$^{th}$ rows in the matrix P. Then, the LTFs are obtained based on the corresponding row determined from the matrix P and the values of the LTF sequence.

In this application, all subcarriers in the transmission bandwidth include a data subcarrier and a pilot subcarrier.

In a possible implementation, an LTF (denoted as $X_k$) carried on a $k^{th}$ subcarrier in all the subcarriers in the transmission bandwidth satisfies an equation (1), where the $k^{th}$ subcarrier is a data subcarrier:

$$X_k = P_i \times \text{LTF}_k \tag{1}$$

An LTF (denoted as $X_d$) carried on a dth subcarrier in all the subcarriers satisfies an equation (2), where the dth subcarrier is a pilot subcarrier:

$$X_d = F \times LTF_d \quad (2)$$

$P_i$ $I_i+1_{th}$ to $I_i+NUM_{i^{th}}$ rows in the matrix P, $I_i$ is a starting spatial stream sequence number of an $i^{th}$ user, the starting spatial stream sequence number is obtained by sorting all streams of all users on the first transmission bandwidth, $NUM_i$ is a number of streams of the $i^{th}$ user, and $I_i$ and $NUM_i$ are indicated by an SS Allocation field in a User Info Field of the STA i. As shown in FIG. 11(*c*), for example, the first four bits in the SS Allocation are a starting spatial stream (Starting spatial stream) subfield. If a value of the first four bits is 3, it indicates that the starting spatial stream sequence number $I_i$ is 3. The last two bits are a number of spatial stream (Number of Spatial Stream) subfield. If a value of the last two bits is 2, it indicates that a number $NUM_i$ of spatial streams is 2. In other words, a fourth stream and a fifth stream are allocated.

$P_i$ may be understood as a matrix P of the STA i.

For a meaning and a value of the matrix P, refer to the foregoing descriptions.

$N_{LTF}$ is the quantity of the OFDM symbols included in the LTFs, and a value of the quantity is not less than a total number of the streams of all the users on the first transmission bandwidth.

$LTF_k$ is a value that corresponds to the $k^{th}$ subcarrier and that is of the LTF sequence.

$LTF_d$ is a value that corresponds to the $d^{th}$ subcarrier and that is of the LTF sequence.

F is a first row in the matrix P. It should be noted that, for example, the first transmission bandwidth is 20 MHz, and a quantity of subcarriers in the first transmission bandwidth is 256. In this case, all the subcarriers in the first transmission bandwidth are a $1^{st}$ subcarrier to a $256^{th}$ subcarrier in ascending order of frequencies, $1 \le k \le 256$ and $1 \le d \le 256$. The 256 subcarriers include a pilot subcarrier and a data subcarrier, and may further include one or more of a guard subcarrier, a direct current subcarrier, and a null subcarrier. It should be understood that when the first transmission bandwidth is a bandwidth such as 40 MHz, 80 MHz, 160 MHz, 240 MHz, or 320 MHz, all the subcarriers included in the first transmission bandwidth are used in the same way. Details are not described herein again.

In a conventional technology, a matrix multiplied by an LTF sequence is a matrix P, and the matrix P in the conventional technology is determined by the STA based on a number of spatial streams actually transmitted by the STA. For example, assuming that a number of spatial streams actually transmitted by a STA is 2, a matrix P corresponding to the STA is an 2×2 orthogonal mapping matrix specified in a protocol.

However, in this embodiment of this application, the matrix $P_i$, multiplied by the LTF sequence is determined, by the STA based on the number of spatial streams actually transmitted by the STA, from the matrix P (namely, the foregoing $N_{LTF} \times N_{LTF}$ orthogonal mapping matrix) shared between the at least one STA. In the matrix P, interference between STAs is fully considered. In this way, inter-user interference caused by sending an LTF by each STA can be avoided.

Optionally, the method may further include the following steps.

S1030: The AP determines a channel coefficient of a data subcarrier in the first transmission bandwidth based on an LTF received on the data subcarrier in the first transmission bandwidth.

In this embodiment, the LTFs of the at least one STA are carried on all the subcarriers in the first transmission bandwidth, and the AP may determine a channel coefficient of any data subcarrier in the first transmission bandwidth based on the LTF received on the data subcarrier, where the channel coefficient includes a channel coefficient of each STA in the at least one STA on the data subcarrier.

In a possible implementation, a channel coefficient of the $k^{th}$ subcarrier in all the subcarriers in the first transmission bandwidth satisfies an equation (4):

$$Hk = \frac{Y_k \times P_r^*}{N_{LTF} \times LTF_k} \quad (4)$$

The $k^{th}$ subcarrier is a data subcarrier.

$Y_k$ is an LTF received by the AP on the $k^{th}$ subcarrier.

For meanings and values of $N_{LTF}$ and $LTF_k$, refer to the foregoing descriptions.

$$P_r^*$$

is a conjugate transposition matrix of $P_r$.

$$P_r = \begin{bmatrix} P_1 \\ P_2 \\ M \\ P_{N_u} \end{bmatrix}, \text{ or } P_r^* = \begin{bmatrix} P_1 \\ P_2 \\ M \\ P_{N_u} \end{bmatrix}^*.$$

For a meaning and a value of $P_i$, refer to the foregoing descriptions. $N_u$ is a quantity of the at least one STA triggered by the trigger frame. i is the sequence number of the STA. In other words, i is a sequence number of one STA in the $N_u$ STAs, and $i \in [1, N_u]$.

Further, the method may further include the following steps.

S1040: The AP determines a channel coefficient of the STA with the sequence number i on each data subcarrier in all the subcarriers in the first transmission bandwidth based on the channel coefficient $H_k$ of the $k^{th}$ subcarrier.

S1050: The AP demodulates, based on the channel coefficient of the STA with the sequence number i on each data subcarrier in all the subcarriers in the first transmission bandwidth, data transmitted by the STA with the sequence number i.

A channel coefficient of the STA with the sequence number i on the $k^{th}$ subcarrier is $I_i+1_{th}$ to $I_i+NUM_{i^{th}}$ columns in $H_k$.

In this embodiment, the AP may obtain the channel coefficient of the at least one STA on each data subcarrier in the first transmission bandwidth according to the equation (4), and then extract a channel coefficient of each STA on each data subcarrier in the first transmission bandwidth from the channel coefficient. Therefore, for any STA, the AP may demodulate, based on the channel coefficient of the STA on each data subcarrier in the first transmission bandwidth, data transmitted by the STA, to obtain the data transmitted by the STA.

Correspondingly, an embodiment of this application further provides a method for transmitting a PPDU. Description is also provided with reference to FIG. 13.

S2010: An AP sends a trigger frame.

This step is the same as S1010. Refer to S1010.

It should be understood that if resource allocation information in the trigger frame is resource allocation information of a distributed RU, a STA may also determine, based on a correspondence between distributed RUs and continuous RUs, a continuous RU corresponding to at least one distributed RU allocated by the AP.

S2020: At least one STA separately sends respective PPDUs to the AP based on the trigger frame. Correspondingly, the AP receives at least one PPDU sent by the at least one STA, and one STA sends one PPDU.

The PPDU includes a data field and LTFs.

In an implementation, a manner of carrying the data field is the same as that in the method 1000. In other words, the data field (or data information in the data field) is carried on a distributed RU.

In another implementation, a manner of carrying the LTFs is different from that in the method 1000. In this method, the LTFs are carried on all subcarriers of a plurality of continuous RUs. The plurality of continuous RUs are continuous RUs corresponding to the distributed RU carrying data.

For example, it is assumed that the distributed RU includes subcarriers 1 to 17 and subcarriers 20 to 30. The subcarriers 1 to 17 may be mapped to subcarriers in a continuous RU #1, and the subcarriers 20 to 30 may be mapped to subcarriers in a continuous RU #2. In this case, the distributed RU corresponds to the RU #1 and the RU #2. If subcarriers included in the continuous RU #1 are subcarriers 1 to 26, and subcarriers included in the continuous RU #2 are subcarriers 28 to 53, the LTFs may be carried on the subcarriers 1 to 26 and the subcarriers 28 to 53.

For a format of the PPDU sent by the STA, refer to the descriptions of the method 1000. Details are not described herein again.

According to the method for transmitting a PPDU provided in this application, in a scenario in which the data is carried on the distributed RU, the LTFs are carried on all the subcarriers in the continuous RUs corresponding to the distributed RU. Therefore, a PAPR of the LTFs can be ensured, thereby ensuring system performance. In addition, compared with a manner in which LTFs are carried on all subcarriers in a first transmission bandwidth, the manner in which the LTFs are carried only on all the subcarriers of the continuous RUs corresponding to the distributed RU can reduce interference and reduce redundant subcarriers for sending.

Optionally, for how to obtain an LTF in a PPDU sent by each STA, how to determine an LTF carried on a data subcarrier, and how to determine an LTF on a pilot subcarrier, refer to the foregoing descriptions of the method 1000. Details are not described herein again. However, it should be emphasized that the LTFs described in the method 1000 are carried on the first transmission bandwidth, and the LTFs in the method 2000 are carried on the continuous RUs corresponding to the distributed RU carrying the data.

In addition, values of k and d in the method 2000 are described herein by using an example. For example, the plurality of continuous RUs are two 26-tone RUs. Because each continuous RU has 26 subcarriers, the plurality of continuous RUs have 52 subcarriers. In this case, all the subcarriers of the plurality of continuous RUs are a $1^{st}$ subcarrier to a $52^{nd}$ subcarrier in ascending order of frequencies, $1 \leq k \leq 52$, and $1 \leq d \leq 52$.

Optionally, the method may further include the following steps.

S2030: The AP determines, based on LTFs received on all data subcarriers in a $t^{th}$ continuous RU in a second transmission bandwidth, a channel coefficient of each data subcarrier of all the data subcarriers of the $t^{th}$ continuous RU.

The second transmission bandwidth is a bandwidth corresponding to a plurality of continuous RUs that are allocated by the AP to the at least one STA for transmitting respective LTFs. Specifically, each STA in the at least one STA transmits the LTFs on all the subcarriers in the plurality of continuous RUs. In other words, each STA corresponds to the plurality of continuous RUs, and a sum of bandwidths of the continuous RUs in a set of the continuous RUs corresponding to the at least one STA is the second transmission bandwidth. The set of the continuous RUs corresponding to the at least one STA includes continuous RUs corresponding to each STA in the at least one STA, and any two continuous RUs in the set are different.

For example, the at least one PPDU is a PPDU #1 and a PPDU #2. An LTF in the PPDU #1 is carried on a distributed RU #1. The distributed RU #1 corresponds to a continuous RU #1 and a continuous RU #2. An LTF in the PPDU #2 is carried on a distributed RU #2. The distributed RU #2 corresponds to a continuous RU #3 and a continuous RU #4. In this case, the second transmission bandwidth is a sum of bandwidths of the continuous RU #1, the continuous RU #2, the continuous RU #3, and the continuous RU #4, where $1 \leq t \leq 4$.

For another example, the at least one PPDU is a PPDU #1 and a PPDU #2. An LTF in the PPDU #1 is carried on a distributed RU #1. The distributed RU #1 corresponds to a continuous RU #1 and a continuous RU #2. An LTF in the PPDU #2 is carried on a distributed RU #2. The distributed RU #2 corresponds to the continuous RU #2 and a continuous RU #3. In this case, the second transmission bandwidth is a sum of bandwidths of the continuous RU #1, the continuous RU #2, and the continuous RU #3, where $1 \leq t \leq 3$.

It should be understood that, in this embodiment, the data subcarriers in the $t^{th}$ continuous RU may carry only an LTF of one STA in the at least one STA, or may carry LTFs of a plurality of STAs in the at least one STA. If the data subcarriers in the $t^{th}$ continuous RU carry only an LTF of one STA in the at least one STA, a channel coefficient that is of the data subcarriers in the $t^{th}$ continuous RU and that is determined by the AP is a channel coefficient of the STA on the data subcarriers in the $t^{th}$ continuous RU. If the data subcarriers in the $t^{th}$ continuous RU carry LTFs of a plurality of STAs in the at least one STA, a channel coefficient that is of the data subcarriers in the $t^{th}$ continuous RU and that is determined by the AP includes channel coefficients of the plurality of STAs on the data subcarriers in the $t^{th}$ continuous RU.

In a possible implementation, a channel coefficient $$H_{k'}^{(t)}$$

of a $k'^{th}$ subcarrier in all the subcarriers of the $t^{th}$ continuous RU satisfies an equation (5):

$$H_{k'}^{(t)} = \frac{Y_{k'} \times \left(P_{r}^{(t)}\right)^{*}}{N_{LTF} \times LTF_{k'}^{(t)}} \quad (5)$$

The $k'^{th}$ subcarrier is a data subcarrier.

$Y_{k'}$ is an LTF received by the AP on the $k'^{th}$ subcarrier.

$N_{LTF}$ is a quantity of OFDM symbols included in the LTFs. For a meaning and a value of $N_{LTF}$, refer to the foregoing descriptions.

$$(P_r^{(t)})^*$$

is a conjugate transposition matrix of $$P_r^{(t)}.$$

$$P_r^{(t)} = \begin{bmatrix} P_{1_t} \\ P_{2_t} \\ M \\ P_{u_t} \end{bmatrix}, \text{ or } (P_r^{(t)})^* = \begin{bmatrix} P_{1_t} \\ P_{2_t} \\ M \\ P_{u_t} \end{bmatrix}^*.$$

u is a quantity of STAs whose corresponding LTFs are carried on the $t^{th}$ continuous RU. $P_{i_t}$ is $I_{i_t}+1^{th}$ to $I_{i_t}+NUM_{i_t^{th}}$ rows in the matrix P, $I_{i_t}$ is a starting spatial stream sequence number of an $i_{t^{th}}$ user, $NUM_{i_t}$ is a number of streams of the $i_{t^{th}}$ user, and $I_{i_t}$ and $NUM_{i_t}$ are indicated by an SS Allocation field in a User Info Field of the STA $i_t$. $i_t \in [1, N_u]$, $i_t$ is a sequence number of a STA that uses the $t^{th}$ continuous RU to send the LTF, $N_u$ is a quantity of the at least one STA triggered by the trigger frame, the matrix P is an $N_{LTF} \times N_{LT}F$ orthogonal mapping matrix, and $$LTF_{k'}^{(t)}$$

is a value that corresponds to the $k'^{th}$ subcarrier of the $t^{th}$ RU and that is of an LTF sequence.

It should be understood that a quantity of STAs whose corresponding LTFs are carried on different continuous RUs may vary. In other words, when t has different values, a value of u may vary. For example, if the $t^{th}$ continuous RU carries LTFs of three STAs, u=3. If the $t^{th}$ continuous RU carries an LTF of one STA, u=1.

It should be further understood that $i_t$ is the sequence number of the STA in the $N_u$ STAs, and the STA uses the $t^{th}$ continuous RU to send the LTF. $i_t$ is not a sequence number of the STA that uses the $t^{th}$ continuous RU to send the LTF in u STAs on the $t^{th}$ continuous RU.

In this embodiment, the AP may obtain a channel coefficient of each data subcarrier in each continuous RU according to the equation (5), where a channel coefficient of any data subcarrier includes a channel coefficient of one or more STAs whose corresponding LTFs are carried on the data subcarrier. Alternatively, for any STA, the AP may obtain, according to the equation (5), a channel coefficient of each data subcarrier in each RU of a plurality of continuous RUs corresponding to a distributed RU that carries data of the STA.

Further, the method may further include the following steps.

S2040: The AP determines, based on a channel coefficient $H_{k'}$ of the $k'^{th}$ subcarrier, a channel coefficient of the STA with the sequence number $i_t$ on each data subcarrier of each continuous RU in a plurality of continuous RUs corresponding to the STA.

S2050: The AP demodulates, based on the channel coefficient of the STA with the sequence number $i_t$ on each data subcarrier of each continuous RU in the plurality of continuous RUs corresponding to the STA, data transmitted by the STA with the sequence number $i_t$.

The LTF of the STA with the sequence number $i_t$ is carried on the $t^{th}$ continuous RU, the channel coefficient of the STA with the sequence number $i_t$ on the $k'^{th}$ subcarrier in the $t^{th}$ continuous RU are $$Q_{1\_i_t\,th}^{(t)} \text{ to } Q_{2\_i_t\,th}^{(t)}$$

columns in $$H_{k'}^{(t)},$$

and $P_{i_t}$ is $$Q_{1\_i_t\,th}^{(t)} \text{ to } Q_{2\_i_t\,th}^{(t)}$$

rows in $$P_r^{(t)}.$$

In other words, the channel coefficient of the STA with the sequence number $t_i$ on the $k'^{th}$ subcarrier may be learned of based on rows occupied in $$P_r^{(t)}$$

by $P_{i_t}$ corresponding to the STA with the sequence number $i_t$.

In this embodiment, the AP learns which continuous RUs carry an LTF sent by each STA. Therefore, for any STA, the AP may learn, according to the equation (5), a channel coefficient of the STA on a data subcarrier in each RU of a plurality of continuous RUs corresponding to the STA. In this way, it is equivalent that the AP learns of the channel coefficient of the STA, and the AP may demodulate, based on the channel coefficient of the STA, data transmitted by the STA, to obtain the data transmitted by the STA.

Figure 14:
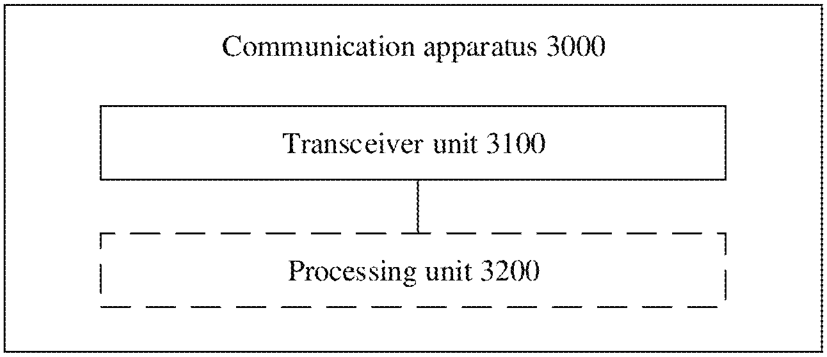
FIG. 14 is a schematic diagram of a structure of a communication apparatus according to an embodiment of this application.

This application further provides a communication apparatus. Refer to FIG. 14. FIG. 14 is a schematic block diagram of a communication apparatus according to an embodiment of this application. As shown in FIG. 14, the communication apparatus 3000 may include a transceiver unit 3100. Optionally, the apparatus 3000 may further include a processing unit 3200.

The transceiver unit 3100 may be configured to send information to another apparatus or receive information from the another apparatus, for example, sending or receiving a trigger frame or a PPDU. The processing unit 3200 may be configured to perform internal processing of the apparatus, for example, determining a channel coefficient.

In an implementation, the communication apparatus 3000 may correspond to the STA in the method 1000, for example, may be specifically a STA or a chip configured in a STA. In addition, the units in the communication apparatus 3000 are respectively used for operations performed by the STA in the method 1000.

Specifically, the transceiver unit 3100 is configured to: receive a trigger frame from an AP, where the trigger frame is used to trigger at least one station STA to transmit an uplink physical layer protocol data unit PPDU; and send a PPDU to the AP based on the trigger frame. The PPDU includes a data field and long training fields LTFs used for channel estimation. The data field is carried on a distributed resource unit RU. The distributed RU includes a plurality of subcarrier groups that are distributed in frequency domain. One subcarrier group includes one subcarrier or includes at least two continuous subcarriers. The LTFs are carried on all subcarriers in a first transmission bandwidth. The first transmission bandwidth is a bandwidth corresponding to a distributed RU that is allocated by the AP to the at least one STA for transmitting the uplink PPDU.

In another implementation, the communication apparatus 3000 may correspond to the STA in the method 2000, for example, may be specifically a STA or a chip configured in a STA. In addition, the units in the communication apparatus 3000 are respectively used for operations performed by the STA in the method 2000.

Specifically, the transceiver unit 3100 is configured to: receive a trigger frame from an AP, where the trigger frame is used to trigger at least one station STA to transmit an uplink physical layer protocol data unit PPDU; and send a physical layer protocol data unit PPDU to the AP based on the trigger frame. The PPDU includes a data field and long training fields LTFs used for channel estimation. The data field is carried on a distributed resource unit RU. The distributed RU includes a plurality of subcarrier groups that are distributed in frequency domain. One subcarrier group includes one subcarrier or includes at least two continuous subcarriers. The LTFs are carried on all subcarriers of a plurality of continuous RUs. The plurality of continuous RUs are continuous RUs corresponding to the distributed RU. Each continuous RU includes a plurality of subcarriers that are continuous in frequency domain.

Optionally, the processing unit 3200 is configured to obtain, based on values of an LTF sequence and a matrix P, the LTFs carried on all the subcarriers.

In an implementation, a quantity of dimensions of the matrix P is determined based on a quantity of STAs triggered by the trigger frame, a maximum quantity of STAs supported by a system, and a maximum number of spatial streams supported by a single STA in the at least one STA.

In another implementation, the quantity of the dimensions of the matrix P is $N_{LTF}\times N_{LTF}$. In other words, the matrix P is a matrix of $N_{LFT}$ rows multiplied by $N_{LTF}$ columns. $N_{LFT}$ is a quantity of OFDM symbols included in the LTFs, namely, a quantity of OFDM symbols for sending the LTFs. $N_{LTF}$ is determined based on a total number of streams carried by each STA in the first transmission bandwidth.

Optionally, in an implementation, the processing unit 3200 is specifically configured to: determine a corresponding row from the matrix P based on an order of the STA in the at least one STA; and obtain, based on the corresponding row determined from the matrix P and the values of the LTF sequence, the LTFs carried on all the subcarriers.

In another implementation, the processing unit 3200 determines a corresponding row from the matrix P based on an indication of an SS Allocation field in a User Info Field in the trigger frame received by the STA.

Optionally, an LTF $X_k$ carried on a $k^{th}$ subcarrier in all the subcarriers and an LTF $X_d$ carried on a $d^{th}$ subcarrier in all the subcarriers respectively satisfy:

$$X_k=P_i\times LTF_k\text{, and}$$

$$X_d=F\times LTF_d.$$

In an implementation, the $k^{th}$ subcarrier is a data subcarrier, the $d^{th}$ subcarrier is a pilot subcarrier, $P_i$ is first $S_i$ rows in $(i-1)\times N_{ms}+1_{th}$ to $i\times N_{ms^{th}}$ rows in the matrix P, the $(i-1)\times N_{ms}+1_{th}$ to $i\times N_{ms^{th}}$ rows in the matrix P are rows that correspond to a sequence number i of a STA and that are in the matrix P, the matrix P is an $N_{LTF}\times N_{LTF}$ orthogonal mapping matrix, $N_{LTF}$ is a quantity of orthogonal frequency division multiplexing OFDM symbols included in the LTFs, $(N_u\times N_{ms})\leq N_{LTF}\leq(N_{mu}\times N_{ms})$, $N_u$ is the quantity of the STAs triggered by the trigger frame, $N_{mu}$ is the maximum quantity of the STAs supported by the system, $N_{ms}$ is the maximum number of the spatial streams supported by the single STA, i is the sequence number of the STA, $1\leq i\leq N_u$, $S_i$ is a number of spatial streams actually transmitted by the STA with the sequence number i, $1\leq S_i\leq N_{ms}$, $LTF_k$ is a value that corresponds to the $k^{th}$ subcarrier and that is of the LTF sequence, $LTF_d$ is a value that corresponds to the $d^{th}$ subcarrier and that is of the LTF sequence, and F is a first row in the matrix P.

Optionally, i satisfies:

$$i=(T_F-T_L)/T_C+1.$$

$T_F$ is duration from reception of the trigger frame by the STA to reception of a user information field corresponding to the STA, $T_L$ is duration from the reception of the trigger frame by the STA to reception of a first user information field in the trigger frame, and $T_C$ is a length of the user information field corresponding to the STA.

If B55=0 in the Common Field (as shown in FIG. 11(*b*)) of the trigger frame, it indicates that the first User Info Field in the User Info List is an extension of the Common Field, and is referred to as a Special User Info Field. In this case, i=i−1 is to be set. In other words, when B55=0, the Special User Info Field is used as the extension of the Common Field, and one less User Info Field is actually allocated to a user. Therefore, an actual user sequence number (the sequence number i of the STA) is a sequence number i' of the User Info Field minus 1, that is, i=i−1. When B55=1, the user sequence number (the sequence number i of the STA) is equal to the sequence number i' of the User Info Field.

In another implementation, the $k^{th}$ subcarrier is a data subcarrier, the $d^{th}$ subcarrier is a pilot subcarrier, $P_i$ is $I_i+1_{th}$ to $I_i+NUM_{i^{th}}$ rows in the matrix P, $I_i$ is a starting spatial stream sequence number of an $i^{th}$ user, the sequence number is obtained by sorting all streams of all users on the first transmission bandwidth, $NUM_i$ is a number of streams of the $i^{th}$ user, and $I_i$ and $NUM_i$ are indicated by an SS Allocation field in a User Info Field of the STA i, as shown in FIG. 11(*c*). For example, the first four bits in the SS Allocation are a starting spatial stream (Starting spatial stream) subfield. If a value of the first four bits is 3, it indicates that the starting spatial stream sequence number $I_i$ is 3. The last two bits are a number of spatial stream (Number of Spatial Stream) subfield. If a value of the last two bits is 2, it indicates that a number $NUM_i$ of spatial streams is 2. In other words, a fourth stream and a fifth stream are allocated.

$P_i$ may be understood as a matrix P of the STA i.

For a meaning and a value of the matrix P, refer to the foregoing descriptions.

$N_{LTF}$ is the quantity of the OFDM symbols included in the LTFs, and a value of the quantity is not less than a total number of the streams of all the users on the first transmission bandwidth. $LTF_k$ is a value that corresponds to the $k^{th}$ subcarrier and that is of the LTF sequence. $LTF_d$ is a value that corresponds to the $d^{th}$ subcarrier and that is of the LTF sequence. F is the first row in the matrix P.

In an implementation, the communication apparatus 3000 may correspond to the AP in the foregoing method 1000, for example, may be specifically an AP or a chip configured in an AP. In addition, the units in the communication apparatus 3000 are respectively used for implementing operations performed by the AP in the method 1000.

Specifically, the transceiver unit 3100 is configured to: send a trigger frame to at least one station STA, where the trigger frame is used to trigger the at least one STA to transmit an uplink physical layer protocol data unit PPDU; and receive respective PPDUs from the at least one STA. One of the PPDUs includes a data field and long training fields LTFs used for channel estimation. The data field is carried on a distributed resource unit RU. The distributed RU includes a plurality of subcarrier groups that are distributed in frequency domain. One subcarrier group includes one subcarrier or includes at least two continuous subcarriers. The LTFs are carried on all subcarriers in a first transmission bandwidth. The first transmission bandwidth is a bandwidth corresponding to a distributed RU that is allocated by an access point AP to the at least one STA for transmitting the uplink PPDU.

Optionally, the processing unit 3200 is configured to: determine a channel coefficient of a data subcarrier in the first transmission bandwidth based on an LTF received on the data subcarrier in the first transmission bandwidth.

Optionally, a channel coefficient $H_k$ of a $k^{th}$ subcarrier in all the subcarriers in the first transmission bandwidth satisfies:

$$H_k = \frac{Y_k \times P_r^*}{N_{LTF} \times LTF_k}.$$

The $k^{th}$ subcarrier is the data subcarrier, $Y_k$ is the LTF received by the AP on the $k^{th}$ subcarrier, $N_{LTF}$ is a quantity of OFDM symbols included in the LTFs, $(N_u \times N_{ms}) \leq N_{LTF} \leq (N_{mu} \times N_{ms})$, $N_u$ is a quantity of STAs triggered by the trigger frame, $N_{mu}$ is a maximum quantity of STAs supported by a system, $N_{ms}$ is a maximum number of spatial streams supported by a single STA, $$P_r^*$$

is a conjugate transposition matrix of $P_r$, $$P_r = \begin{bmatrix} P_1 \\ P_2 \\ M \\ P_{N_u} \end{bmatrix},$$

$P_i$ is first $S_i$ rows in $(i-1) \times N_{ms}+1_{th}$ to $i \times N_{ms^{th}}$ rows in the matrix P, the $(i-1) \times N_{ms}+1_{th}$ to $i \times N_{ms^{th}}$ rows in the matrix P are rows corresponding to a sequence number i of a STA in the matrix P, $1 \leq S_i \leq N_{ms}$, $i \in [1, N_u]$, i is the sequence number of the STA, $S_i$ is a number of spatial streams actually transmitted by the STA with the sequence number i, the matrix P is an $N_{LTF} \times N_{LTF}$ orthogonal mapping matrix, and $LTF_k$ is a value that corresponds to the k th subcarrier and that is of an LTF sequence.

Optionally, the processing unit 3200 is further configured to: determine a channel coefficient of the STA with the sequence number i on each data subcarrier in all the subcarriers in the first transmission bandwidth based on the channel coefficient $H_k$ of the $k^{th}$ subcarrier; and demodulate, based on the channel coefficient of the STA with the sequence number i on each data subcarrier in all the subcarriers in the first transmission bandwidth, data transmitted by the STA with the sequence number i. In an implementation, a channel coefficient of the STA with the sequence number i on the $k^{th}$ subcarrier is $Q_{1\_i^{th}}$ to $Q_{2\_i^{th}}$ columns in $H_k$, and $P_i$ is $Q_{1\_i^{th}}$ to $Q_{2\_i^{th}}$ rows in $P_r$. In another implementation, a channel coefficient of the STA with the sequence number i on the $k^{th}$ subcarrier is $I_i+1_{th}$ to $I_i+NUM_{i^{th}}$ columns in $H_k$. In an implementation, the communication apparatus 3000 may correspond to the AP in the foregoing method 2000, for example, may be specifically an AP or a chip configured in an AP. In addition, the units in the communication apparatus 3000 are respectively used for implementing operations performed by the AP in the method 2000.

Specifically, the transceiver unit 3100 is configured to: send a trigger frame to at least one station STA, where the trigger frame is used to trigger the at least one STA to transmit an uplink physical layer protocol data unit PPDU; and receive respective PPDUs from the at least one STA. One of the PPDUs includes a data field and long training fields LTFs used for channel estimation. The data field is carried on a distributed resource unit RU. The distributed RU includes a plurality of subcarrier groups that are distributed in frequency domain. One subcarrier group includes one subcarrier or includes at least two continuous subcarriers. The LTFs are carried on all subcarriers of a plurality of continuous RUs. The plurality of continuous RUs are continuous RUs corresponding to the distributed RU. Each continuous RU includes a plurality of subcarriers that are continuous in frequency domain.

Optionally, the processing unit 3200 is configured to: determine, based on LTFs received on all data subcarriers in a $t^{th}$ continuous RU in a second transmission bandwidth, a channel coefficient of each data subcarrier in all the subcarriers of the $t^{th}$ continuous RU, where the second transmission bandwidth is a bandwidth corresponding to a plurality of continuous RUs that are allocated by an access point AP to the at least one STA for transmitting respective LTFs.

Optionally, a channel coefficient $$H_{k'}^{(t)}$$

of a $k'^{th}$ subcarrier in all the subcarriers of the $t^{th}$ continuous RU satisfies:

$$H_{k'}^{(t)} = \frac{Y_{k'} \times (P_r^{(t)})^*}{N_{LTF} \times LTF_{k'}^{(t)}}.$$

The $k'^{th}$ subcarrier is the data subcarrier, $Y_{k'}$ is the LTF received by the AP on the $k'^{th}$ subcarrier, $N_{LTF}$ is a quantity of OFDM symbols included in the LTFs, $(N_u \times N_{ms}) \leq N_{LTF} \leq (N_{mu} \times N_{ms})$, $N_u$ is a quantity of STAs triggered by the trigger frame, $N_{mu}$ is a maximum quantity of STAs supported by a system, $N_{ms}$ is a maximum number of spatial streams supported by a single STA, $$(P_r^{(t)})^*$$

is a conjugate transposition matrix of $$P_r^{(t)},$$

$$P_r^{(t)} = \begin{bmatrix} P_{1_t} \\ P_{2_t} \\ M \\ P_{u_t} \end{bmatrix}, \text{ or } \left(P_r^{(t)}\right)^* = \begin{bmatrix} P_{1_t} \\ P_{2_t} \\ M \\ P_{u_t} \end{bmatrix}^*,$$

and u is a quantity of STAs whose corresponding LTFs are carried on the $t^{th}$ continuous RU. In an implementation, $P_{i_t}$ is first $S_{i_t}$ rows in $(i_t-1)\times N_{ms}+1_{th}$ to $i_t\times N_{ms^{th}}$ rows in the matrix P, the $(i_t-1)\times N_{ms}+1_{th}$ to $i_t\times N_{ms^{th}}$ rows in the matrix P are rows corresponding to a sequence number $i_t$ of a STA in the matrix P, $i_t\in[1, N_u]$, $i_t$ is the sequence number of the STA that uses the $t^{th}$ continuous RU to send the LTF, $S_{i_t}$ is a number of spatial streams actually transmitted by the STA with the sequence number $i_t$, $1\leq S_{i_t}\leq N_{ms}$, the matrix P is an $N_{LTF}\times N_{LTF}$ orthogonal mapping matrix, and $$LTF_{k'}^{(t)}$$

is a value that corresponds to the $k'^{th}$ subcarrier of the $t^{th}$ RU and that is of an LTF sequence. In another implementation, $P_{i_t}$ is $I_{i_t}+1^{th}$ to $I_{i_t}+NUM_{i_t^{th}}$ rows in the matrix P, $I_{i_t}$ is a starting spatial stream sequence number of an $i_{t^{th}}$ user, $NUM_{i_t}$ is a number of streams of the $i_{t^{th}}$ user, and $I_{i_t}$ and $NUM_{i_t}$ are indicated by an SS Allocation field in a User Info Field of the STA $i_t$. An indication manner is described in the foregoing embodiment, and details are not described herein again. $i_t\in[1, N_u]$, $i_t$ is a sequence number of a STA that uses the $t^{th}$ continuous RU to send the LTF, the matrix P is an $N_{LTF}\times N_{LTF}$ orthogonal mapping matrix, and LTF is a value that corresponds to the $k'^{th}$ subcarrier of the $t^{th}$ RU and that is of an LTF sequence.

Optionally, the processing unit 3200 is further configured to: determine, based on the channel coefficient $H_{k'}$ of the $k'_{th}$ subcarrier, a channel coefficient of the STA with the sequence number $i_t$ on each data subcarrier of each continuous RU in a plurality of continuous RUs corresponding to the STA with the sequence number $i_t$; and demodulate, based on the channel coefficient of the STA with the sequence number $i_t$ on each data subcarrier of each continuous RU in the plurality of continuous RUs corresponding to the STA with the sequence number $i_t$, data transmitted by the STA with the sequence number $i_t$. The LTF of the STA with the sequence number $i_t$ is carried on the $t^{th}$ continuous RU, the channel coefficient of the STA with the sequence number $i_t$ on the $k'^{th}$ subcarrier in the $t^{th}$ continuous RU are $$Q_{1\_i_t{}^{th}}^{(t)} \text{ to } Q_{2\_i_t{}^{th}}^{(t)}$$

columns in $$H_{k'}^{(t)},$$

and $P_{i_t}$ is $$Q_{1\_i_t^{th}}^{(t)} \text{ to } Q_{2\_i_t}^{(t)}$$

rows in $$P_r^{(t)}.$$

It should be understood that a specific process in which the units perform the foregoing corresponding steps has been described in detail in the foregoing method embodiments. For brevity, details are not described herein again.

An embodiment of this application further provides a computer-readable storage medium storing a computer program. When the computer-readable storage medium is executed by a computer, functions in the foregoing method embodiments are implemented.

An embodiment of this application further provides a computer program product. When the computer program product is executed by a computer, functions in the foregoing method embodiments are implemented.

An embodiment of this application further provides a chip system. The chip system includes a processor and an interface, configured to support a communication transmission device in implementing a function of an access point or a station in the foregoing method embodiments, for example, determining or processing at least one of data and information in the foregoing method. In a possible design, the chip system further includes a memory, and the memory is configured to store information and data that are used for the foregoing communication apparatus. The chip system may include a chip, or may include a chip and another discrete device.

An embodiment of this application provides a functional entity, and the functional entity is configured to implement the foregoing method for transmitting a PPDU.

It should be further understood that "first", "second", "third", "fourth", and various numbers in this specification are merely used for differentiation for ease of description, and are not intended to limit the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of this application, sequence numbers of the foregoing processes do not mean execution sequences. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical implementations. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual specification to achieve the objectives of the implementations of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical implementations of this application essentially, or the part contributing to the prior art, or some of the technical implementations may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

An order of the steps of the method in embodiments of this application may be adjusted, combined, or removed based on an actual specification.

The modules in the apparatus in embodiments of this application may be combined, divided, and deleted based on an actual specification.

In conclusion, the foregoing embodiments are merely intended for describing the technical implementations of this application, but not for limiting this application. Although this application is described in detail with reference to the foregoing embodiments, a person of ordinary skill in the art should understand that modifications to the technical implementations recorded in the foregoing embodiments or equivalent replacements to some technical features thereof may still be made. These modifications or replacements do not make the essence of the corresponding technical implementations depart from the scope of the technical implementations of embodiments of this application.

What is claimed is:

1. A method for transmitting an uplink physical layer protocol data unit (PPDU), comprising:

receiving, by a station (STA) of at least one STA, a trigger frame from an access point (AP), wherein the trigger frame is usable to trigger the uplink PPDU;

sending, by the STA, the uplink PPDU to the AP based on the trigger frame, wherein the uplink PPDU comprises a data field and long training fields (LTFs) usable for channel estimation, the data field is carried on a distributed resource unit (RU), the distributed RU comprises a plurality of subcarrier groups that are distributed in frequency domain, one subcarrier group of the plurality of subcarrier groups comprises:

one subcarrier, or at least two continuous subcarriers, the LTFs are carried on all of the plurality of subcarriers in a first transmission bandwidth, and the first transmission bandwidth corresponds to the distributed RU allocated by the AP to the at least one STA for transmitting the uplink PPDU; and obtaining, by the STA based on values of an LTF sequence and a matrix P, the LTFs carried on all the subcarriers, wherein a quantity of dimensions of the matrix P is determined based on a quantity of STAs triggered by the trigger frame, a maximum quantity of STAs supported by a system, and a maximum number of spatial streams supported by a single STA in the at least one STA, wherein an LTF $X_k$ of the LTFs carried on a $k_{th}$ subcarrier in all the subcarriers and an LTF $X_d$ of the LTFs carried on a $d_{th}$ subcarrier in all the subcarriers respectively satisfy:

$$X_k=P_i\times LTF_k, \text{ and}$$

$$X_d=F\times LTF_d, \text{ wherein}$$

the $k_{th}$ subcarrier is a data subcarrier, the $d_{th}$ subcarrier is a pilot subcarrier, $P_i$ is first $S_i$ rows in $(i-1)\times N_{ms}+1_{th}$ to $i\times N_{ms^{th}}$ rows in the matrix P, the $(i-1)\times N_{ms}+1_{th}$ to $i\times N_{ms^{th}}$ rows in the matrix P are rows that correspond to a sequence number i of an STA of the at least one STA and that are in the matrix P, the matrix P is an $N_{LTF}\times N_{LTF}$ orthogonal mapping matrix, $N_{LTF}$ is a quantity of orthogonal frequency division multiplexing (OFDM) symbols comprised in the LTFs, $(N_u\times N_{ms})\le N_{LTF}\le(N_{mu}\times N_{ms})$, $N_u$ is the quantity of the STAs triggered by the trigger frame, $N_{mu}$ is the maximum quantity of the STAs supportable by the system, $N_{ms}$ is the maximum number of the spatial streams supportable by the single STA, i is the sequence number of the STA, $1\le i\le N_u$, $S_i$ is a number of spatial streams actually transmitted by the STA with the sequence number i, $1\le S_i\le N_{ms}$, $LTF_k$ is a value that corresponds to the $k_{th}$ subcarrier and that is of the LTF sequence, $LTF_d$ is a value that corresponds to the $d_{th}$ subcarrier and that is of the LTF sequence, and F is a first row in the matrix P.

2. The method according to claim 1, wherein i satisfies:

$$i=(T_F-T_L)/T_C+1, \text{ wherein}$$

$T_F$ is a duration from reception of the trigger frame by the STA to reception of a user information field corresponding to the STA, $T_L$ is a duration from the reception of the trigger frame by the STA to reception of a first user information field in the trigger frame, and $T_C$ is a length of the user information field corresponding to the STA.

3. The method according to claim 1, wherein the trigger frame includes a common information field, and the common information field comprises a bit indicating whether a distributed resource unit is used in a data part.

4. The method according to claim 1, wherein the trigger frame includes a user information field corresponding to the STA, and the user information field includes a resource unit allocation subfield indicating resource allocation information of the distributed RU.

5. The method according to claim 1, wherein the uplink PPDU is an extremely high throughput (EHT) PPDU, and the LTFs are EHT long training fields (EHT-LTFs).

6. A chip, comprising:

a processor; and a memory, wherein the memory is configured to store a program or instructions, and in response to the program or the instructions being executed by the processor, the chip is enabled to perform:

receiving, through an interface, a trigger frame from an access point (AP), wherein the trigger frame is usable to trigger at least one station STA to transmit an uplink physical layer protocol data unit (PPDU);

generating and outputting the uplink PPDU based on the trigger frame, wherein the uplink PPDU comprises:

a data field and long training fields (LTFs) usable for channel estimation, the data field is carried on a distributed resource unit (RU), the distributed RU comprises a plurality of subcarrier groups that are distributed in frequency domain, one subcarrier group comprises:

one subcarrier, or at least two continuous subcarriers, the LTFs are carried on all subcarriers in a first transmission bandwidth, and the first transmission bandwidth is a bandwidth corresponding to the distributed RU allocated by the AP to the at least one STA for transmitting the uplink PPDU; and obtaining, based on values of an LTF sequence and a matrix P, the LTFs carried on all the subcarriers, wherein a quantity of dimensions of the matrix P is determined based on a quantity of STAs triggered by the trigger frame, a maximum quantity of STAs supported by a system, and a maximum number of spatial streams supported by a single STA in the at least one STA, wherein an LTF $X_k$ of the LTFs carried on a $k_{th}$ subcarrier in all the subcarriers and an LTF $X_d$ of the LTFs carried on a $d_{th}$ subcarrier in all the subcarriers respectively satisfy:

$$X_k = P_i \times \mathrm{LTF}_k, \text{and}$$

$$X_d = F \times \mathrm{LTF}_d, \text{ wherein}$$

the $k_{th}$ subcarrier is a data subcarrier, the $d_{th}$ subcarrier is a pilot subcarrier, $P_i$ is first $S_i$ rows in $(i-1)\times N_{ms}+1_{th}$ to $i\times N_{ms}{}^{th}$ rows in the matrix P, the $(i-1)\times N_{ms}+1_{th}$ to $1\times N_{ms}{}^{th}$ rows in the matrix P are rows that correspond to a sequence number i of an STA of the at least one STA and that are in the matrix P, the matrix P is an $N_{LTF}\times N_{LTF}$ orthogonal mapping matrix, $N_{LTF}$ is a quantity of orthogonal frequency division multiplexing (OFDM) symbols comprised in the LTFs, $(N_u\times N_{ms})\le N_{LTF}\le(N_{mu}\times N_{ms})$, $N_u$ is the quantity of the at least one STA triggered by the trigger frame, $N_{mu}$ is the maximum quantity of the STAs supportable by the system, $N_{ms}$ is the maximum number of the spatial streams supportable by the single STA, i is the sequence number of the STA, $1\le i\le N_u$, $S_i$ is a number of spatial streams actually transmitted by the at least one STA with the sequence number i, $1\le S_i\le N_{ms}$, $\mathrm{LTF}_k$ dis a value that corresponds to the $k_{th}$ subcarrier and that is of the LTF sequence, $\mathrm{LTF}_d$ is a value that corresponds to the $d_{th}$ subcarrier and that is of the LTF sequence, and F is a first row in the matrix P.

7. The chip according to claim 6, wherein i satisfies:

$$i=(T_F-T_L)T_C+1, \text{ wherein}$$

$T_F$ is a duration from reception of the trigger frame by the STA to reception of a user information field corresponding to the STA, $T_L$ is a duration from the reception of the trigger frame by the STA to reception of a first user information field in the trigger frame, and $T_C$ is a length of the user information field corresponding to the STA.

8. The chip according to claim 6, wherein the trigger frame includes a common information field, and the common information field comprises a bit indicating whether a distributed resource unit is used in a data part.

9. The chip according to claim 6, wherein the trigger frame includes a user information field corresponding to the at least one STA, and the user information field includes a resource unit allocation subfield indicating resource allocation information of the distributed RU.

10. The chip according to claim 6, wherein the uplink PPDU is an extremely high throughput (EHT) PPDU, and the LTFs are EHT long training fields (EHT-LTFs).

11. A communication apparatus, comprising:

a processor, wherein the processor is coupled to a memory, the memory is configured to store a program or instructions, and in response to the program or the instructions being executed by the processor, the apparatus is enabled to:

receive a trigger frame from an access point (AP), wherein the trigger frame is usable to trigger at least one STA to transmit an uplink physical layer protocol data unit (PPDU);

send the uplink PPDU to the AP based on the trigger frame, wherein the uplink PPDU comprises:

a data field and long training fields (LTFs) usable for channel estimation, the data field is carried on a distributed resource unit (RU), the distributed RU comprises a plurality of subcarrier groups that are distributed in frequency domain, one subcarrier group comprises:

one subcarrier, or at least two continuous subcarriers, the LTFs are carried on all subcarriers in a first transmission bandwidth, and the first transmission bandwidth is a bandwidth corresponding to the distributed RU allocated by the AP to the at least one STA for transmitting the uplink PPDU; and obtain, based on values of an LTF sequence and a matrix P, the LTFs carried on all the subcarriers, wherein a quantity of dimensions of the matrix P is determined based on a quantity of STAs triggered by the trigger frame, a maximum quantity of STAs supported by a system, and a maximum number of spatial streams supported by a single STA in the at least one STA, wherein an LTF $X_k$ of the LTFs carried on a $k_{th}$ subcarrier in all the subcarriers and an LTF $X_d$ of the LTFs carried on a $d_{th}$ subcarrier in all the subcarriers respectively satisfy:

$$X_k = P_i \times LTF_k, \text{ and}$$

$$X_d = F \times LTF_d, \text{ wherein}$$

the $k_{th}$ subcarrier is a data subcarrier, the $d_{th}$ subcarrier is a pilot subcarrier, $P_i$ is first $S_i$ rows in $(i-1)\times N_{ms}+1_{th}$ to $i\times N_{ms}{}^{th}$ rows in the matrix P, the $(i-1)\times N_{ms}+1_{th}$ to $i\times N_{ms}{}^{th}$ rows in the matrix P are rows that correspond to a sequence number i of an STA of the at least one STA and that are in the matrix P, the matrix P is an $N_{LTF}\times N_{LTF}$ orthogonal mapping matrix, $N_{LTF}$ is a quantity of orthogonal frequency division multiplexing (OFDM) symbols comprised in the LTFs, $(N_u\times N_{ms})\leq N_{LTF}\leq(N_{mu}\times N_{ms})$ $N_u$ is the quantity of the at least one STA triggered by the trigger frame, $N_{mu}$ is the maximum quantity of the STAs supportable by the system, $N_{ms}$ is the maximum number of the spatial streams supportable by the single STA, i is the sequence number of the STA, $1\leq i\leq N_u$, $S_i$ is a number of spatial streams actually transmitted by the STA with the sequence number i, $1\leq S_i\leq N_{ms}$, $LTF_k$ is a value that corresponds to the $k_{th}$ subcarrier and that is of the LTF sequence, $LTF_d$ is a value that corresponds to the $d_{th}$ subcarrier and that is of the LTF sequence, and F is a first row in the matrix P.

12. The method according to claim 11, wherein satisfies:

$$i=(T_F-T_L)T_C+1, \text{ wherein}$$

$T_F$ is a duration from reception of the trigger frame by the STA to reception of a user information field corresponding to the STA, $T_L$ is a duration from the reception of the trigger frame by the STA to reception of a first user information field in the trigger frame, and $T_C$ is a length of the user information field corresponding to the at least one STA.

13. The communication apparatus according to claim 11, wherein the trigger frame includes a common information field, and the common information field comprises a bit indicating whether a distributed resource unit is used in a data part.

14. The communication apparatus according to claim 11, wherein the trigger frame includes a user information field corresponding to the at least one STA, and the user information field includes a resource unit allocation subfield indicating resource allocation information of the distributed RU.

15. The communication apparatus according to claim 11, wherein the uplink PPDU is an extremely high throughput (EHT) PPDU, and the LTFs are EHT long training fields (EHT-LTFs).

* * * * *